(12) United States Patent
Krickeberg et al.

(10) Patent No.: US 10,760,606 B2
(45) Date of Patent: Sep. 1, 2020

(54) ADJUSTING DEVICE FOR POSITIONING SUPPORT SURFACE SEGMENTS OF AN OPERATING TABLE

(71) Applicant: MAQUET GMBH, Rastatt (DE)

(72) Inventors: Thomas Krickeberg, Karlsbad (DE); Immanuel Gaiser, Durmersheim (DE); Rodrigo Del Alcazar Von Buchwald, Karlsruhe (DE); Bernhard Katzenstein, Iffezheim (DE)

(73) Assignee: MAQUET GMBH, Rastatt (DE)

( * ) Notice: Subject to any disclaimer, the term of this patent is extended or adjusted under 35 U.S.C. 154(b) by 456 days.

(21) Appl. No.: 15/879,433

(22) Filed: Jan. 24, 2018

(65) Prior Publication Data

US 2018/0163764 A1    Jun. 14, 2018

Related U.S. Application Data

(63) Continuation-in-part of application No. PCT/EP2016/067396, filed on Jul. 21, 2016.

(30) Foreign Application Priority Data

Jul. 24, 2015 (DE) .................. 10 2015 112 083
Jul. 19, 2016 (DE) .................. 10 2016 113 250

(51) Int. Cl.
*A61G 13/12* (2006.01)
*A61G 13/08* (2006.01)
*F16B 21/12* (2006.01)

(52) U.S. Cl.
CPC .............. *F16B 21/12* (2013.01); *A61G 13/08* (2013.01); *A61G 13/1245* (2013.01)

(58) Field of Classification Search
CPC ........ A61G 13/02; A61G 13/04; A61G 13/08; A61G 13/1245
See application file for complete search history.

(56) References Cited

U.S. PATENT DOCUMENTS 2,779,951 A * 2/1957 Travis .................... A61G 7/015
                                                         5/616
5,157,800 A * 10/1992 Borders ............ A61G 13/0009
                                                         5/602

(Continued)

FOREIGN PATENT DOCUMENTS

CN       1973804 A    6/2007
CN     202342199 U    7/2012

(Continued)

OTHER PUBLICATIONS

Chinese Office Action and Search Report (with English translations) dated Apr. 1, 2020 during the prosecution of corresponding Chinese Patent Application No. 201680055709.9, 11 pages.

(Continued)

*Primary Examiner* — Jonathan P Masinick

(57) ABSTRACT

An adjusting device for positioning support surface segments of an operating table is disclosed and may have a four-bar linkage, in which a base element of the operating table and a support surface segment of a patient bearing surface of the operating table are connected. The four-bar linkage may have a first guide bar and a second guide bar. The support surface segment may be connected to the four-bar linkage so that it can pivot about the second pivot.

29 Claims, 45 Drawing Sheets

(56) References Cited

U.S. PATENT DOCUMENTS

| | | | |
|---|---|---|---|
| 6,202,230 B1* | 3/2001 | Borders | A61G 13/0009 |
| | | | 5/613 |
| 10,470,954 B2* | 11/2019 | Cox | A61G 7/012 |
| 10,543,142 B2* | 1/2020 | Lim | A61G 7/008 |
| 2006/0042011 A1 | 3/2006 | Koch et al. | |
| 2014/0059771 A1 | 3/2014 | Schuele et al. | |
| 2019/0046383 A1* | 2/2019 | Lim | A61G 13/1295 |
| 2019/0209409 A1* | 7/2019 | Jackson | A61G 13/1235 |

FOREIGN PATENT DOCUMENTS

| | | |
|---|---|---|
| CN | 202682276 U | 1/2013 |
| DE | 4406553 C1 | 7/1995 |
| DE | 10253906 A1 | 6/2004 |
| DE | 102005054175 A1 | 5/2007 |
| EP | 1525870 A2 | 4/2005 |
| EP | 2617405 A1 | 7/2013 |
| JP | 2006-507048 A | 3/2006 |

OTHER PUBLICATIONS

Japanese Office Action (and English translation) dated Aug. 27, 2019 during the prosecution of corresponding Japanese Patent Application No. 2018-503596, 13 pages.

International Search Report (with English translation) and Written Opinion dated Oct. 19, 2016 which issued during corresponding International Patent Application No. PCT/EP2016/067396, 10 pages.

* cited by examiner

CROSS SECTION A-A

CROSS SECTION B-B

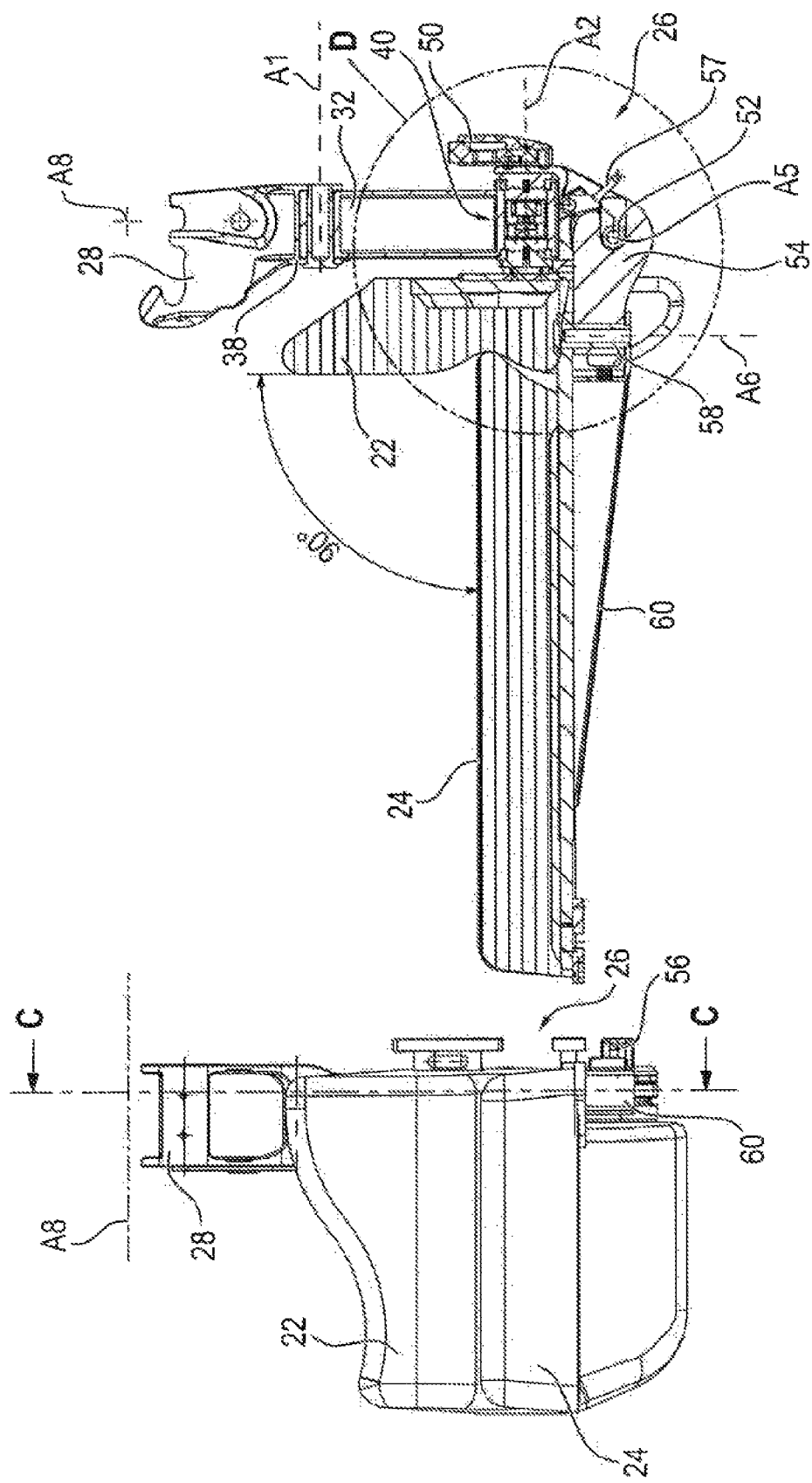

CROSS SECTION E-E

CROSS SECTION F-F

ADJUSTING DEVICE FOR POSITIONING SUPPORT SURFACE SEGMENTS OF AN OPERATING TABLE

CROSS REFERENCE TO RELATED APPLICATIONS

The present application is a continuation-in-part filed under 35 U.S.C. § 111(a), and claims the benefit under 35 U.S.C. § 365(c) of PCT International Application No. PCT/EP2016/067396, filed Jul. 21, 2016, which designates the United States of America, and claims the benefit of German Patent Application No. 10 2015 112 083.6, filed Jul. 24, 2015 and German Patent Application No. 10 2016 113 250.0, filed Jul. 19, 2016. The disclosure of each of these applications is incorporated by reference herein in its entirety.

TECHNICAL FIELD

The present disclosure relates to operating tables, and in various embodiments more specifically to patient positioning and adjustment on such operating tables.

BACKGROUND

In certain operations, such as cholecystectomy and obesity surgery, a spreading of the legs of a patient arranged on the patient bearing surface of an operating table is required. For this, the thighs and shins of the patient are arranged on a thigh plate and a shin plate, which can pivot relative to each other and to other segments of the patient bearing surface.

For the spreading of the legs, the thigh plate and the shin plate attached to it are each pivoted about a pivot axis oriented perpendicular to the patient bearing surface. In addition to this, it may be necessary to pivot the shin plates about another pivot axis oriented perpendicular to their longitudinal axis, in order to achieve a suitable positioning of the patient, e.g., a knee/elbow posture. Owing to the different anatomy of patients, the pivot axes of the patient bearing surface generally do not run through the joints of the patient. This may result in a physiologically disadvantageous posture of the patient after a pivoting of the shin and/or thigh plates, in which the ligaments of the patient are strained, requiring a subsequent position correction of the patient.

A knee/elbow posture of the patient is required, for example, in spinal operations and rectal procedures. In this case, the patient is supported primarily on his knees and his upper torso. For this, the knees of the patient are placed on the shin plates, which are lowered with respect to the region of the patient bearing surface supporting the elbows and the upper torso. A secure and favorable supporting of the patient for the operation requires varying the spacing of the shin plates, without changing their parallel orientation to the region of the patient bearing surface supporting the upper torso.

From DE 102 53 906 A1 there is known a patient bearing surface having a variable-position pivot axis for the pivoting of a shin plate relative to a thigh plate. A four-bar linkage is provided here, from which the variable-position pivot axis is arranged at a spacing. As a result of the spacing of the pivot axis from the four-bar linkage, the detaining or releasing of the detention of the four-bar linkage and the pivot axis requires two activation steps, one for a control element for the four-bar linkage and one for the pivot axis. Furthermore, the arrangement of the leg plates does not allow for any knee/elbow posture in which the shin plates can be varied in their position while maintaining their orientation.

Moreover, in the known four-piece leg plates which are suitable for the knee/elbow posture it is not possible to pivot the leg plates outward by an angle greater than 100° relative to the longitudinal axis of the patient bearing surface. Therefore, the leg plates have to be removed during medical procedures during which the leg plates are temporarily unnecessary, which requires further work on the part of the technicians.

Thus, the leg plates can pivot about various joints and should be adjustable as much as possible optimally to the patient being supported. For this reason, the joints are at best continuously adjustable in design. Yet these have the drawback, on the one hand, of having to produce and switch large forces in order to generate the required frictional force, which may result in large activating forces. On the other hand, friction couplings are often subject to wear, so that the properties over the course of time become altered. For this reason, form-fitting couplings are readily used for such joint blocks. Often one uses here Hirth couplings or crown gear couplings. Yet these have the drawback that the individual teeth of the coupling element have to become large if one wishes to transmit large forces, whereas a sensitive small-angle adjustment requires a corresponding division resulting in very small teeth. A frequent compromise is achieved in that the diameter of the crown gear is increased so that one can design a sufficiently large number of teeth with adequate dimensions. But this takes up space and results in increased weight for the overall apparatus.

In all these supporting systems, no danger to the patient may occur at any time. This might happen, for example, if a leg drops down without control, or if the entire patient slips off the bearing surface, because the user accidentally opens a fixed position of the joint mechanism. Another danger might arise when leg plates which are arranged on motorized joint modules are moved individually and positioned one above the other. Since only a small portion of the patient is not covered by cloths during the operation, the control of these wrong positions is not always easy for the operator and it must be prevented as much as possible by the engineering.

Because of the many joints and the interface between leg plate and bearing surface, as well as thigh plate and shin plate, there are a multitude of control element. Now, it may happen that a user who would like to perform an adjustment of the leg plate reaches into the dimly lit region beneath the covering cloths of the OR table and activates a control element. But it should not happen that he or she accidentally activates the wrong control element, as this might have detrimental consequences and fatal consequences.

SUMMARY OF THE DISCLOSURE

A problem which various embodiments of the present disclosure propose to solve is to indicate a device with which the support surface segments of an operating table can be used in diversified manner for patients of different anatomy and can be easily adjusted, while preventing as much as possible wrong operations and uncontrolled movements of the support surface segments.

This problem is solved by an adjusting device for the positioning of support surface segments of an operating table according to the embodiments of the present disclosure, and for example with the features of claim 1. Advantageous modifications of the embodiments of the present disclosure are indicated in the dependent claims.

An example embodiment of the present disclosure relates to operating tables, and more specifically adjustment devices of operating tables. Certain embodiments of the present disclosure relate to an adjusting device for positioning at least one support surface segment of an operating table, the adjusting device comprising a four-bar linkage, by a base element of the operating table and a support surface segment of a patient bearing surface of the operating table are connected. The four-bar linkage has a first guide bar, which is connected at its first end to the base element so that it can pivot about a first pivot axis and at its second end to a first end of a coupler so that it can pivot about a second pivot axis parallel to the first pivot axis. Furthermore, the four-bar linkage has a second guide bar, which is connected at its first end to the base element so that it can pivot about a third pivot axis parallel to the first pivot axis and at its second end to the coupler so that it can pivot about a fourth pivot axis parallel to the first pivot axis.

In certain embodiments the support surface segment is connected to the four-bar linkage so that it can pivot about an axis of rotation of the four-bar linkage, the support surface segment can pivot relative to the first guide bar of the four-bar linkage about a variable-position pivot axis parallel to the first pivot axis. No rotary bearing arranged at a distance from the variable-position pivot axis is required for this to occur. The support surface segment can thereby be positioned easily, corresponding to the anatomy of the patient. The number of axes of rotation of the adjusting device could be reduced as compared to the prior art, so that the construction of the adjusting device becomes more compact and the adjusting of the support surface segments more easy.

In exemplary embodiments of the present disclosure, the four-bar linkage is designed as a parallelogram, so that the first guide bar and the second guide bar form two opposite parallel sides of the parallelogram and the coupler forms one of the other two parallel sides of the parallelogram.

It is especially advantageous when the adjusting device has a first arresting unit for locking a pivoting motion of the support surface segment about the second pivot axis relatively to the first guide bar or to the coupler. In this way, it is possible to simplify the arresting of the position of the support surface segment when only a pivoting about the first pivot axis is desired.

In an especially advantageous embodiment, the four-bar linkage makes possible a pivoting motion of the second pivot axis about the first pivot axis. Furthermore, the adjusting device has a second arresting unit for locking the pivoting motion of the second pivot axis about the first pivot axis. In this way, the pivoting motion of the second pivot axis about the first pivot axis can be blocked and therefore prevented. The pivoting of the support surface segment about the second pivot axis is also possible in the locked state of the second arresting unit, if the first arresting unit does not block this pivoting motion. This enables an easy positioning of the support surface segment with simple manipulation. Preferably the first arresting unit and the second arresting unit are arranged about the second pivot axis. Preferably the arresting units are arranged in a rotary bearing for the pivoting of the first guide bar relative to the coupler about the second axis of rotation, especially being arranged around the latter.

Moreover, it is advantageous for the first arresting unit to be in an unlocked state in a first activating position of an activating element, in which the pivoting motion of the support surface segment about the second pivot axis is enabled. Furthermore, the first arresting unit is in a locked state in a second activating position of the activating element, in which the pivoting motion of the support surface segment about the second pivot axis is blocked. In this way, the blocking of the pivoting motion of the support surface segment about the second pivot axis is possible in easy manner by a corresponding activating of the activating element. By providing an indicator on the activating element to indicate the state of arresting, a user can easily recognize, from the position of the indicator, whether the first arresting unit is in the locked or unlocked state.

It is especially advantageous for the second arresting unit to be in an unlocked state in the first activating position of the activating element, in which the pivoting motion of the second pivot axis about the first pivot axis is enabled. Furthermore, the second arresting unit is in a locked state in the second activating position of the activating element, in which the pivoting motion of the second pivot axis about the first pivot axis is blocked. In this way, both arresting units can be arrested at the same time by an activation of the activating element, which makes the use of the adjusting device much more easy.

Alternatively, it is advantageous for the second arresting unit to be in an unlocked state in the first and the second activating position of the activating element, in which the pivoting motion of the second pivot axis about the first pivot axis is enabled. Furthermore, the second arresting unit is in an unlocked state in a third activating position of the activating element, in which the pivoting motion of the second pivot axis about the first pivot axis is blocked. In this way, it is possible to arrest the pivoting motion of the support surface segment about the second pivot axis without at the same time arresting the pivoting motion of the second pivot axis about the first pivot axis. The arresting of the pivoting motion of the second pivot axis about the first pivot axis is possible as a result of a further activation of the activating element, making possible a simple operation of the adjusting device and requiring only one activating element.

In an advantageous alternative embodiment, the first arresting unit is in the unlocked state in the first activating position of the activating element and in the second activating position of the activating element, in which the pivoting motion of the support surface segment about the second pivot axis is enabled. Moreover, the first arresting unit is in the locked state in the third activating position of the activating element, in which the pivoting motion of the support surface segment about the second pivot axis is blocked. Furthermore, the second arresting unit is in the unlocked state in the first activating position of the activating element, in which the pivoting motion of the second pivot axis about the first pivot axis is enabled. In the second and the third activating position of the activating element, the second arresting unit is in the locked state, in which the pivoting motion of the second pivot axis about the first pivot axis is blocked. In this way, it is possible to arrest the pivoting motion of the second pivot axis about the first pivot axis without at the same time arresting the pivoting motion of the support surface segment about the second pivot axis. The arresting of the pivoting motion of the support surface segment about the second pivot axis is possible by a further activation of the activating element, making possible a simple operation of the adjusting device and requiring only one activating element.

In another alternative embodiment, the first arresting unit is in the unlocked state in the first and the second activating position of the activating element, in which the pivoting motion of the support surface segment about the second pivot axis is enabled. Furthermore, the first arresting unit is in the locked state in the third activating position of the activating element, in which the pivoting motion of the support surface segment about the second pivot axis is blocked. Moreover, in this embodiment, the second arresting unit is in the locked state in the second activating position of the activating element. In this way, it is possible to arrest the pivoting motion of the second pivot axis about the first pivot axis without at the same time arresting the pivoting motion of the support surface segment about the second pivot axis. The arresting of the pivoting motion of the support surface segment about the second pivot axis is possible by a further activation of the activating element, making possible a simple operation of the adjusting device and requiring only one activating element.

In one advantageous embodiment, the first arresting unit comprises a rotationally firm first locking element relative to the first guide bar or to the coupler. Furthermore, the support surface segment is firmly connected to a first engaging element. The first engaging element in the locked state of the first arresting unit stands in engagement with the first locking element. Furthermore, the first engaging element in the unlocked state does not stand in engagement with the first locking element. In this way, the pivoting of the support surface segment with respect to the first guide bar or the coupler of the four-bar linkage can be easily blocked and enabled. Furthermore, by an appropriate arresting, it is also possible to enable a coupling of the orientation of the support surface segment to the orientation of the first guide bar or the coupler, by which the support surface segment can be easily positioned favorably to the anatomy of the patient.

Especially advantageously, the second arresting unit has a second locking element which is rotationally firm with regard to the first guide bar. Furthermore, the coupler has a second engaging element firmly connected thereto. Hence, the second engaging element in the locked state of the arresting unit stands in engagement with the second locking element. Furthermore, the second engaging element in the unlocked state does not stand in engagement with the second locking element. In this way, a pivoting of the second pivot axis about the first pivot axis is easily blocked. Furthermore, the first arresting unit and the second arresting unit can thereby be locked independently of each other.

In one advantageous embodiment of the above explained configuration, a cylindrical through hole is formed in the first guide bar. The first locking element is arranged in the through hole and has a first side facing a first opening of the through hole, on which is formed a first gearing of the first locking element. Moreover, the first engaging element has a gearing fashioned complementary to the first gearing of the first locking element, by which the first engaging element in the locked state of the first arresting unit stands in engagement with the first locking element. Furthermore, the second locking element is arranged in the through hole and has a first side facing the second opening of the through hole, on which a first gearing of the second locking element is formed. Moreover, the second engaging element has a gearing fashioned complementary to the first gearing of the second locking element, by which the second engaging element in the locked state of the second arresting unit stands in engagement with the second locking element. In this way, the two arresting unites can be arranged compactly in the through hole and be in the locked state or the unlocked state at the same time or sequentially independent of each other. The through hole is formed preferably at the second end of the first guide bar. In this way, a simple engagement of the second arresting unit with the coupler can be achieved.

Moreover, it is advantageous for the first locking element and the second locking element to be arranged rotationally firm to the first guide bar about the longitudinal axis of the through hole. Furthermore, the first locking element and the second locking element are each arranged displaceably along the longitudinal axis of the through hole. This enables a simple construction of the arresting units. The locking elements can each be easily brought into engagement and released from engagement with the first engaging element or the second engaging element by a displacement of the locking elements.

In another advantageous embodiment, a gearing is formed in the wall of the through hole, whose tooth flanks are parallel to the longitudinal axis of the through hole. The first locking element and the second locking element are each cylindrical in configuration and each have a second gearing on their lateral surface which is complementary to the gearing of the through hole. The first locking element and the second locking element each stand in engagement with the first guide bar by its second gearing and are each movable along the longitudinal axis of the through hole. By providing gearings of such design, the first locking element and the second locking element can be easily displaced along the longitudinal axes of the through hole yet still be arranged rotationally firm to each other. The second gearings are preferably configured as a spur gear.

In one advantageous embodiment of the above explained configuration, the first arresting unit comprises a first shift element. The activating element is connected to a second shift element, which stands in engagement with the first shift element. Furthermore, the second shift element, upon a movement of the activating element from an activating position in which the first arresting unit is in the unlocked state into an activating position in which the first arresting unit is in the locked state, moves the first shift element along the longitudinal axis of the through hole from a first shift position of the first shift element into a second shift position of the first shift element. The gearing of the first locking element in the first shift position of the first shift element is arranged at a spacing from the gearing of the first engaging element, so that the first arresting unit is in the unlocked state. Furthermore, the first gearing of the first locking element, upon the movement of the first shift element from the first shift position to the second shift position, is moved along the longitudinal axis of the through hole and brought into engagement with the gearing of the first engaging element, so that the first arresting unit is then in the locked state. In this way, a movement of the first locking element is made possible easily by the movement of the activating element and the first locking element is brought into engagement with the first engaging element.

Moreover, it is advantageous for the second arresting unit to comprise a third shift element. Furthermore, the second shift element, upon a movement of the activating element from an activating position in which the second arresting unit is in the unlocked state into an activating position in which the second arresting unit is in the locked state, moves the third shift element along the longitudinal axis of the through hole from a first shift position of the third shift element to a second shift position of the third shift element. The first gearing of the second locking element in the first shift position of the third shift element is arranged at a spacing from the gearing of the second engaging element, so that the second arresting unit is in the unlocked state. Furthermore, the first gearing of the second locking element upon the movement of the third shift element from the first shift position to the second shift position is moved along the longitudinal axis of the through hole and brought into engagement with the gearing of the second engaging element, so that the second arresting unit is in the locked state. In this way, it is possible to bring the activating element into engagement with the first arresting unit and with the second arresting unit and to realize different locking states of the arresting units. The first arresting unit and the second arresting unit are each in the unlocked state in a first activating position of the activating element and each in the locked state in a third position of the activating element. In a second activating position of the activating element, either the first arresting unit or the second arresting unit is in the locked state.

Moreover, it is advantageous for the movement of the activating element from the activating position in which the first arresting unit is in the unlocked state to the activating position in which the first arresting unit is in the locked state to be a rotation of the activating element about the longitudinal axis of the through hole. Furthermore, it is advantageous for the second shift element to comprise a shaft firmly connected to the activating element, whose longitudinal axis runs along the longitudinal axis of the through hole, and a pin arranged transversely to the shaft and connected to the shaft. Furthermore, the first shift element may be fashioned as a first cam, whose cam track is arranged on the side facing the pin around the longitudinal axis of the through hole, the cam track having at least one inclined section with a pitch. The pin, during the movement of the activating element from the activating position in which the first arresting unit is in the unlocked state to the activating position in which the first arresting unit is in the locked state, moves along the inclined section of the cam track of the first cam. This enables an arresting of the first arresting unit by a rotation of the activating element in simple fashion. The necessary degree of rotation of the activating element and its direction of rotation may be easily established by a variation in the configuration of the first cam. Preferably, the first cam is configured so that the first arresting unit can be arrested by an eighth, a quarter, or a half turn of the activating element about the longitudinal axis of the through hole.

In one advantageous embodiment, the third shift element is fashioned as a second cam, whose cam track on the side facing the pin is arranged about the longitudinal axis of the through hole, wherein the cam track has at least one inclined section with a pitch. The first cam and the second cam are arranged relative to the pin so that the pin, during the movement of the activating element from the first activating position to the second activating position, is moved along the inclined section of the cam track of the first cam and along the inclined section of the cam track of the second cam. Alternatively, the pin during the movement of the activating element from the first activating position to the second activating position is moved along the inclined section of the cam track of the first cam and along a section of the cam track of the second cam without pitch, and during the movement of the activating element from the second activating position to the third activating position it is moved along a section of the cam track of the first cam without pitch and along the inclined section of the cam track of the second cam. In another alternative, the pin during the movement of the activating element from the first activating position to the second activating position is moved along a section of the cam track of the first cam without pitch and along the inclined section of the cam track of the second cam, and during the movement of the activating element from the second activating position to the third activating position it is moved along the inclined section of the cam track of the first cam and along a section of the cam track of the second cam without pitch. In this way, a simultaneous arresting of the first and the second arresting unit can be accomplished by rotating the activating element or a consecutive arresting of the arresting units can be accomplished by rotating the activating element into the second activating position and the third activating position. The activating positions will depend on the specific configuration of the first cam and the second cam and their relative arrangement to each other. The first cam and the second cam have sections without a pitch, lying in a plane running perpendicular to the longitudinal axis of the through hole. Preferably, the first cam and the second cam are configured such that the first arresting unit and the second arresting unit can be arrested each time by either an eighth, a quarter, or a half turn of the activating element about the longitudinal axis of the through hole.

Moreover, it is advantageous for a shaft to be present, which has a first outer thread with a first pitch and a second outer thread with a second pitch, wherein the first outer thread is arranged in a first region of the shaft and the second outer thread is arranged in a second region of the shaft around the longitudinal axis of the shaft and the directions of the first pitch and the second pitch are opposite to each other. The first locking element has an opening with an inner thread, which is formed complementary to the first outer thread and stands at least partly in engagement with the first outer thread. Furthermore, the second locking element has an opening with an inner thread, which is formed complementary to the second outer thread and stands at least partly in engagement with the second outer thread. The activating element is connected to the shaft and the movement of the activating element from the first activating position to the second activating position is a rotation of the activating element about the longitudinal axis of the through hole, whereby the shaft connected rotationally firmly to the activating element is rotated about its longitudinal axis. Preferably, the outer thread of the shaft and the inner thread of the locking elements are each a standard thread, a coarse thread, or in another sample embodiment a fine thread. For example, the pitches of the outer thread of the shaft and the inner thread of the locking elements are each configured such that the first arresting unit and the second arresting unit can be arrested each time by either an eighth, a quarter, or a half turn of the activating element about the longitudinal axis of the through hole.

Moreover, it is advantageous for the second shift element to comprise a shaft. The shaft has a first outer thread with a first pitch and a second outer thread with a second pitch, wherein the first outer thread is arranged in a first region of the shaft and the second outer thread is arranged in a second region of the shaft around the longitudinal axis of the shaft and the directions of the first pitch and the second pitch are opposite to each other. Moreover, the first shift element has an opening with an inner thread, which is formed complementary to the first outer thread and stands at least partly in engagement with the first outer thread. The third shift element has an opening with an inner thread, which is formed complementary to the second outer thread and stands at least partly in engagement with the second outer thread. Furthermore, the movement of the activating element from the first activating position to the second activating position is a rotation of the activating element about the longitudinal axis of the through hole, whereby the shaft connected rotationally firmly to the activating element is rotated about its longitudinal axis. Preferably, the outer thread of the shaft and the inner thread of the locking elements are each a standard thread, a coarse thread, or in another sample embodiment a fine thread. For example, the pitches of the outer thread of the shaft and the inner thread of the locking elements are each configured such that the first arresting unit and the second arresting unit can be arrested each time by either an eighth, a quarter, or a half turn of the activating element about the longitudinal axis of the through hole.

According to some embodiments, it may be provided that a combined arresting unit is provided, which comprises a coupling piece, which enables in a first shift position a pivoting motion of the support surface segment with the four-bar linkage about the second pivot axis and a pivoting motion of the second pivot axis about the first pivot axis, in a second shift position it blocks a pivoting motion of the second pivot axis about the first pivot axis, and in a third shift position it also additionally blocks a pivoting motion of the support surface segment about the second pivot axis relative to the first guide bar or the coupler. Thus, with the combined arresting unit, only may optionally arrest either the movement of the four-bar linkage, or the rotation of the support surface segment about the additional degree of freedom relative to the four-bar linkage, or both of these movements. The combined arresting unit thus takes on the function of the first and second arresting units of the above described embodiments.

Moreover, the adjusting device may comprise a connection element for the rotatable connection of the support surface segment to the four-bar linkage, and the coupling piece may be axially displaceable in the direction of the second pivot axis. Furthermore, it may be provided that the coupling piece comprises at least one external gearing, which may engage with an internal gearing of the first guide bar and/or the coupler and/or the connection element. By the engaging of the external gearing of the coupling piece with corresponding internal gearings on the first guide bar, the coupler and/or the connection element, a secure arresting of the corresponding components relative to the coupling piece can be accomplished.

Furthermore, it may be provided that the coupling piece moreover comprises at least one centering extension, on which the first guide bar and/or the coupler and/or the connection element can turn freely. As a result of the use of the centering extension, the first guide bar, the coupler and the connection element may each be held exactly centered in the rotary bearing, even when some or all of these components are not blocked by the arresting unit. A sample configuration of the centering extension is a cylindrical shape. However, other geometries are also conceivable, in which the centering extension comes to lie inside the lateral surface of the tooth tip circle of the internal gearing. Accordingly, a design may also be configured such that only a few, such as two or three regions of the lateral surface of the centering extension comes to lie with the cylinder surface of the maximum feasible centering extension.

Furthermore, at least one axial marginal region of the external gearing of the coupling piece may be configured such that in this marginal region the side walls of neighboring teeth are inclined relative to each other so that funnel-shaped interstices are formed between neighboring teeth. This can ensure, during an axial displacement of the coupling piece, that the teeth of the corresponding internal gearing with which the external gearing engages can enter into the funnel-shaped interstices each time, without the coupling piece blocking inside the internal gearing of the first guide bar, the coupler or the connection element.

A spring-loaded detent element may be provided on the coupling piece, which engages with the internal gearing of the first guide bar and/or the coupler and/or the connection element. The detent element makes sure that the external gearing of the coupling piece is always oriented to fit the internal gearing of the other components.

The respective internal gearings of the first guide bar, the coupler and the connection element may be arranged one after the other in any desired sequence in the axial direction. The coupling piece may be brought into engagement arbitrarily with one, two or three of the internal gearings. When the coupling piece prevents the relative movement of the first guide bar and the coupler, the four-bar linkage is arrested, and when the coupling piece prevents the relative movement of the connection element relative to the first guide bar or to the coupler, the rotation of the support surface segment about the second pivot axis is arrested.

According to another embodiment it may be provided that the support surface segment comprises a first partial segment and a second partial segment, which can pivot relative to each other about a further pivot axis, wherein the further pivot axis runs substantially perpendicular to the first and second pivot axis. A rotation locking device may block, in a given angle range of the pivoting about the further pivot axis, a rotation of the support surface segment about the second pivot axis in at least one direction. The partial segments may be, for example, bearing surfaces for a shin and a thigh of a patient. When the shin plate and the thigh plate are oriented perpendicular to each other for a kneeling posture of the patient, an unintentional rotation of the shin plate is blocked by the rotation locking device, so that one can prevent the patient from falling down. It may be provided that, for example, only an outward rotation of the shin plate is blocked, since this is the more likely direction of rotation given the distribution of forces of a patient kneeling on the shin plate.

The rotation locking device may comprise a contact element, which is firmly connected to the second partial segment. Moreover, the rotation locking device may comprise an end stop, which is firmly connected to the coupler or to the first guide bar of the four-bar linkage. During an adjustment of the second partial segment relative to the first partial segment about the further pivot axis, the contact element is then brought into contact with the projection, and thus blocks a pivoting of the support surface segment about the second pivot axis in one direction.

According to certain embodiments, the contact element may comprise an oblong projection.

Furthermore, it may be provided that the rotation locking device becomes active in an angle range of 75° to 90° of the adjustment about the further pivot axis and blocks a pivoting of the support surface segment about the second pivot axis. In this way, even when the shin plate is pivoted by somewhat less than 90° relative to the thigh plate, a blocking of the undesirable outward rotation of the shin plate about the second pivot axis is already prevented.

In a locked state of the rotation locking device, the second pivot axis can furthermore be pivoted by the four-bar linkage about the first pivot axis, so that an adjustment of the position of the support surface segment by the four-bar linkage is furthermore possible.

Further features and benefits of the invention will emerge from the following description, which further explains the invention with the aid of sample embodiments in conjunction with the appended figures.

BRIEF DESCRIPTION OF THE DRAWINGS

FIG. 15 relates to a front view of the adjusting device with a shin plate arranged orthogonally to a thigh plate, FIG. 16 relates to a cross section representation along sectioning line C-C of FIG. 15;

DETAILED DESCRIPTION

For illustrative purposes, the principles of the present invention are described by referencing various exemplary embodiments. Although certain embodiments of the invention are specifically described herein, one of ordinary skill in the art will readily recognize that the same principles are equally applicable to and can be employed in other systems and methods. Before explaining the disclosed embodiments of the present invention in detail, it is to be understood that the invention is not limited in its application to the details of any particular embodiment shown. Additionally, the terminology used herein is for the purpose of description and not of limitation. It must be noted that as used herein and in the appended claims, the singular forms "a", "an", and "the" include plural references unless the context clearly dictates otherwise. As well, the terms "a" (or "an"), "one or more" and "at least one" can be used interchangeably herein. It is also to be noted that the terms "comprising," "including," "composed of," and "having" can be used interchangeably.

Figure 1:
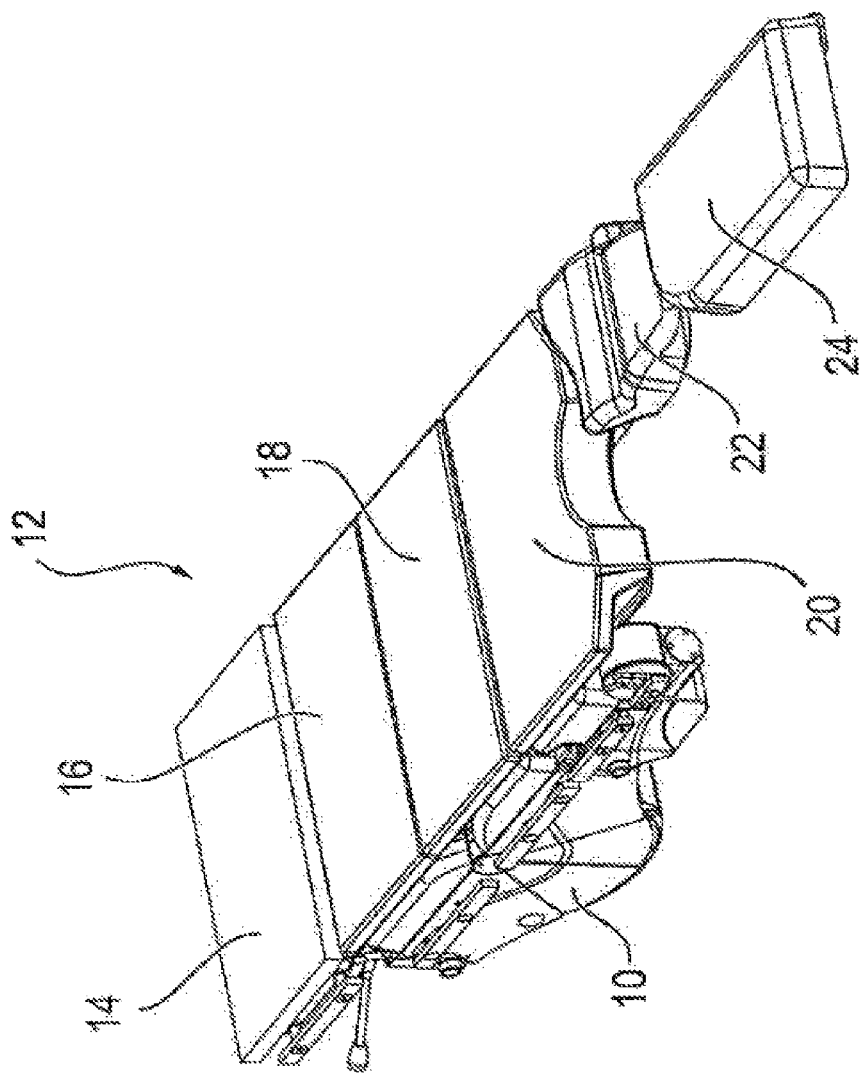
FIG. 1 relates to a perspective representation of a patient bearing surface which can be connected to a column of an operation table, not shown.

FIG. 1 shows a perspective representation of a patient bearing surface 12 fastened to an interface 10 of an operation table, not shown, which can be used in different ways for operations, especially those requiring a knee/elbow posture of a patient. The patient bearing surface 12 has a head plate 14, a back plate 16, a torso plate 18, a joint module plate 20, a thigh plate 22 and a shin plate 24. The shin plate 24 and the thigh plate 22 are connected to each other across an adjusting device 26 and connected to the joint module plate 20. The pelvis of the patient is arranged on the joint module plate 20 when the patient is in a supine position.

Figure 2:
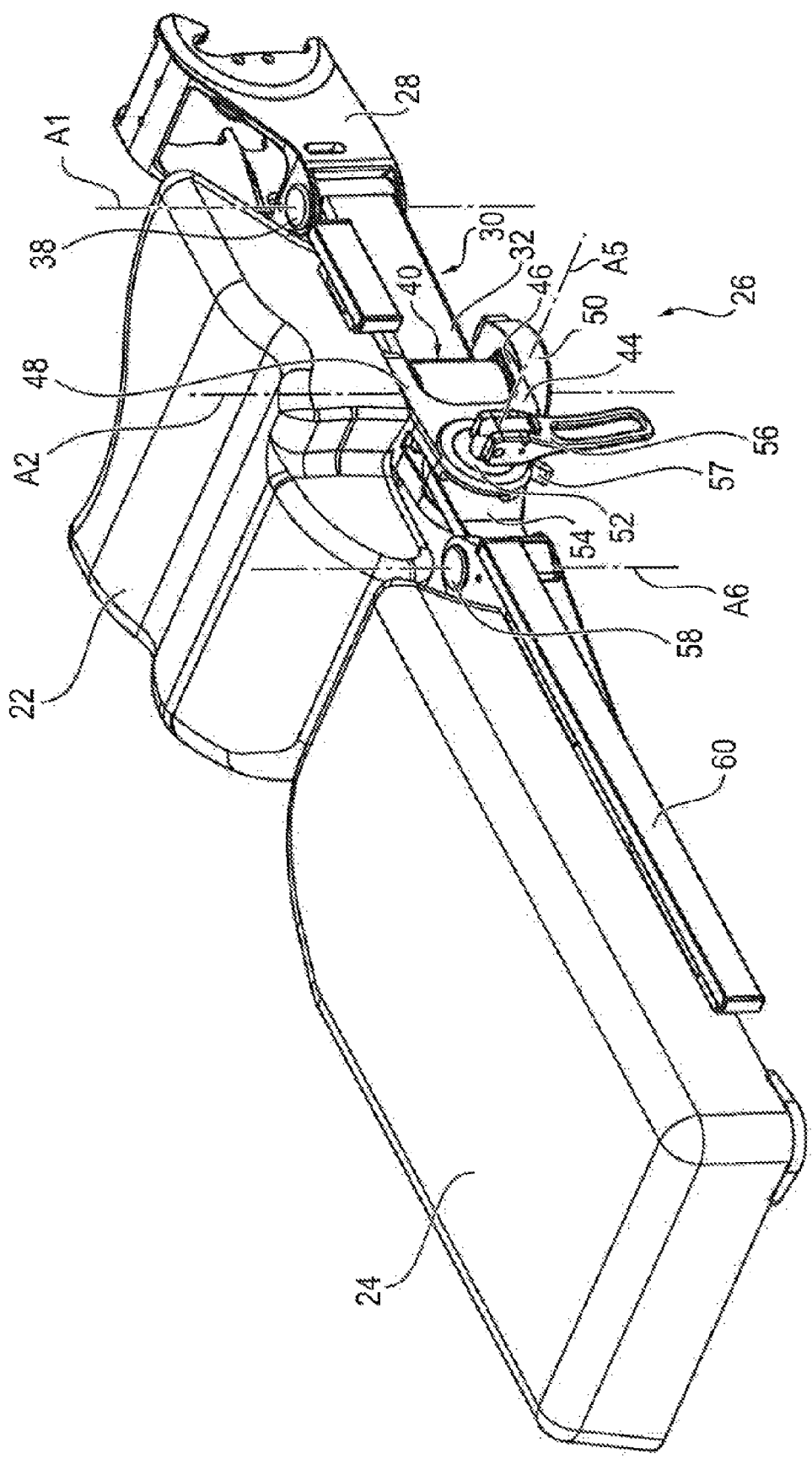
FIG. 2 relates to a perspective representation of an adjusting device with a thigh plate and a shin plate of the patient bearing surface of FIG. 1.

FIG. 2 shows a perspective representation of the adjusting device 26 with the thigh plate 22 and the shin plate 24 of the patient bearing surface 12 of FIG. 1. The adjusting device 26 comprises a fastening element 28 and a four-bar linkage 30, which are shown separately in a perspective representation in FIG. 3.

The four-bar linkage 30 has a first guide bar 32, a second guide bar 34, a coupler 36 and a base element, where the fastening element 28 serves as the base element of the four-bar linkage 30. A first end of the first guide bar 32 is connected by a first rotary bearing 38 about a first pivot axis A1 to the fastening element 28 in swiveling manner. The first guide bar 32 is connected at its second end by a second rotary bearing 40 to a first end of the coupler 36 and able to swivel about a second pivot axis A2 parallel to the first pivot axis A1. Furthermore, the second guide bar 34 arranged parallel to the first guide bar 32 is connected at its first end by a third rotary bearing 42 to the fastening element 28 and is able to swivel about a third pivot axis A3 parallel to the first pivot axis A1, and at its second end by a fourth rotary bearing 43 to a second end of the coupler 36, opposite the first end of the coupler 36, and able to swivel about a fourth pivot axis A4 parallel to the first pivot axis A1.

Moreover, the first guide bar 32, as shown in FIG. 2, is connected at its second end to a fork-shaped first connection element 44 of the adjusting device 26 and able to swivel about the second pivot axis A2. The first connection element 44 has a first fork arm 46 and a second fork arm 48, which grasp the second end of the first guide bar 32 and the first end of the coupler 36. Moreover, the thigh plate 22 is firmly connected to the second fork arm 48. Furthermore, the first fork arm 46 and the second fork arm 48 are able to swivel relative to the coupler 36 about the second pivot axis A2, so that the first connection element 44 can be swiveled relative to the first guide bar 32 and relative to the coupler 36.

Figure 8:
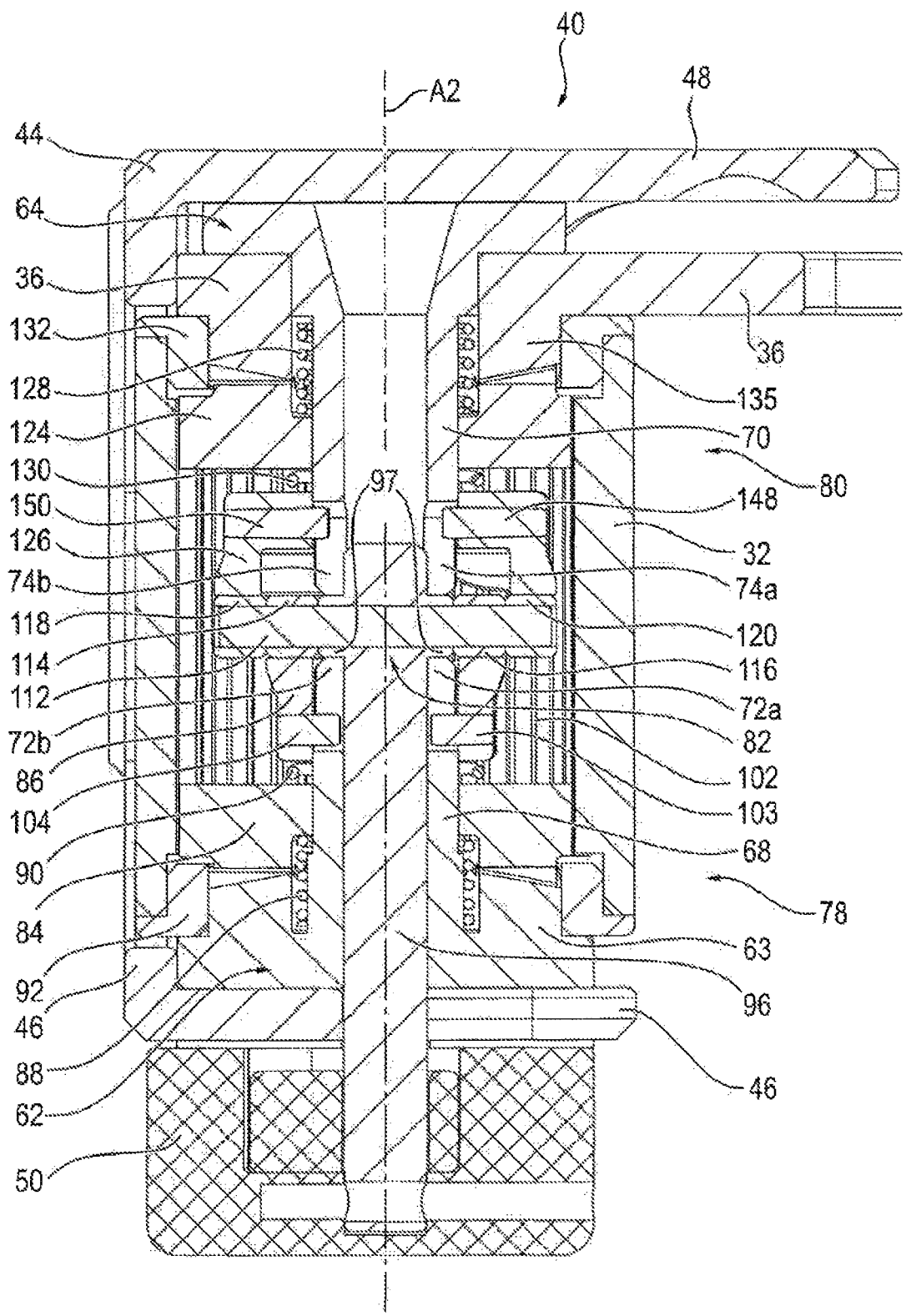
FIG. 8 relates to a cross section representation of the adjusting device along sectioning line A-A of FIG. 7, in which elements of the first arresting unit, the second arresting unit and the activating element are visible.

Moreover, the adjusting device 26 has an activating element 50, represented in FIG. 2, which is connected to a first arresting unit integrated in the second rotary bearing 40 and a second arresting unit of the adjusting device 26, integrated in the second rotary bearing 40. The first arresting unit is indicated in FIG. 8 by the reference 78 and the second arresting unit by the reference 80. The activating element 50 is able to rotate with respect to the first connection element 44 and also with respect to the first guide bar 32 about the pivot axis A2. The first connection element 44 is connected by a fifth rotary bearing 52 to a second connection element 54 of the adjusting device 26 and able to swivel about a fifth pivot axis A5. The fifth pivot axis A5 is orthogonally skewed from the second pivot axis A2. The fifth rotary bearing 52 comprises a quick clamping device 56, which optionally locks or releases the fifth rotary bearing 52.

Figure 17:
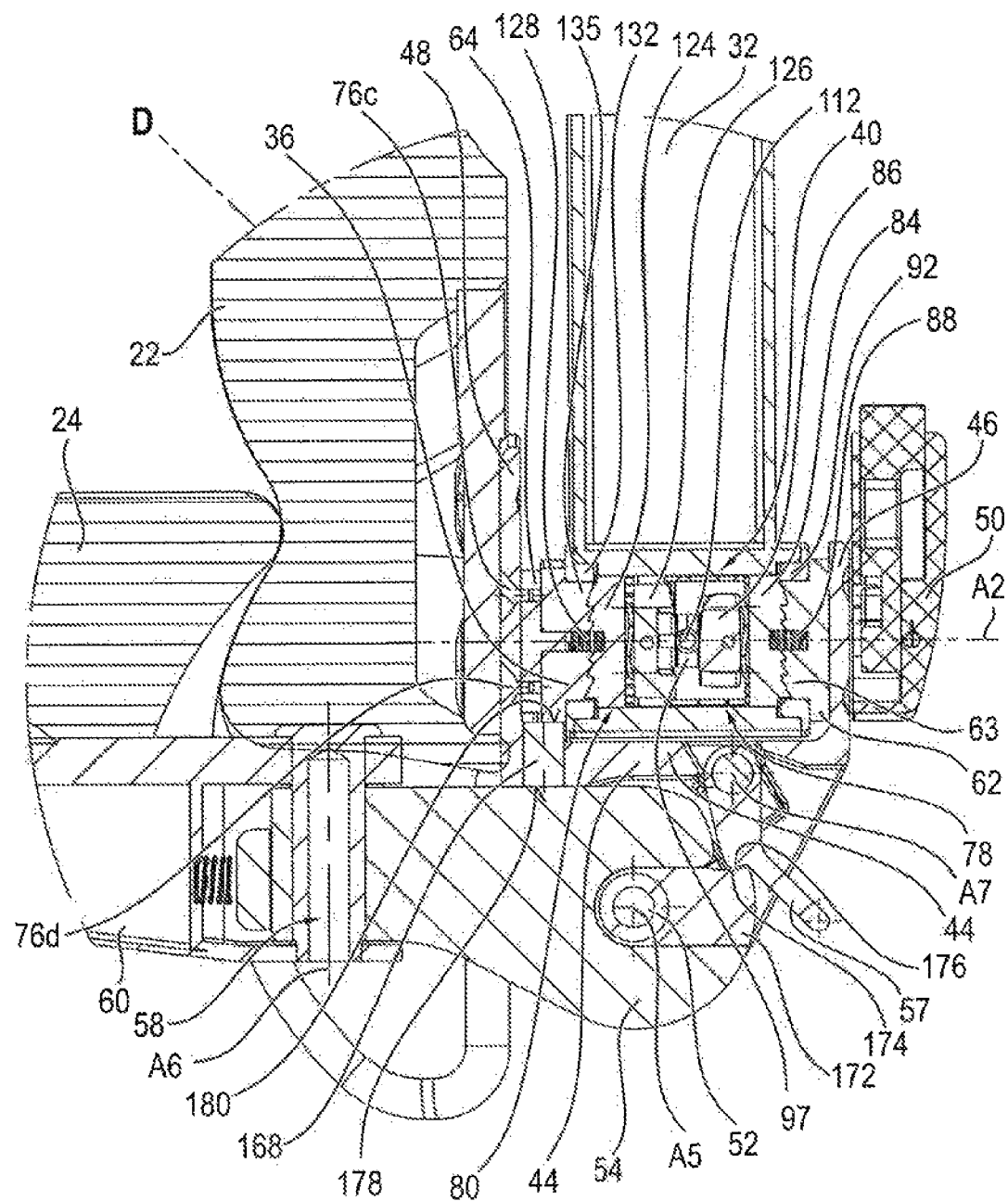
FIG. 17 relates to an enlarged representation of region D in FIG. 16.

The quick clamping device 56 comprises an arresting lever 57 which, in a position of the thigh plate 22 swiveled about the fifth pivot axis A5 relative to the shin plate 24 as represented in FIG. 17, has to be activated for a swiveling of the second connection element 54 about the fifth pivot axis A5 in addition to the loosening of the quick clamping device 56. The function and design of the arresting lever 57 shall be explained more closely below, especially in connection with FIG. 17.

The adjusting device 26 comprises a rail 60, which is connected by a sixth rotary bearing 58 to the second connection element 54 and able to swivel about a sixth pivot axis A6 and which can be arrested in a desired angular position. The shin plate 24 is firmly connected to the rail 60. An alternative configuration differs from this by a fixed connection of the rail 60 to the second connection element 54.

Figure 3:
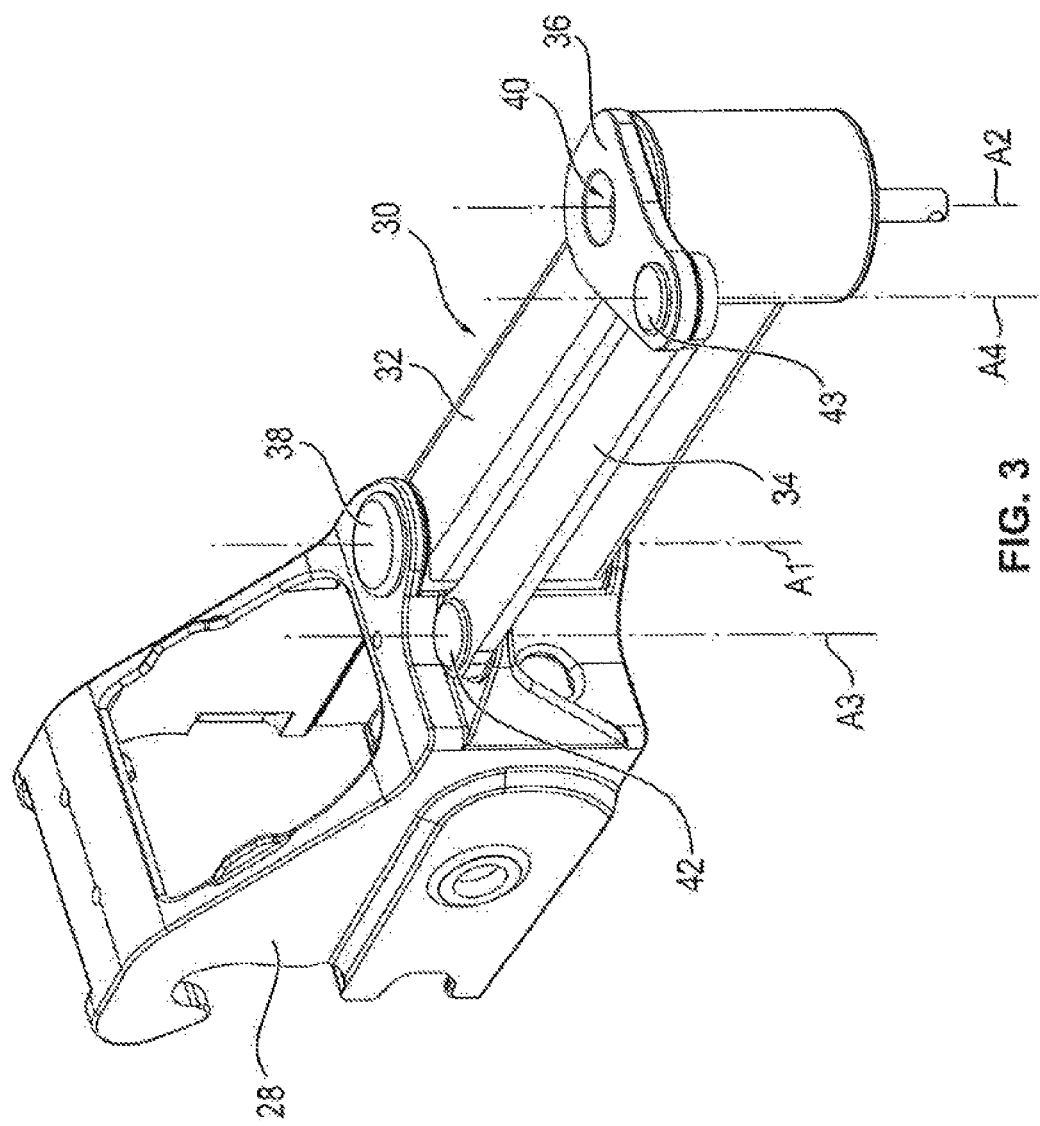
FIG. 3 relates to a perspective representation of a fastening element and a four-bar linkage of the adjusting device of FIG. 2.
Figure 4:
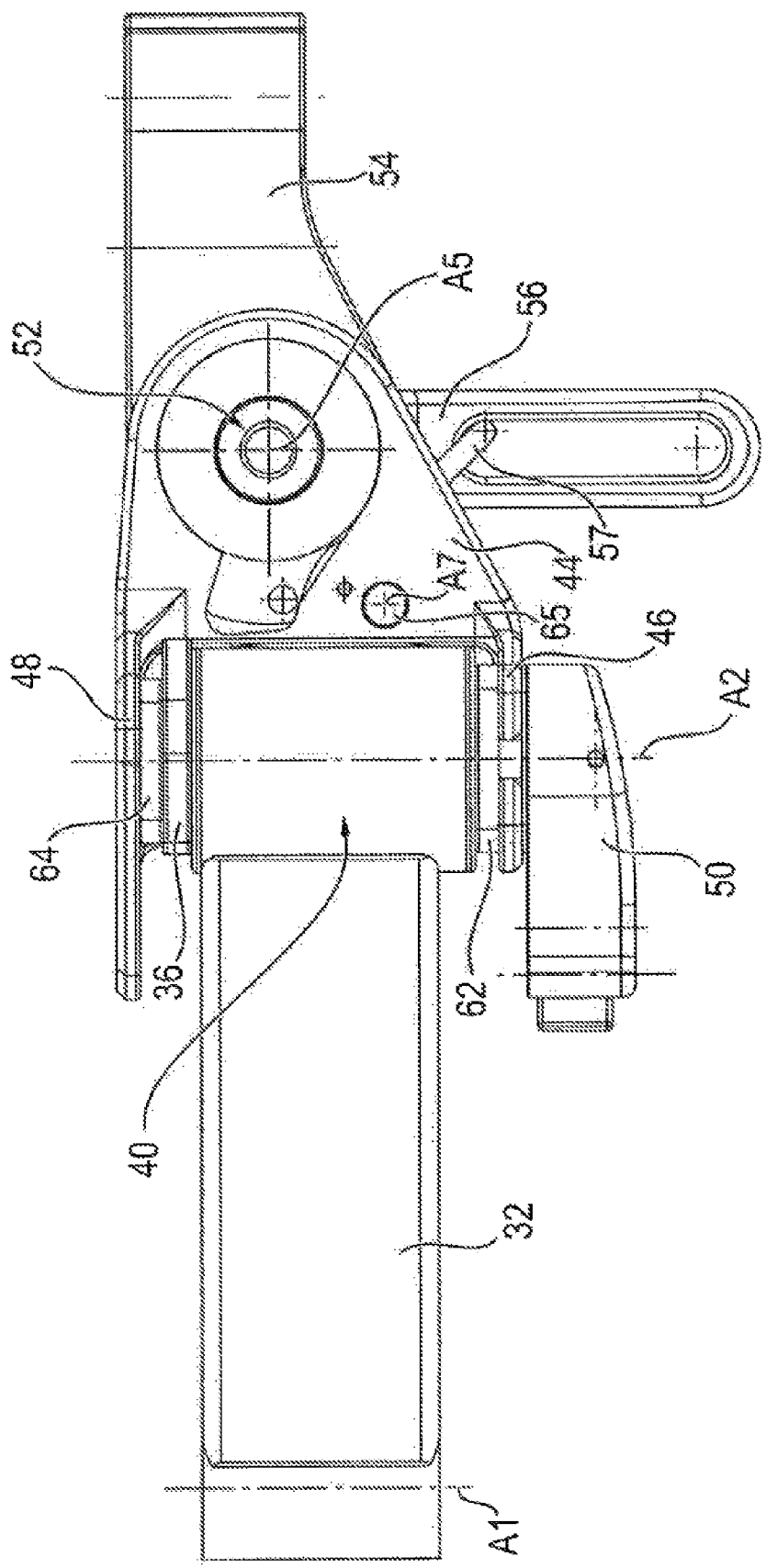
FIG. 4 relates to a side view of the adjusting device of FIGS. 2 and 3.

FIG. 4 shows a side view of the adjusting device 26 of FIGS. 2 and 3, in which the first guide bar 32, the first connection element 44 and the second connection element 54 of the adjusting device 26 are represented. The first fork arm 46 of the first connection element 44 is firmly connected to a first joint element 62 and the second fork arm 48 to a second joint element 64. The second joint element 64 is arranged so that it can swivel about the second pivot axis A2 relative to the coupler 36. The arresting lever 57 is mounted so that it can swivel about a seventh pivot axis A7 about a pin 65 connected to the first connection element 44.

Figure 5:
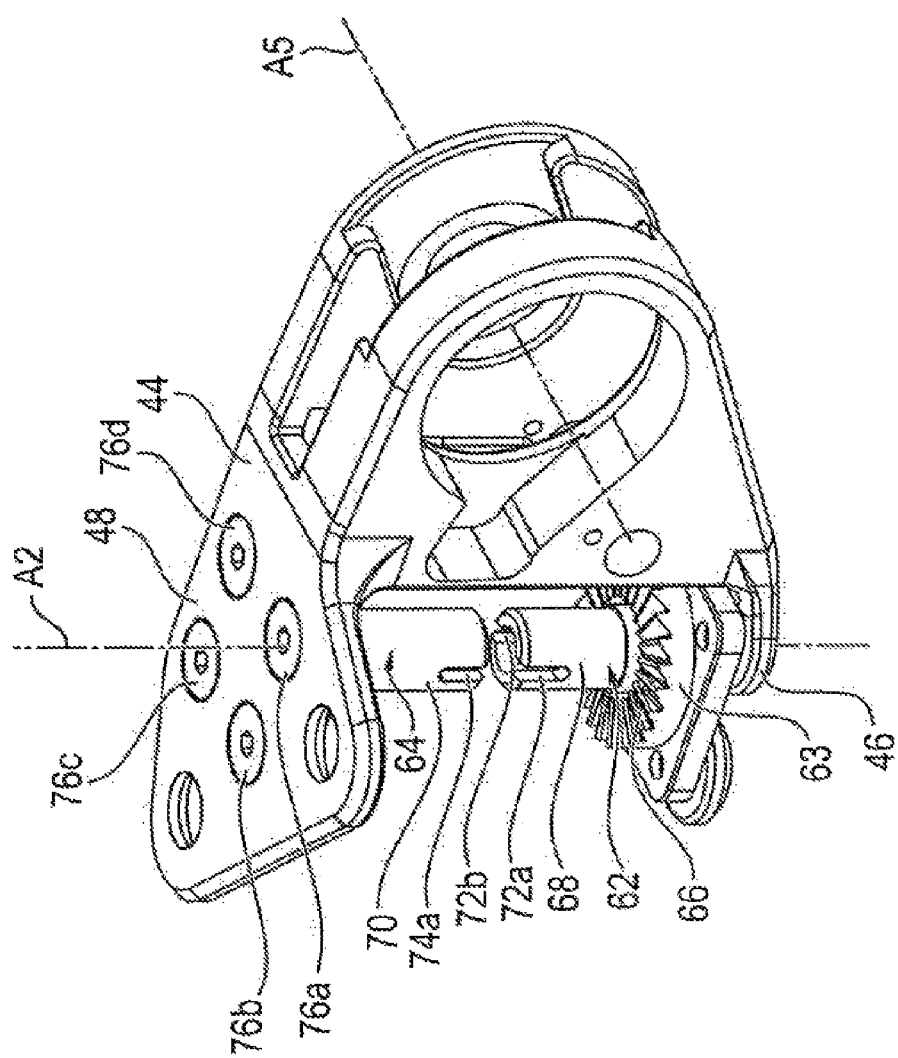
FIG. 5 relates to a perspective representation of elements for the pivoting of a support surface segment relative to the four-bar linkage and elements for blocking a pivoting motion of the support surface segment and the four-bar linkage.

FIG. 5 shows a perspective representation of the first connection element 44 together with the first joint element 62 and the second joint element 64, each being firmly connected to the first connection element 44 by screws, of which the screws 76a to 76d are visible, connecting the second joint element 64 to the second fork arm 48 in FIG. 5.

The first joint element 62 has a bearing journal 68 and the second joint element 64 has a bearing journal 70, whose longitudinal axes each coincide with the second pivot axis A2 and each of which has a cylindrical through hole formed concentrically about the second pivot axis A2. The wall of the through hole formed in the bearing journal 68 has a first recess 72a and a second recess 72b. The end of the wall of the through hole formed in the bearing journal 70 which is opposite the recesses 72a and 72b has two recesses opposite the recesses of the bearing journal 68 of the first joint element 62, of which the first recess 74a is shown in FIG. 5 and the second recess 74b in FIG. 8. The first joint element 62 has a bearing and engaging element 63 formed as a crown wheel at the side opposite the second fork arm 48, having a gearing 66 formed at its end face and serving as the first engaging element.

Figure 6:
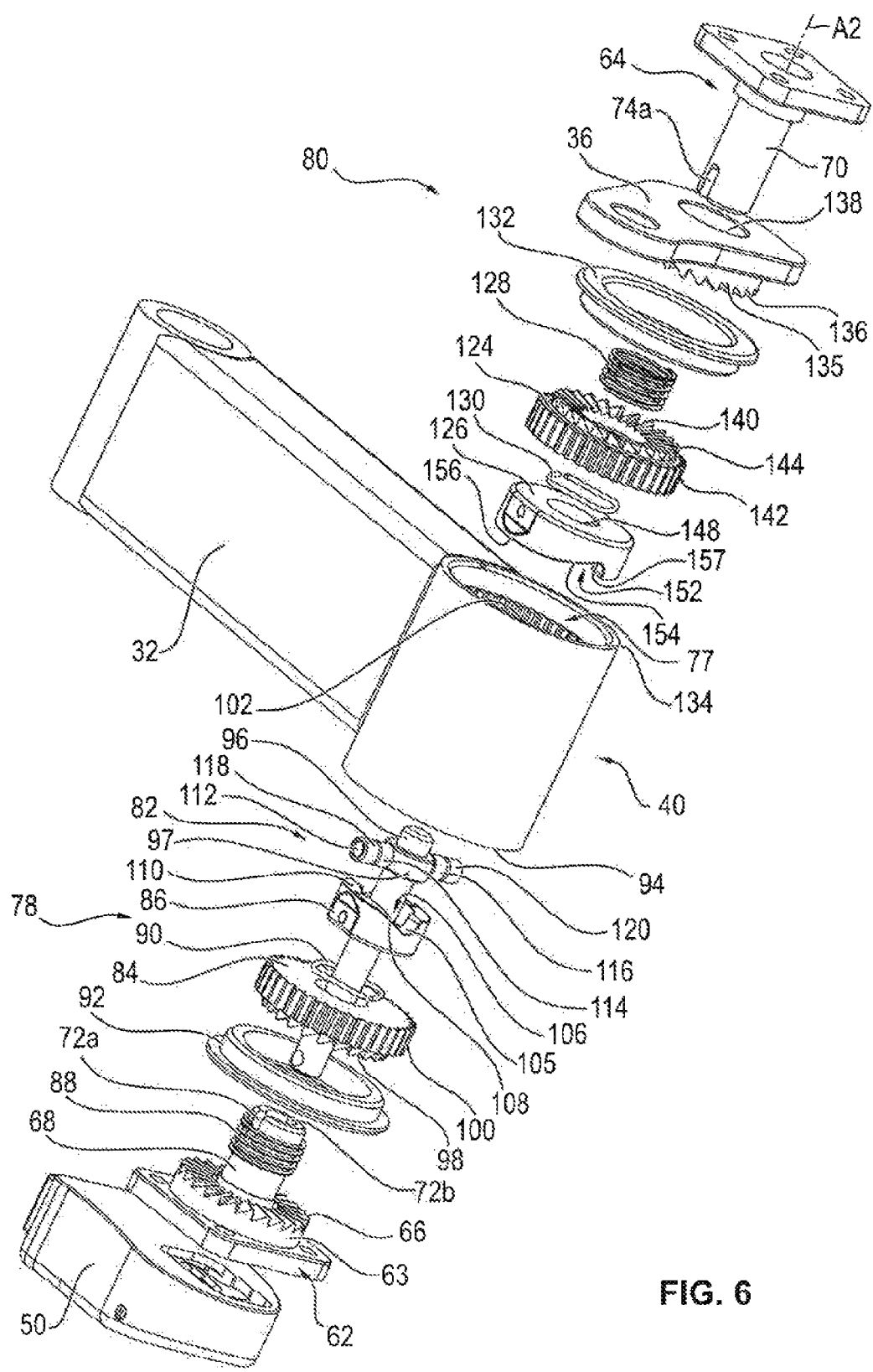
FIG. 6 relates to, an exploded representation of a first guide bar of the four-bar linkage and elements of a first and second arresting unit in operative connection with the first guide bar as well as a shift element and an activating element.
Figure 7:
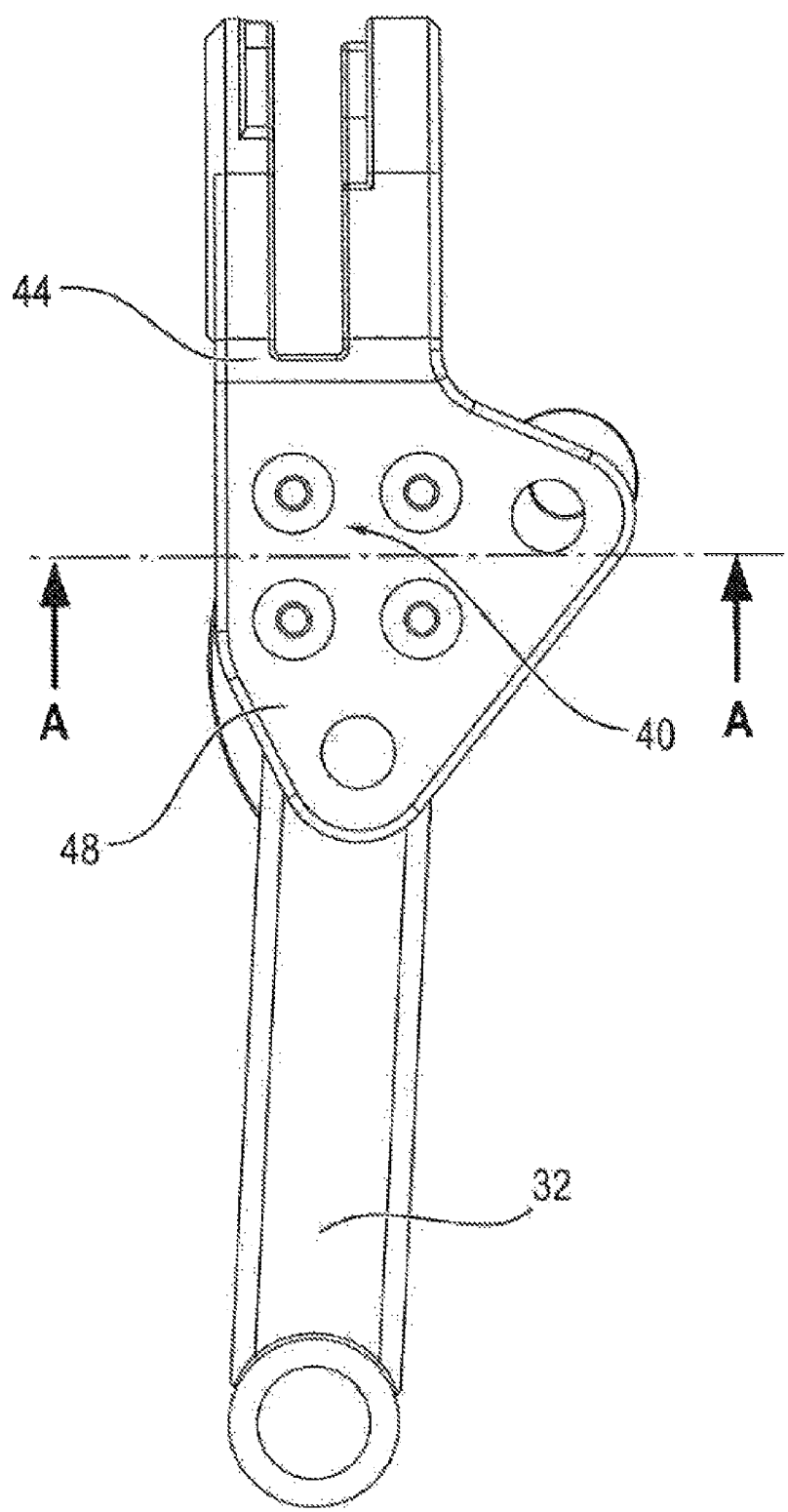
FIG. 7 relates to a top view of elements of the adjusting device.

FIG. 6 shows an exploded representation of the first guide bar 32 of the four-bar linkage 30 and elements of the first and second arresting unit 78, 80, operatively connected to the first guide bar 32, as well as a shift element 82. FIG. 7 shows a top view of the first guide bar 32 and the first connection element 44. FIG. 8 shows a cross section representation of the adjusting device 26 along the sectioning line A-A of FIG. 7, representing elements of the first arresting unit 78 and the second arresting unit 80.

As shown in FIG. 6, the second rotary bearing 40 comprises a cylindrical through hole 77 formed in the second end of the first guide bar 32, through whose longitudinal axis the second pivot axis A2 runs.

The first arresting unit 78 comprises the first joint element 62, a first locking element 84, a first cam 86, a first helical compression spring 88, a first zigzag spring 90 and a first bearing ring 92. The second arresting unit 80, arranged at a distance along the second pivot axis A2 from the first arresting unit 78, comprises the second joint element 64, the coupler 36, a second locking element 124, a second cam 126, a second helical compression spring 128, a second zigzag spring 130 and a second bearing ring 132.

The shift element 82 comprises a shaft 96, an activating pin 112, a first roller 114, a second roller 116, a third roller 118 and a fourth roller 120, the rollers 114, 116, 118 and 120 each being ring-shaped and each enclosing a segment of the activating pin 112. The shaft 96 is led through the through hole of the first joint element 62 and mounted therein, able to swivel about the second pivot axis A2. The shaft 96 is connected at its first end to the activating element 50 in rotationally firm manner. Moreover, a projection 97 is formed on the second end of the shaft 96, opposite the first end of the shaft 96, which is arranged between the first joint element 62 and the second joint element 64 and which axially supports the shaft 96.

As is shown in FIG. 8, the first bearing ring 92 makes contact by a region of its lateral surface with the wall of the through hole 77 at its first opening 94. The bearing and engaging element 63 of the first joint element 62 is arranged inside the bearing ring 92 and sliding relative to it. Moreover, in the through hole 77 there is arranged a ring-shaped first locking element 84 concentrically around the second pivot axis A2. The bearing journal 68 of the first joint element 62 is led through the first locking element 84 on the inside and able to swivel relative to it. The first locking element 84 has a serration 100 like a spur gear on its outer lateral surface. The serration 100 stands in engagement with a complementary serration 102 formed on the inner wall of the through hole 77, whose tooth edges are oriented parallel to the second pivot axis A2.

Moreover, the first locking element 84 has, at its end face opposite the gearing 66 of the first joint element 62, a gearing 98 formed complementary to the gearing 66 of the first joint element 62. The gearings 66 and 98 intermesh with each other in a locked state of the first arresting unit 78, shown in FIG. 8, so that the first joint element 62 and the first locking element 84 are then joined firmly in rotation.

Arranged around the bearing journal 68 of the first joint element 62 is a first helical compression spring 88. The first helical compression spring 88 is biased between the first joint element 62 and the first locking element 84, so that the spring force of the first helical compression spring 88 forces together the first joint element 62 and the first locking element 84 along the second pivot axis A2.

At a distance from the first locking element 84, the first ring-shaped cam 86 is arranged around the bearing journal 68 and connected in resilient manner to the first locking element 84 by the first zigzag spring 90 arranged between the first locking element 84 and the first cam 86 so that the first zigzag spring 90 forces together the first cam 86 and the first locking element 84 along the second pivot axis A2.

The first cam 86 is arranged rotationally firm yet able to be displaced relative to the bearing journal 68 in the direction of the second pivot axis A2 by a first pin 103 protruding into the first recess 72a of the bearing journal 68 and a second pin 104 protruding into the second recess 72b of the bearing journal 68.

As is shown in FIG. 6, the first cam 86 has a cam section 106 arranged about the shaft 96 on its side facing away from the first locking element 84, with a first depression 105, a first pitch 108 and a first pitchless region 110. The cam section 106 is also known as a cam track. Upon rotation of the activating element 50, the shift element 82 is turned so that the rollers 114 and 116 arranged around the activating pin 112 are moved along the cam track 106. The rollers 114, 116, 118 and 120 are each mounted rotationally on the activating pin 112.

As shown in FIG. 8, the second bearing ring 132 is arranged at a second opening 134 of the through hole 77 of the first guide bar 32. On the inside of the second bearing ring 132 there is arranged a cylindrical journal 135, connected rotationally firmly to the coupler 36, by which the coupler 36 can rotate via the bearing ring 132 about the pivot axis A2 relative to the first guide bar 32. At the end face of the journal 135, a gearing 136 is arranged concentrically about the second pivot axis A2. The journal 135 with the gearing 136 form a second engaging element. The coupler 36 and the journal 135 have a circular through hole 138 formed concentrically around the second pivot axis A2, through which the bearing journal 70 of the second joint element 64 is led and about which the second pivot axis A2 can swivel.

Moreover, the bearing journal 70 is led through a through hole 140 of the second locking element 124, formed concentrically about the second pivot axis A2, so that the second locking element 124 can be displaced relative to the bearing journal 70 in the direction of the second pivot axis A2. The second locking element 124 is ring-shaped and has on its outer lateral surface a serration 142 which is formed complementary to the serration 102 formed on the inside of the through hole 77 and standing in engagement with the latter. In this way, the second locking element 124 is rotationally firm to the first guide bar 32.

Moreover, the second locking element 124 has a gearing 144 opposite the gearing 136 of the journal 135 of the coupler 36, which is complementary to the gearing 136. In a locked state of the second arresting unit 80, shown in FIG. 8, the second locking element 124 is connected rotationally firm to the coupler 36 by the engaging gearings 136 and 144.

Around the bearing journal 70 of the second joint element 64 there is arranged a second helical compression spring 128. The second helical compression spring 128 is biased between the second joint element 64 and the second locking element 124, so that the spring force of the second helical compression spring 128 forces together the second joint element 64 and the second locking element 124 along the second pivot axis A2.

At a distance from the second locking element 124, the second ring-shaped cam 126 is arranged around the bearing journal 70 and connected in resilient manner to the second locking element 124 by the second zigzag spring 130 arranged between the second locking element 124 and the second cam 126 so that the second zigzag spring 130 forces together the second cam 126 and the second locking element 124 along the second pivot axis A2.

The second cam 126 is arranged rotationally firm yet able to be displaced relative to the bearing journal 70 in the direction of the second pivot axis A2 by a first pin 148 protruding into the first recess 74a of the bearing journal 70 and a second pin 150 protruding into the second recess 74b of the bearing journal 70.

The second cam 126 engaging with the bearing journal 70 has a cam section 152 arranged about the second pivot axis A2 on its side facing the activating pin 112 of the shift element 82, also known as a cam track. The cam track 152 has a first depression 157, a first pitch 154 and a first pitchless region 156. As is shown in FIG. 8, the third roller 118 and the fourth roller 120 contact the cam track 152, against which they roll during a relative movement.

Figure 9:
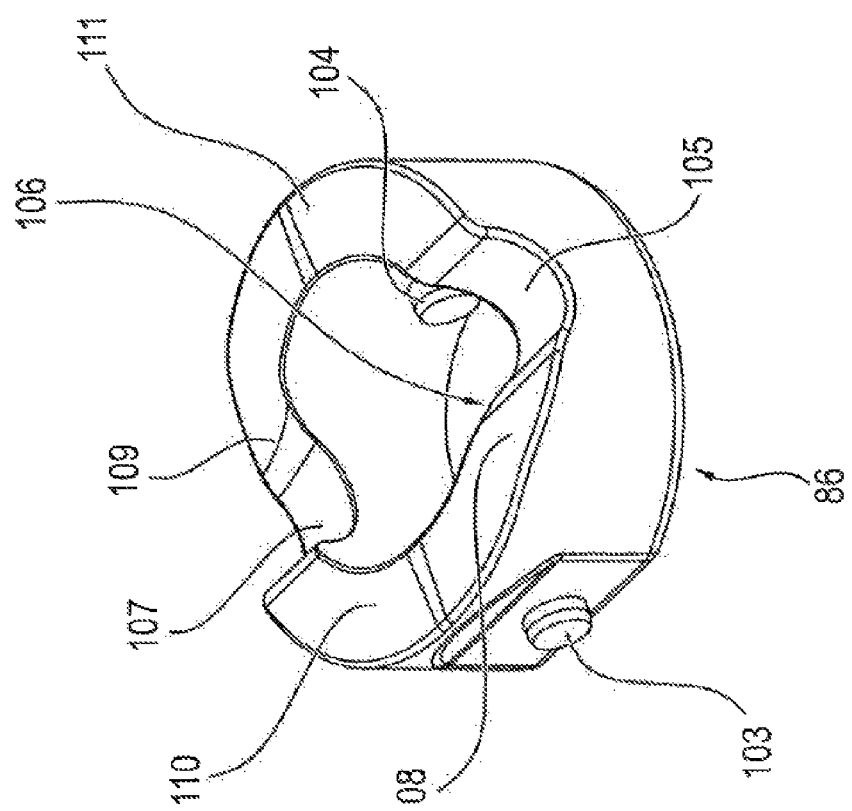
FIG. 9 relates to a perspective representation of a cam of the first arresting unit.

FIG. 9 shows a perspective representation of a first cam 86 of the first arresting unit 78. The cam track 106 of the first cam 86, besides the already mentioned first depression 105, the first pitch 108 and the first pitchless region 110, has a second depression 107, a second pitch 109 and a second pitchless region 111, each of them being arranged axially symmetrical to the first depression 105, the first pitch 108 and the first pitchless region 110 with respect to the longitudinal axis of the first cam 86, coinciding with the second pivot axis A2. The second depression 107 is situated at the base point of the second pitch 109.

Figure 10:
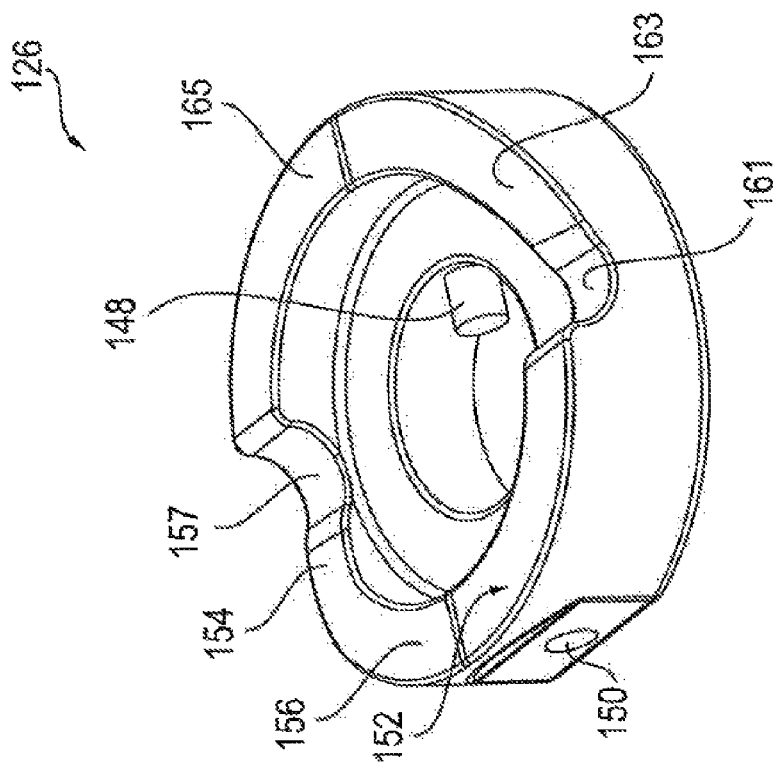
FIG. 10 relates to a perspective representation of a cam of the second arresting unit.

FIG. 10 shows a perspective representation of the second cam 126. The cam track 152 of the second cam 126, like the cam track 106 of the first cam 86, has a second depression 161, a second pitch 163 and a second pitchless region 165, each of them being axially symmetrical to the first depression 157, the first pitch 154 and the first pitchless region 156 relative to the second pivot axis A2.

Figure 11:
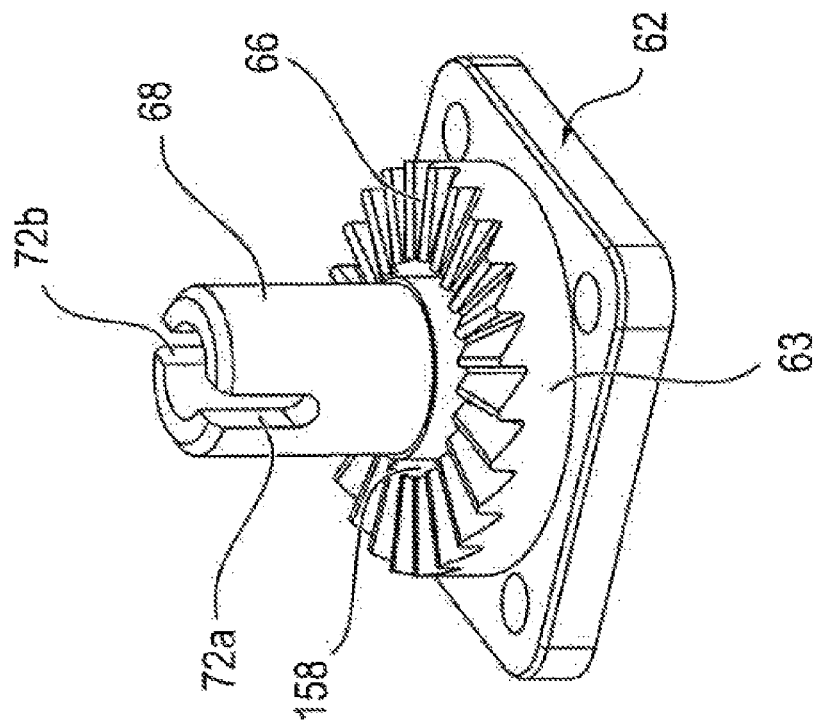
FIG. 11 relates to a perspective representation of a joint element of the first arresting unit.

FIG. 11 shows a perspective representation of the first joint element 62. Between the bearing journal 68 and the bearing and engaging element 63 with the gearing 66 there is formed a gap 158, in which is arranged a first end of the first helical compression spring 88.

Figure 12:
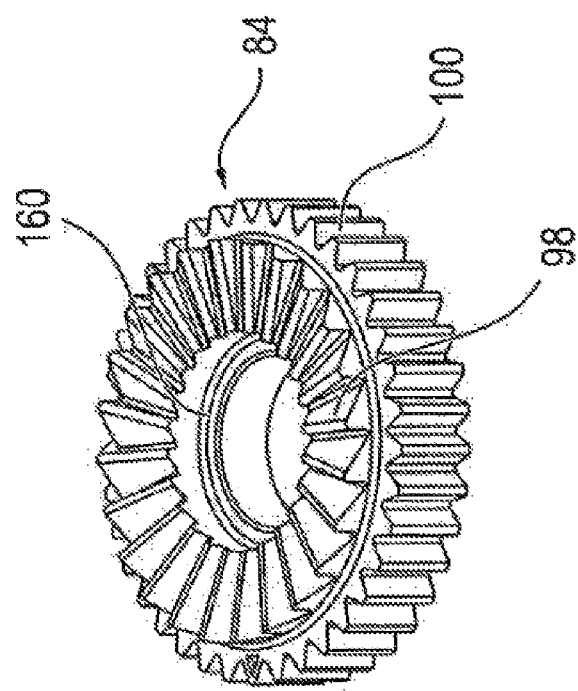
FIG. 12 relates to a perspective representation of a first locking element of the first arresting unit.

FIG. 12 shows a perspective representation of the first locking element 84. One can see here a projection 160, against which the second end of the first helical compression spring 88 bears.

Figure 13:
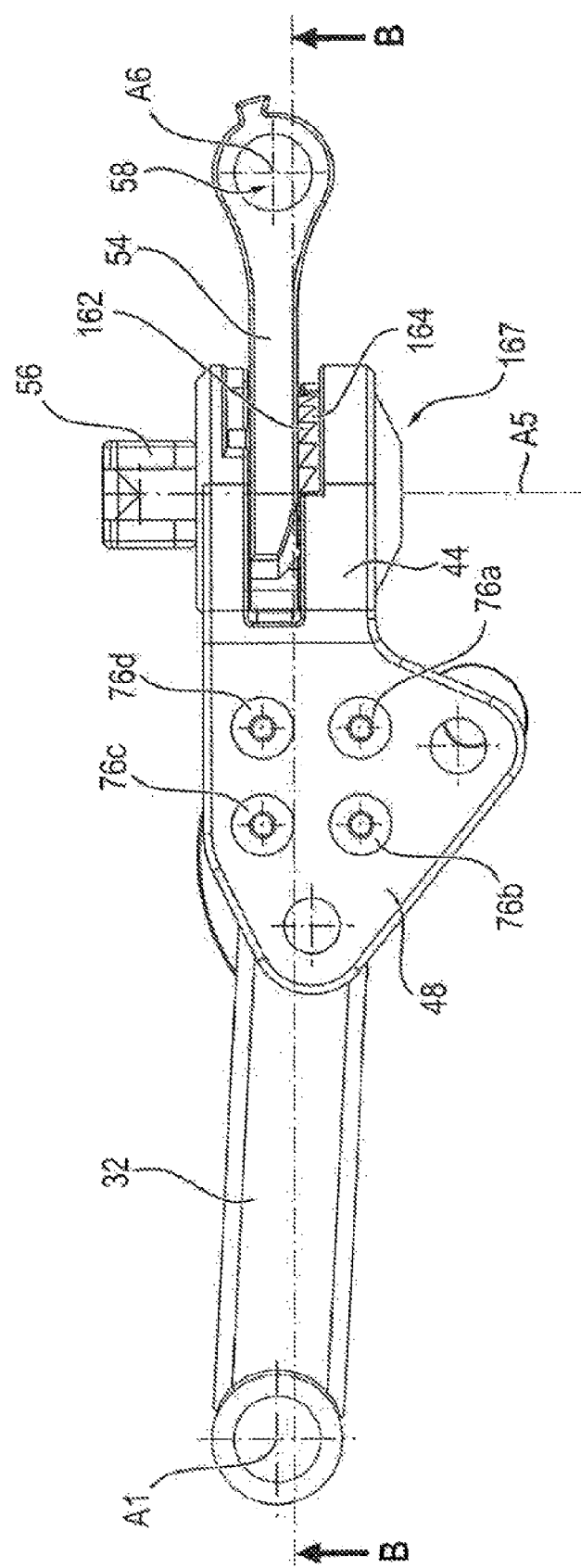
FIG. 13 relates to another top view of elements of the adjusting device.

FIG. 13 shows another top view of elements of the adjusting device 26, in which the first guide bar 32, the first connection element 44, the quick clamping device 56 and the second connection element 54 are represented, having a gearing 162 in the region of the fifth rotary bearing 52. Furthermore, the first connection element 44 has a detent element 167, which is mounted rotationally firm about the first pivot axis A5 and able to be displaced along the fifth pivot axis A5. The detent element 167 has a gearing 164 formed complementary to the gearing 162, which in a locked state of the quick clamping device 56 as shown in FIG. 13 stands in engagement with the gearing 162 so that the connection elements 44 and 54 are rotationally firm to each other. Moreover, the connection of the first connection element 44 to the second connection element 54 is configured as specified in the document DE 10 2005 054 175 A1, whose content is hereby incorporated by reference.

Figure 14:
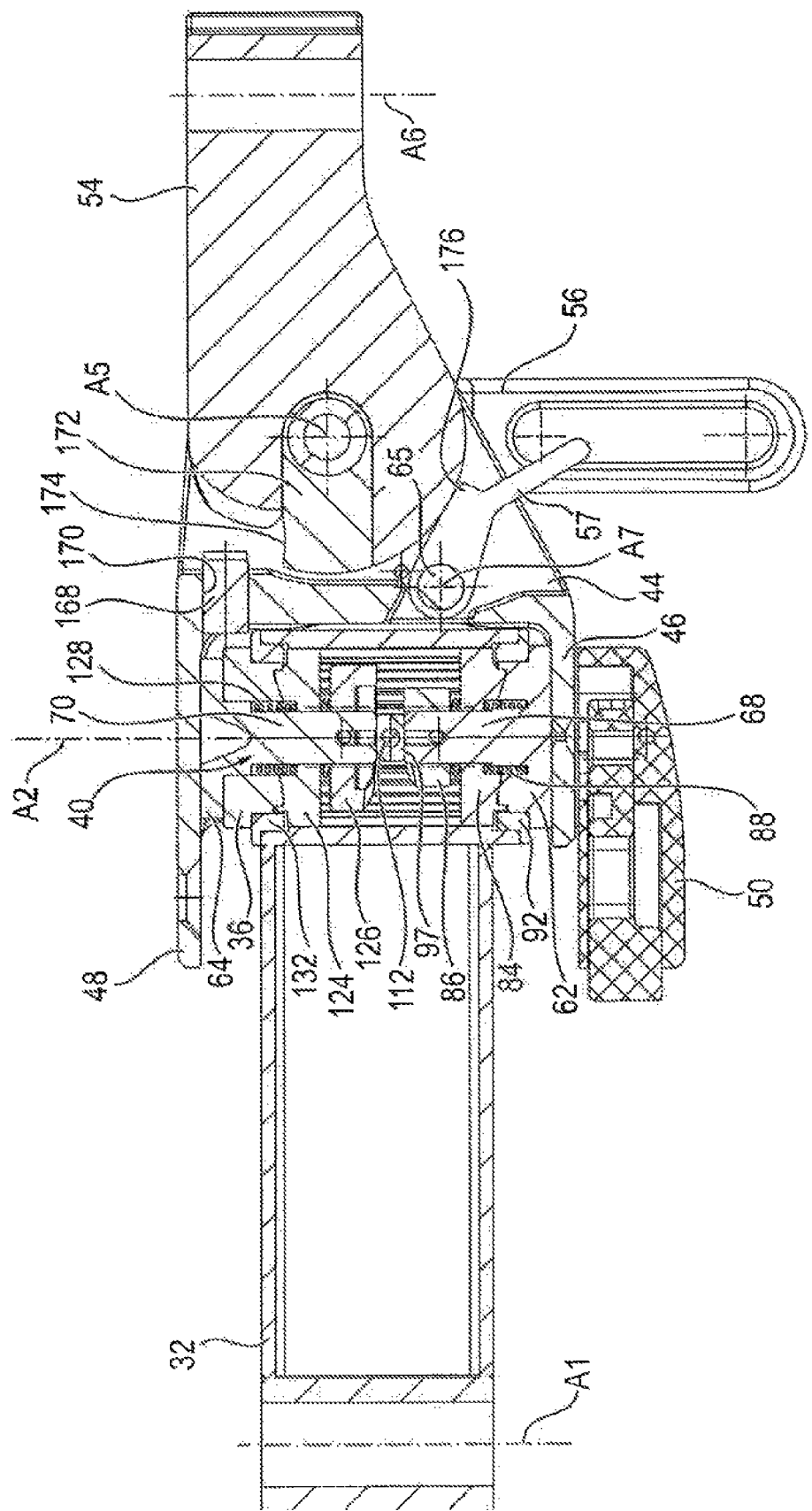
FIG. 14 relates to a cross section representation along sectioning line B-B of FIG. 13.

FIG. 14 shows a cross section representation along the sectioning line B-B of FIG. 13, in which the first arresting unit 78 and the second arresting unit 80 are sectioned in a longitudinal direction. This reveals the projection 97 of the shaft 96, through which the activating pin 112 is led. The bearing journal 70 of the second joint element 64 contacts the projection 97 at its second side, which is opposite the first side.

Moreover, the first connection element 44 has a rotation locking element 168, which is led through an elongated recess 170 of the first connection element 44 and mounted therein displaceably along its longitudinal axis. Preferably, the rotation locking element 168 protrudes from the recess 170 at its side facing the second connection element 54.

The cross section representation shown furthermore represents a locking body 172 of the second connection element 54 with a locking surface 174 and a projection 176 of the arresting lever 57. The projection 176 and the locking body 172 form a form-fitting ratchet mechanism, which can be arrested upon a swiveling of the second connection element 54 relative to the first connection element 44 about the fifth pivot axis A5, so that the locking surface 174 forming back-pressure surface and the project 176 contact each other. In the relative position shown for the first connection element 44 relative to the second connection element 54, the ratchet mechanism is not arrested.

FIG. 15 shows a front view of the adjusting device 26, in which the shin plate 24 is arranged orthogonally to the thigh plate 22. Compared to the position shown in FIG. 2, the fastening element 28 has been swiveled relative to the joint module plate 20 about an eighth pivot axis A8 and the shin plate 24 relative to the thigh plate 22 about the fifth pivot axis A5.

FIG. 16 shows a cross section representation along sectioning line C-C of FIG. 15. The thigh plate 22 is configured such that a portion of its end face contacts the shin plate 24 in a region provided for this.

FIG. 17 shows an enlarged representation of the region D indicated in FIG. 16. A first end 178 of the rotation locking element 168 contacts the second connection element 54 when this has been swiveled by 90° about the fifth pivot axis A5 with respect to the first connection element 44. The end 180 of the rotation locking element 168 opposite the first end 178 contacts the coupler 36. In this way, a swiveling of the shin plate 24 about the second pivot axis A2 relative to the coupler 36 is no longer possible in this position, so that the shin plate 24 is in a secured position for the knee/elbow posture of the patient, regardless of the activation of the arresting units 78 and 80.

The locking body 172 of the second connection element 54 stands in form-fitting engagement with the projection 176 formed on the arresting lever 57, so that the ratchet mechanism formed by the projection 176 and the locking body 172 is arrested and an activating of the arresting lever 57 is required for a pivoting of the second connection element 54 about the fifth pivot axis A5 with respect to the first connection element 44. The arresting lever 57 during the activation required for this is swiveled about the seventh pivot axis A7 until the projection 176 no longer contacts the locking body 172 and the arresting of the ratchet mechanism is released. After a swiveling of the second connection element 54 about the fifth axis of rotation A5 has been enabled by the quick clamping device 56, the second connection element 54 can then be swiveled about the fifth pivot axis A5.

Figure 18:
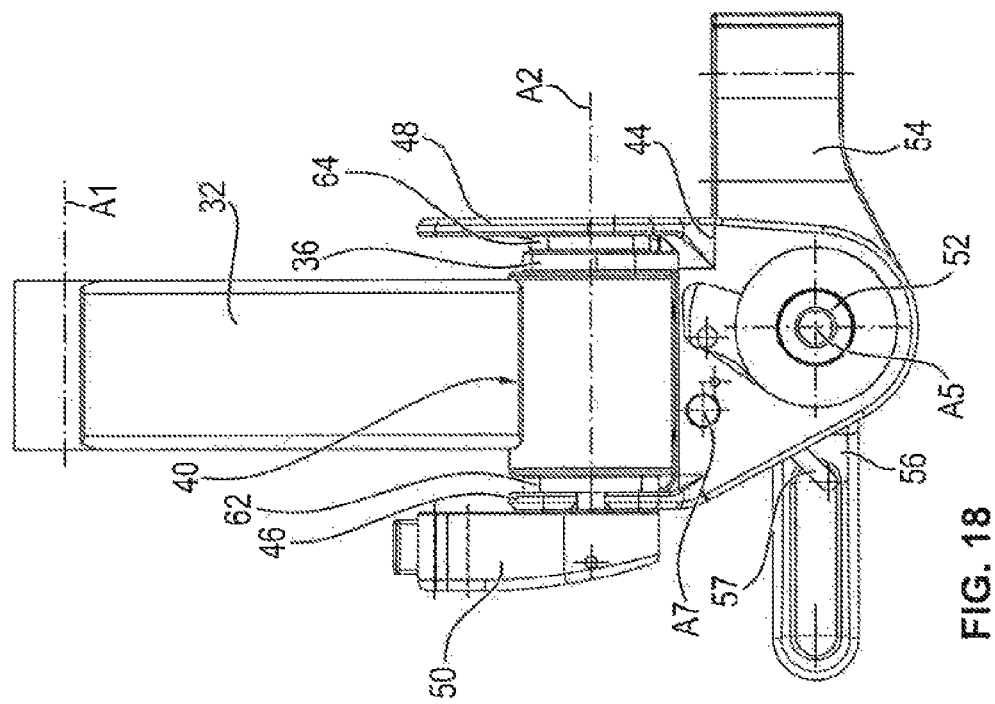
FIG. 18 relates to a side view of elements of the adjusting device, showing the opposite side of these elements from the representation perspective of FIG. 16.

FIG. 18 shows a side view of elements of the adjusting device 26, in which the first guide bar 32, the activating element 50, the first connection element 44 and the second connection element 54 are represented in their state swiveled in FIG. 17 from a direction opposite to FIG. 17. The activating element 50 is arranged in the same activating position.

Figure 19:
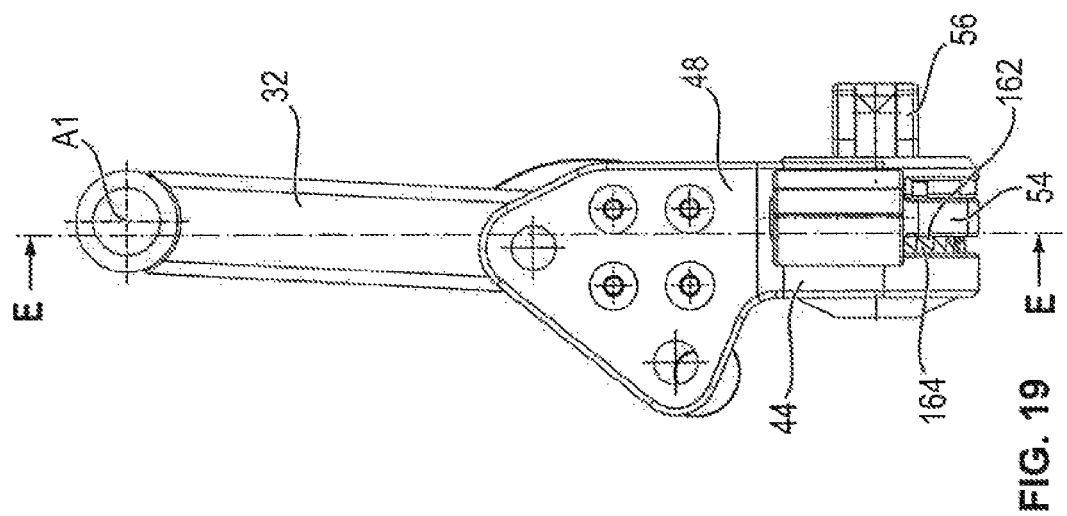
FIG. 19 relates to a front view of the elements shown in FIG. 18.

FIG. 19 shows a front view of the elements represented in FIG. 18. Starting from the state shown in FIG. 2, the second connection element 54 together with the shin plate 24 (not represented) is swiveled about the fifth pivot axis A5 by 90° with respect to the first connection element 44 connected to the thigh plate 22 (not represented). For the swiveling of the second connection element 54 with respect to the first connection element 44, the quick clamping device 56 which is in the locked state needs to be released. The gearings 162 and 164 stand in engagement in the locked state of the quick clamping device 56.

Figure 20:
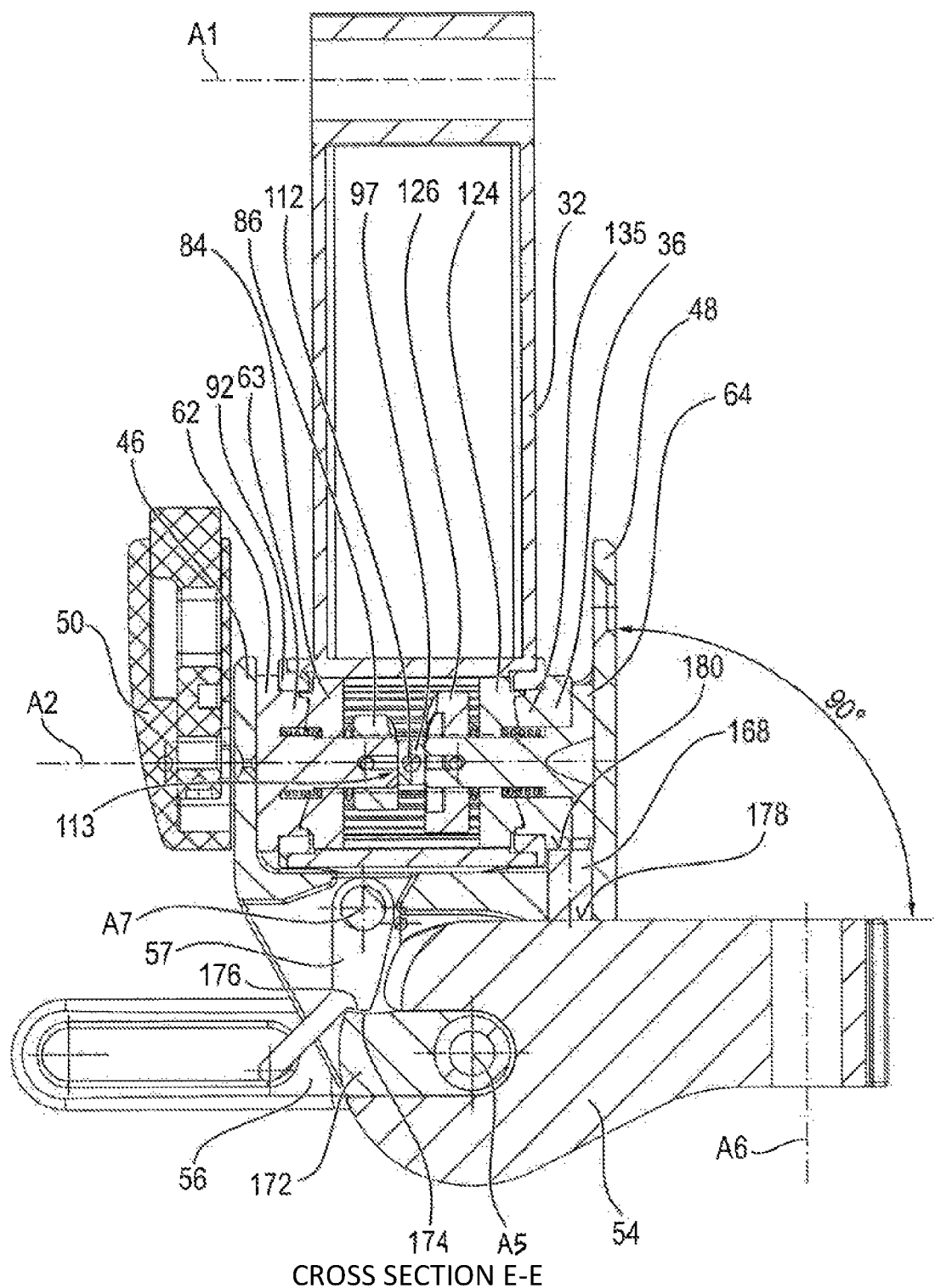
FIG. 20 relates to a cross section representation along sectioning line E-E of FIG. 19.

FIG. 20 shows a cross section representation along the sectioning line E-E of FIG. 19, in which the relative position of the activating pin 112 to the cam tracks 106 and 152 is represented. The activating pin 112 lies in a first activating position 113 against both the first pitchless region 110 and the second pitchless region 111 of the cam track 106, and against the first pitchless region 156 and the second pitchless region 165 of the cam track 152. In the first activating position 113 of the activating pin 112, the first arresting unit 78 and the second arresting unit 80 are each in the locked state.

Figure 21:
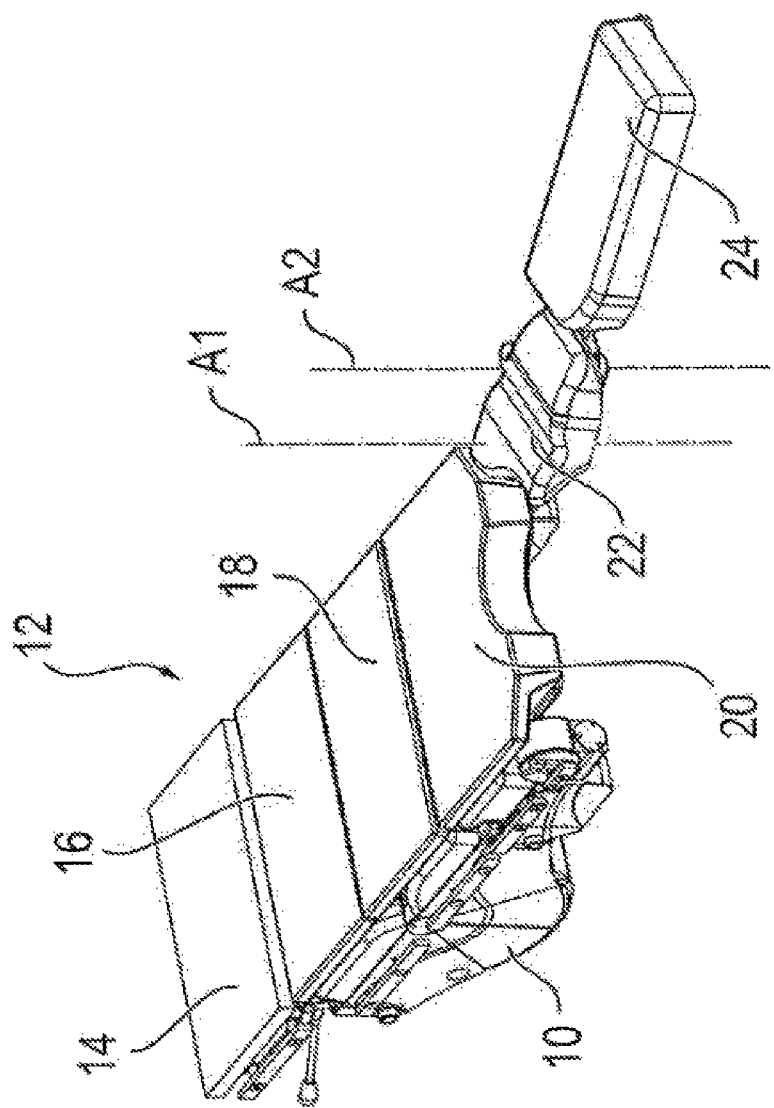
FIG. 21 relates to a perspective representation of the patient bearing surface, where the thigh plate and the shin plate are pivoted with respect to the position shown in FIG. 1.

FIG. 21 shows a perspective representation of the patient bearing surface 12, the thigh plate 22 and the shin plate 24 having been swiveled about the first pivot axis A1 with respect to the position shown in FIG. 1. The shin plate 24 has not been swiveled relative to the thigh plate 22, so that the longitudinal axes of the shin plate 24 and the thigh plate 22 coincide. Upon swiveling the thigh plate 22 and the shin plate 24, the second pivot axis A2 is swiveled about the first pivot axis A1 by a movement of the four-bar linkage 30 on a circular path.

For the positioning of the thigh plate 22 and the shin plate 24 in the position shown in FIG. 21, starting from their position shown in FIG. 1, the second arresting unit 80 must be moved from its locked state to an unlocked state, so that the thigh plate 22 and the shin plate 24 can be swiveled together about the first pivot axis A1.

In order to move the second arresting unit 80 from its locked state to its unlocked state, the activating element 50 is rotated about the second pivot axis A2. In the locked state of the second arresting unit 80 shown in FIG. 8, the activating pin 112 is in the first activating position 113, in which the third roller 118 lies against the first pitchless region 156 of the cam track 152 and the fourth roller 120 lies against the second pitchless region 165 of the cam track 152.

Starting from the first activating position 113 of the activating pin 112, the pin is rotated upon rotation of the activating element 50 about the second pivot axis A2. In this process, the third roller 118 rolls from the first pitchless region 156 along the first pitch 154 into the first depression 157 and the fourth roller 120 rolls from the second pitchless region 165 along the second pitch 163 into the second depression 161.

In a second activating position of the activating pin 112 reached by this rotation, in which the third roller 118 contacts the first depression 157 and the fourth roller 120 the second depression 161, the second arresting unit 80 is in its unlocked state.

During the transition from the locked state to the unlocked state of the second arresting unit 80, the second helical compression spring 128 pushes the second locking element 124 along the second pivot axis A2 away from the second opening 134 of the through hole 77, until its gearing 144 no longer stands in engagement with the gearing 136 of the journal 135. As a result the spring force of the second helical compression spring 128, the second cam 126 is pressed continually against the third roller 118 and the fourth roller 120.

Figure 22:
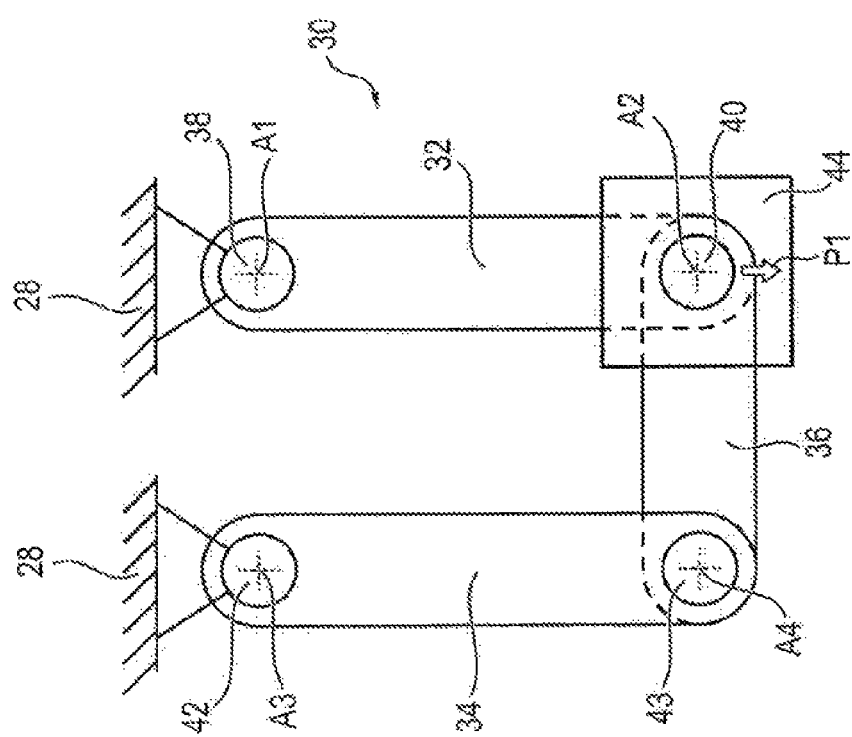
FIG. 22 relates to a schematic representation of the four-bar linkage a the first connection element in a top view.

In the unlocked state of the second arresting unit 80, in which the gearings 136 and 144 are disengaged, the coupler 36 can be swiveled relative to the first guide bar 32, the second locking element 124 and the activating element 50 about the second pivot axis A2, so that a swiveling of the second pivot axis A2 about the first pivot axis A1 is made possible, as explained more closely in FIG. 22.

Moreover, the first roller 114 upon the rotation of the activating pin 112 is moved from the first activating position 113 along the first pitch 108 into the first depression 105, and the second roller 116 is moved along the second pitch 109 into the second depression 107, in which the activating pin 112 is located in the second activating position.

During the rotation of the activating pin 112 from the first activating position 113 to the second activating position, the first locking element 84 is pressed by the first helical compression spring 88 away from the gearing 66 of the first joint element 62 until the gearing 98 of the first locking element 84 no longer stands in engagement with the gearing 66 of the first engaging element 63. In this process, the first locking element 84, the first zigzag spring 90 and the first cam 86 are moved away from the first opening 94 of the through hole 77 along the second pivot axis A2, so that the cam track 106 of the first cam 86 continues to contact the first roller 114 and the second roller 116.

In the unlocked state of the first arresting unit 78, in which the gearings 66 and 98 are disengaged, the first connection element 44, the first joint element 62, the second joint element 64, the first cam 86, the second cam 126, the activating pin 112, the shaft 96 and the activating element 50 can be swiveled together with respect to the first guide bar 32 about the second pivot axis A2.

The pin 112 is in the second activating position, in which the first arresting unit 78 is unlocked, when the activating element 50 is in the first activating position mentioned in the claims. Moreover, the pin 112 is in the first activating position 113, in which the first arresting unit 78 is locked, when the activating element 50 is in the second activating position.

Figure 23:
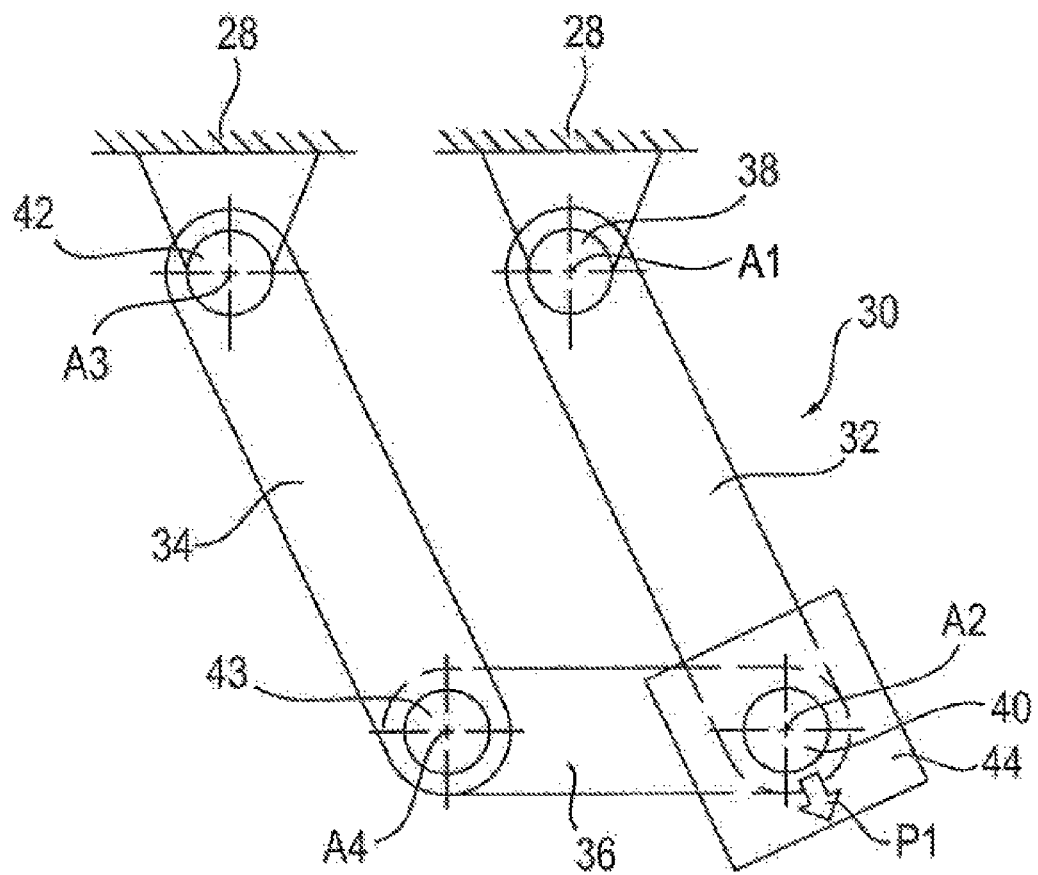
FIG. 23 relates to a schematic top view of the four-bar linkage and the first connection element in another position, where the thigh plate and the shin plate have been pivoted relative to the position represented in FIG. 22.

FIG. 22 shows a schematic representation of the four-bar linkage 30 and the first connection element 44 in a top view, where the orientation of the first connection element 44 is represented by an arrow P1. FIG. 23 shows a schematic top view of the four-bar linkage 30 and the first connection element 44 in the position assumed in FIG. 21. The first connection element 44 has been swiveled together with the first guide bar 32 about the first pivot axis A1, relative to the position shown in FIG. 22, so that its orientation as represented by the arrow P1 has not changed relative to the first guide bar 32. In the swiveling of the second pivot axis A2 about the first pivot axis A1, the first guide bar 32 is swiveled about the first pivot axis A1 and the second guide bar 34 about the third pivot axis A3 by the same angle. The coupler 36 during this swiveling is displaced such that it retains its orientation to the base element 28. Accordingly, the coupler 36 during this swiveling is displaced in parallel. The coupler 36 is swiveled about the second pivot axis A2 relative to the first guide bar 32 and about the fourth pivot axis A4 relative to the second guide bar 34.

Figure 24:
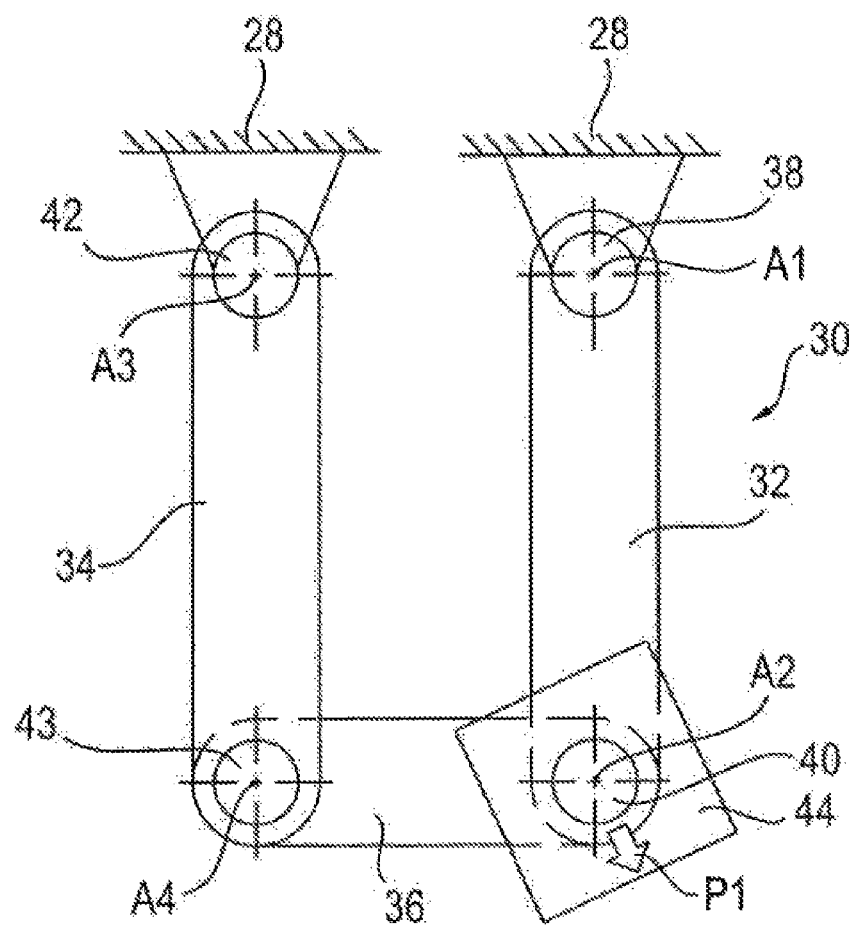
FIG. 24 relates to a schematic top view of the four-bar linkage and the first connection element, where the first connection element has been pivoted relative to the position represented in FIG. 22 about the second pivot axis.

FIG. 24 shows a schematic top view of the four-bar linkage 30 and the first connection element 44, where the first connection element 44 has been swiveled about the second pivot axis A2 relative to the position represented in FIG. 22. During this swiveling, the orientation of the first connection element 44 relative to the first guide bar 32 as represented by the arrow P1 has been changed, contrary to the pivoting of the second pivot axis A2 about the first pivot axis A1 represented in FIG. 23.

Figure 25:
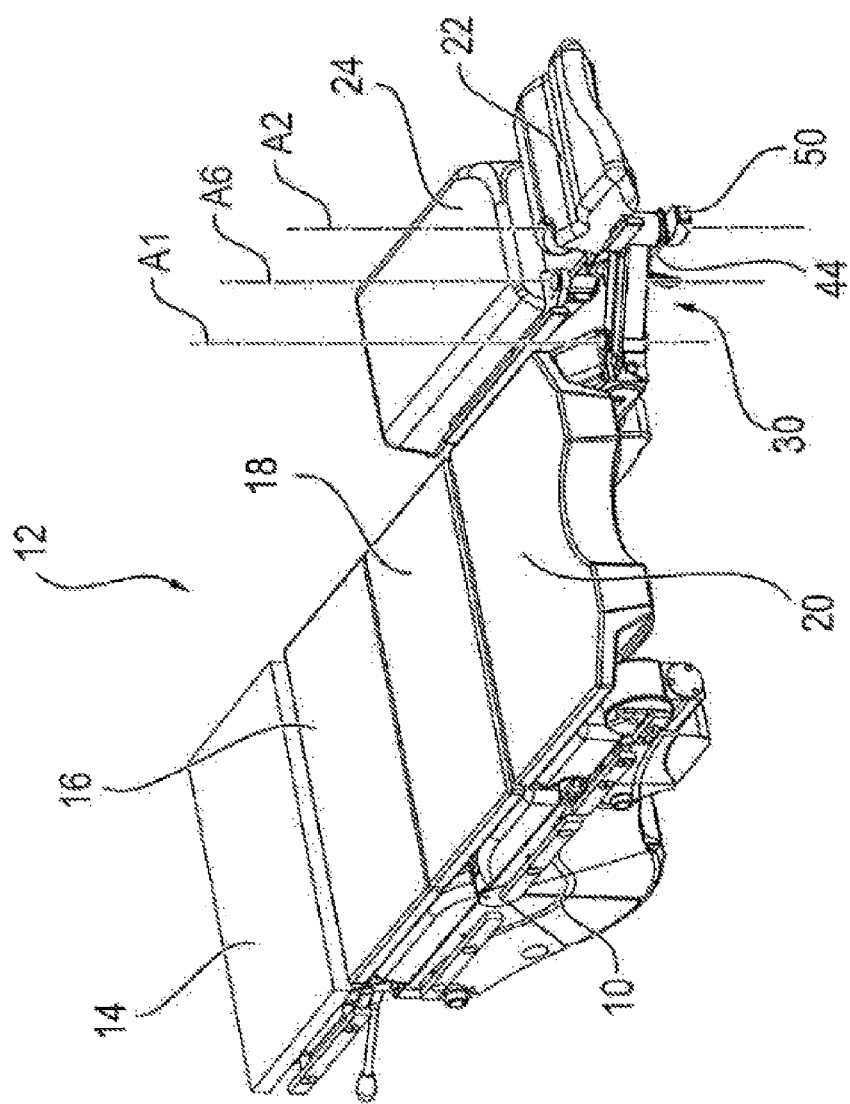
FIG. 25 relates to a perspective representation of the patient bearing surface, where the thigh plate and the shin plate are pivoted with respect to the position shown in FIG. 21 into a different position.

FIG. 25 shows a perspective representation of the patient bearing surface 12 in which the thigh plate 22 and the shin plate 24 have been swiveled further about the first pivot axis A1 and about the second pivot axis A2 as compared to the position shown in FIG. 21. For the changing of the position of the thigh plate 22 and the shin plate 24 from the position shown in FIG. 21 to the position shown in FIG. 25, the first connection element 44 with the thigh plate 22 have been swiveled relative to the first guide bar 32 and the coupler 36 about the second pivot axis A2 and the second pivot axis A2 has been swiveled about the first pivot axis A1. The activating element 50 maintains its orientation relative to the thigh plate 22 during this swiveling.

Figure 26:
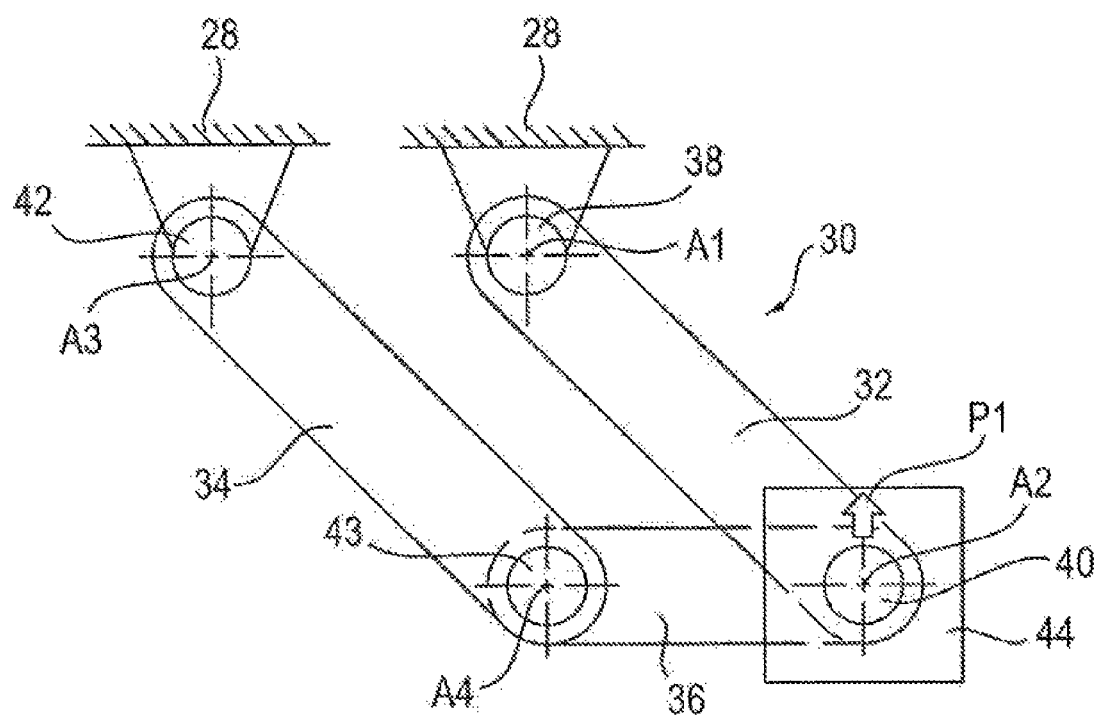
FIG. 26 relates to a schematic top view of the four-bar linkage and the first connection element in the position of the thigh plate and the shin plate shown in FIG. 25.

FIG. 26 shows a schematic top view of the four-bar linkage 30 and the first connection element 44 in the position of the leg plates 22 and 24 shown in FIG. 25. The first connection element 44 has been swiveled so far about the second pivot axis A2 relative to its position shown in FIG. 23 that the first connection element 44 is oriented opposite to its orientation shown in FIG. 22, as indicated by arrow P1.

The swiveling about the second pivot axis A2 made possible by the unlocked state of the first arresting unit 78 is independent of the swiveling of the second pivot axis A2 about the first pivot axis A1 via the four-bar linkage 30, which is made possible by the unlocked state of the second arresting unit 80.

Figure 27:
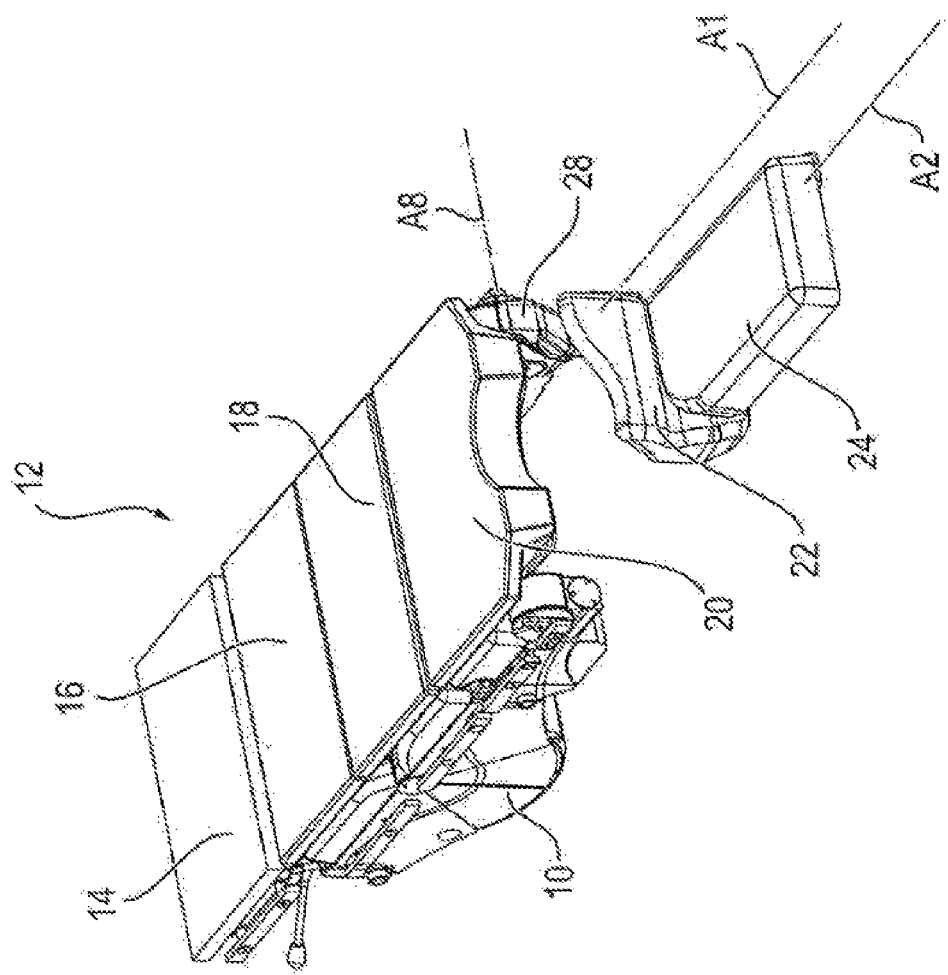
FIG. 27 relates to a perspective representation of the patient bearing surface, where the support surface segments of the patient bearing surface are arranged in a suitable position for a knee/elbow posture of the patient.

FIG. 27 shows a perspective representation of the patient bearing surface 12, where the thigh plate 22 and the shin plate 24 of the patient bearing surface 12 are arranged in a position suitable for the knee/elbow posture of the patient, shown schematically in FIG. 22. The thigh plate 22 and the shin plate 24 serve for the kneeling support of the right leg of the patient. Another thigh plate (not shown) and another shin plate (not shown) are arranged in identical manner next to the thigh plate 22 and the shin plate 24 and serve for the kneeling support of the left leg of the patient. The position of the shin plate 24, the thigh plate 22 and the adjusting device 26 reached upon swiveling the fastening element 28 about the eighth pivot axis A8 and the shin plate 24 about the fifth pivot axis A5 corresponds to the position shown in FIGS. 15 to 20. As described above, in this position the two-dimensional contact of the second end 180 of the rotation locking element 168 with the coupler 36 and the second connection element 54 prevents a swiveling of the first connection element 44, the shin plate 24 and the thigh plate 22 about the second pivot axis A2. If the first arresting unit 78 and the second arresting unit 80 are each in the unlocked state, only a swiveling of the second pivot axis A2 about the first pivot axis A1 is possible in this position, since the relative orientation of the coupler 36 to the first connection element 44 and the second connection element 54 is unchanged.

Figure 28:
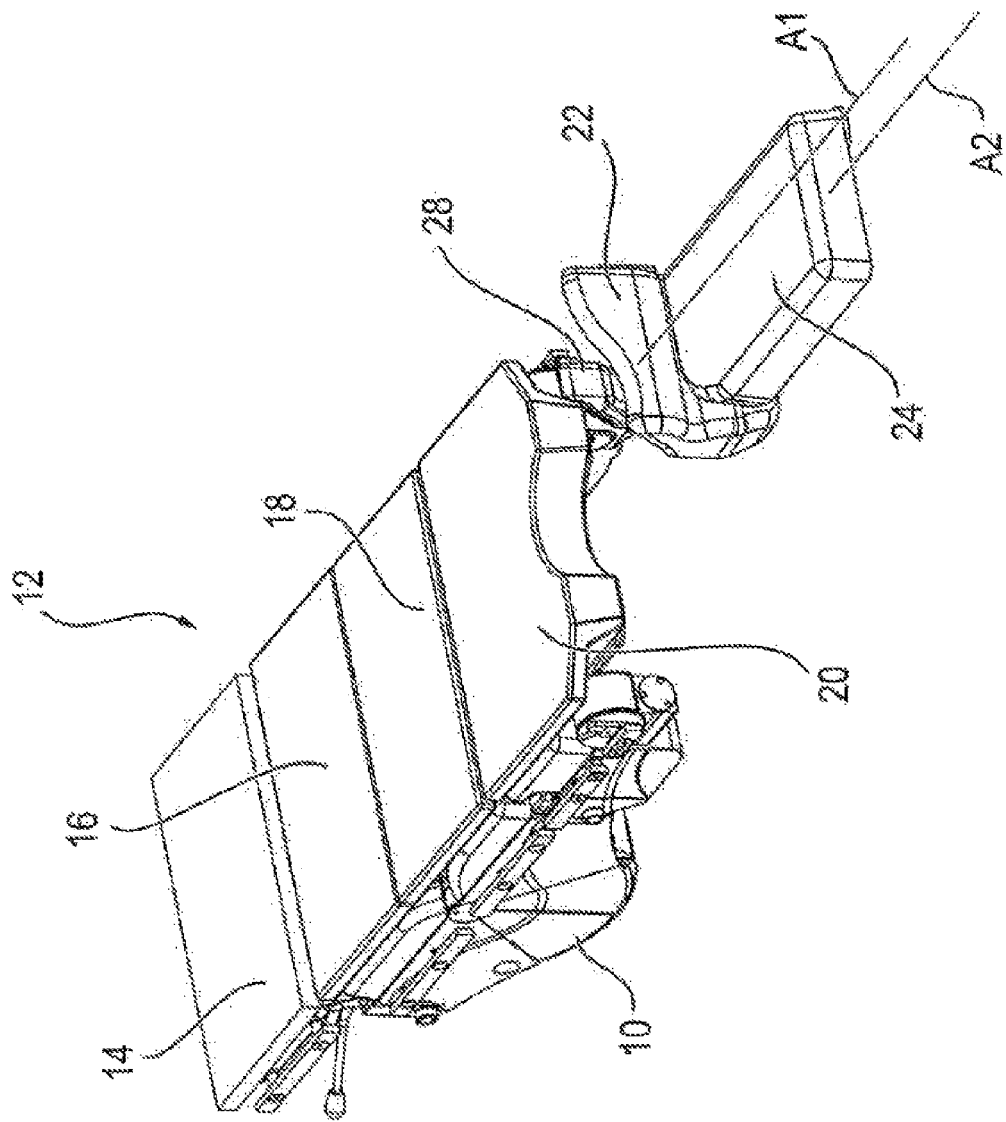
FIG. 28 relates to a perspective representation of the patient bearing surface, where the thigh plate and the shin plate are displaced in parallel relative to the position shown in FIG. 27.

FIG. 28 shows a perspective representation of the patient bearing surface 12, where the thigh plate 22 and the shin plate 24 are displaced in parallel relative to the position shown in FIG. 27. The second pivot axis A2 oriented parallel to the shin plate 24 is swiveled about the first pivot axis A1 relative to the position shown in FIG. 27, so that the first connection element 44 and the second connection element 54 are displaced in parallel, together with the coupler 36, and the shin plate 24 remains oriented parallel to the joint module plate 20.

Figure 29:
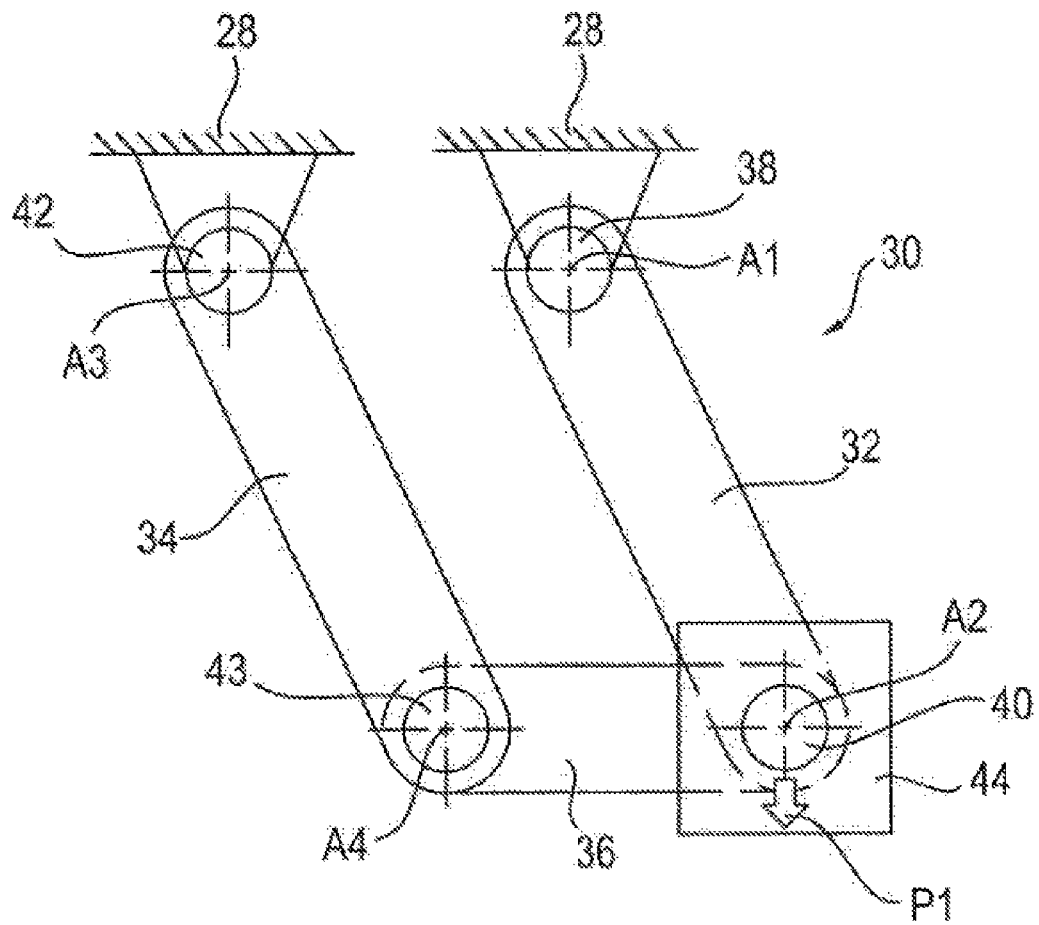
FIG. 29 relates to a schematic top view of the four-bar linkage and the first connection element in the position shown in FIG. 28.

FIG. 29 shows a schematic top view of the four-bar linkage 30 and the first connection element 44 in the position shown in FIG. 28. The first connection element 44 has the same orientation relative to the fastening element 28 in FIG. 29 as in FIG. 22, as illustrated by the arrow P1.

Figure 30:
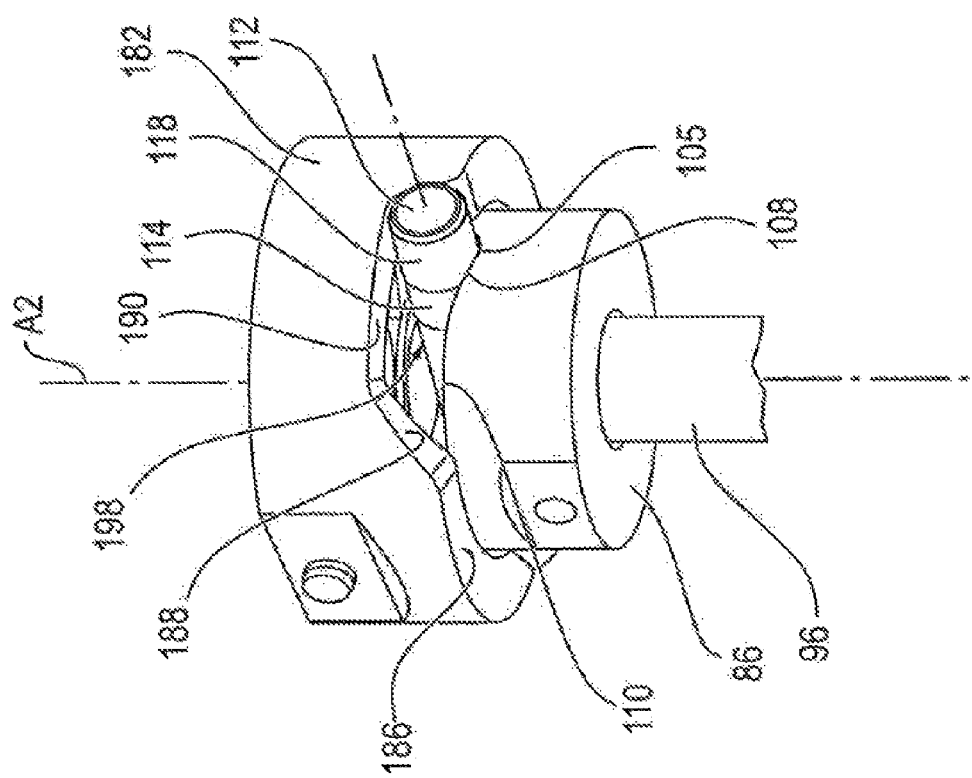
FIG. 30 relates to a perspective representation of an arrangement of locking elements of an adjusting device according to a second embodiment.

FIG. 30 shows a perspective representation of an arrangement of shift elements of an adjusting device according to a second embodiment. Instead of the second cam 126 of the second arresting unit 80, there is provided a second cam 182 with a cam track 184 differing from the cam track 152 of the second cam 126. The construction, the cam track, and the function of the first cam 86 and of the activating pin 112 connected rotationally firmly to an activating element (not shown) coincide with the construction and the function of the adjusting device of the first embodiment. The activating pin 112 is located here in a third activating position 198 relative to the first cam 86 and the second cam 182.

Figure 31:
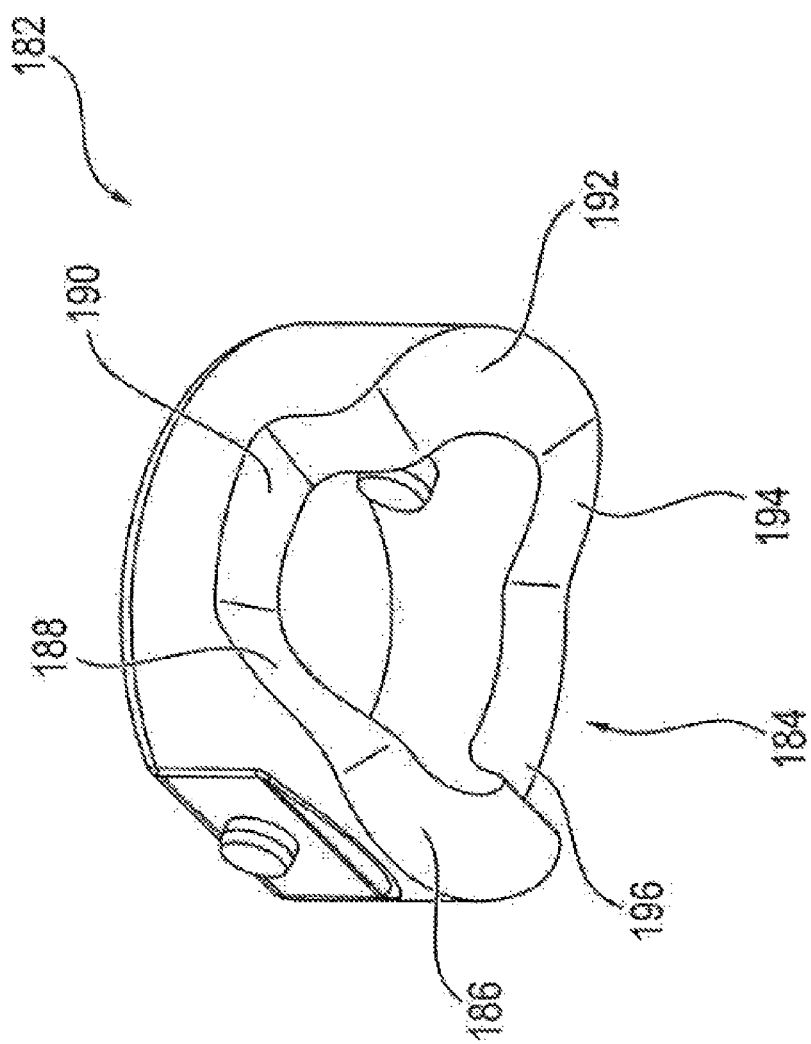
FIG. 31 relates to a perspective representation of the second cam according to the second embodiment of the adjusting device.

FIG. 31 is a perspective representation of the second cam 182 according to the second embodiment of the adjusting device. The second cam 182 has a cam track 184 comprising a first pitchless region 186, a second pitchless region 190, a third pitchless region 192, a fourth pitchless region 196, a first pitch 188 and a second pitch 194. By contrast with the second cam 126 according to the first embodiment, the second pitchless region 190 of the second cam 182 is arranged in place of the first depression 157 of the second cam 126 adjacent to the first pitch 154 of the cam track 152. The third pitchless region 192, the second pitch 194 and the fourth pitchless region 196 are each formed axially symmetrical to the longitudinal axis of the second cam 182 with respect to the first pitchless region 186, the first pitch 188 and the second pitchless region 190.

In the arrangement shown in FIG. 30, the rollers 114 and 116 of the activating pin 112 contact the cam track 106 of the first cam 86 in the third activating position 198 each time in the first depression 105 and the second depression 107. Moreover, the third roller 118 contacts the second pitchless region 190 at its end facing away from the first pitch 188 and the fourth roller 120 contacts the fourth pitchless region 196 at its end facing away from the second pitch 194. In the third activating position 198, the arresting units 78 and 80 are each in the unlocked state.

Figure 32:
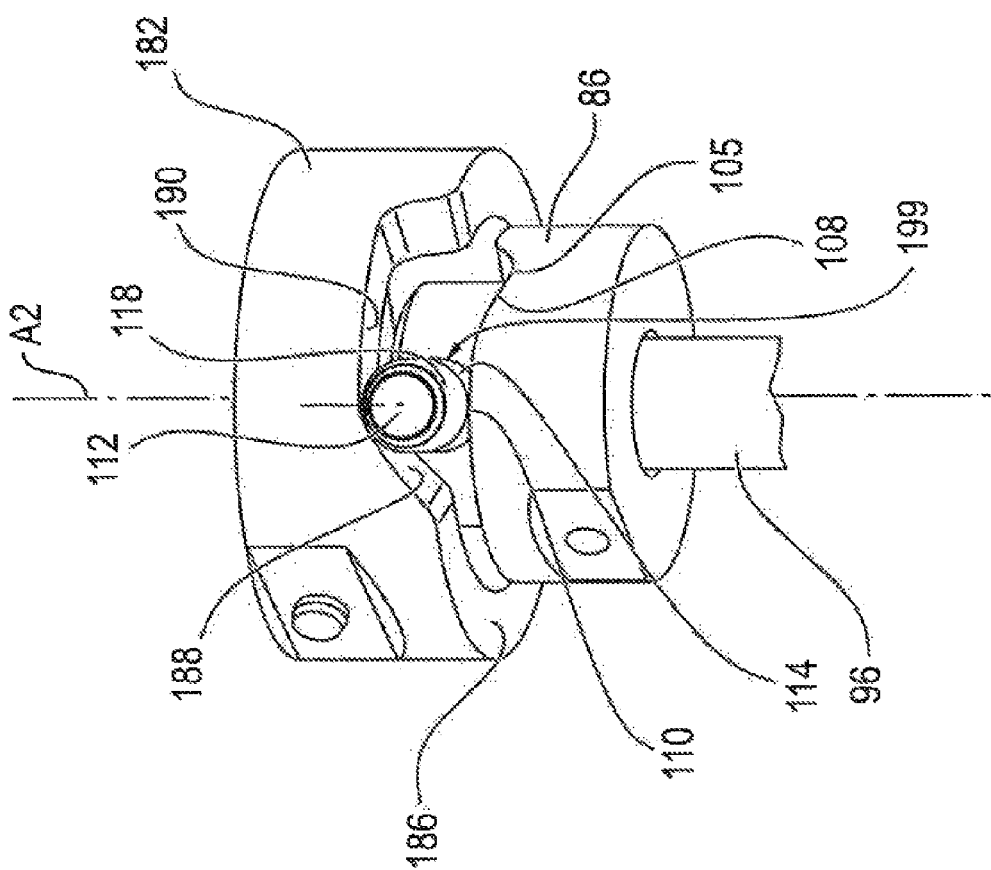
FIG. 32 relates to a perspective representation of an arrangement of cams and an activating pin according to the second embodiment, where the activating pin is in a second activating position.

FIG. 32 shows another perspective representation of an arrangement composed of the first cam 86, the second cam 182 and the activating pin 112 according to the second embodiment, where the activating pin 112 is in a fourth activating position 199. For this, the activating pin 112 has been rotated about the second pivot axis A2 relative to the cams 86 and 182 as compared to the position shown in FIG. 30.

The cam track 106 of the first cam 86 is contacted, in the fourth activating position 199 of the activating pin 112, by the first roller 114 of the activating pin 112 at the first pitchless region 110 and by the second roller 116 at the second pitchless region 111. Moreover, the cam track 184 of the second cam 182 is contacted by the third roller 118 at the end of the second pitchless region 190 toward the first pitch 188 and by the fourth roller 120 at the end of the fourth pitchless region 196 toward the second pitch 194.

The second cam 182 remains in its position during the rotating of the activating pin 112 from the third activating position 198 to the fourth activating position 199. The first cam 86 is displaced along its longitudinal axis in this process. Accordingly, the first arresting unit 78 is in the locked state in the fourth activating position 199 of the activating pin 112 and the second arresting unit 80 remains in the unlocked state.

Figure 33:
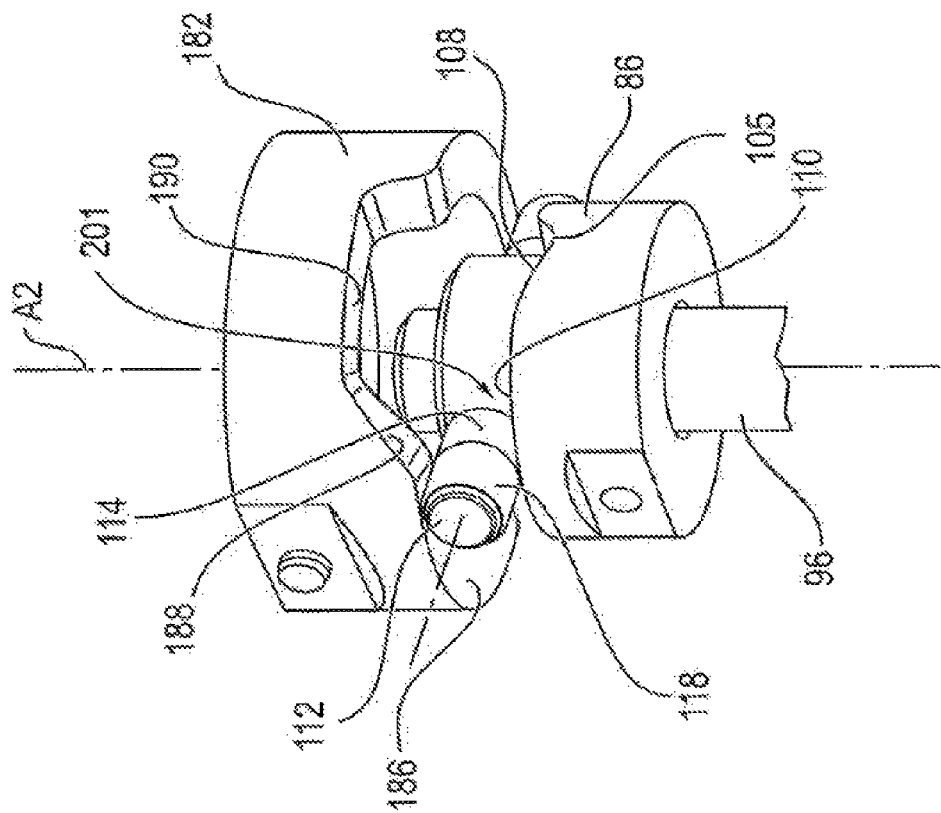
FIG. 33 relates to a perspective representation of an arrangement of the cams and the activating pin according to the second embodiment, where the activating pin is in a third activating position.

FIG. 33 shows a perspective representation of an arrangement made up of the first cam 86, the second cam 182 and the activating pin 112 according to the second embodiment, where the activating pin 112 is in a fifth activating position 201. For this, the activating pin 112 has been rotated further about the second pivot axis A2 relative to the cams 86 and 182 as compared to the position shown in FIG. 32.

The cam track 106 of the first cam 86 is contacted by the first roller 114 at the first pitchless region 110 and by the second roller 116 at the second pitchless region 111. Moreover, the cam track 184 of the second cam 182 is contacted by the third roller 118 at the first pitchless region 186 and by the fourth roller 120 at the third pitchless region 192.

The second cam 182 upon rotation of the activating pin 112 from the fourth activating position 199 to the fifth activating position 201 is displaced along the second pivot axis A2. The first cam 86 remains in its position in this process. Accordingly, the first arresting unit 78 and the second arresting unit 80 are each in their locked state in the fifth activating position 201 of the activating pin 112.

Otherwise, the function and construction of the adjusting device according to the second embodiment correspond to those of the first embodiment.

Figure 34:
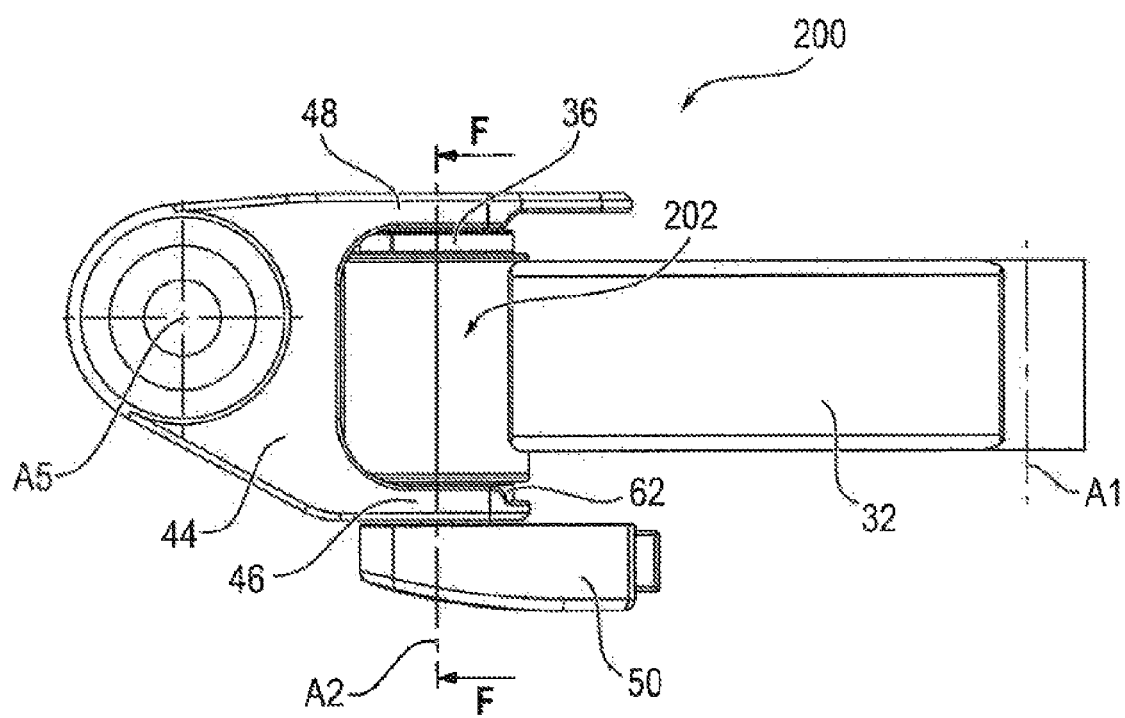
FIG. 34 relates to a side view of a first guide bar, a first connection element and an activating element of an adjusting device according to a third embodiment.

FIG. 34 shows a side view of the first guide bar 32, the first connection element 44 and the activating element 50 of an adjusting device 200 according to a third embodiment. In place of the second rotary bearing 40 of the adjusting device 26, a second rotary bearing 202 is provided. The further construction and function of the adjusting device 200 coincide with the construction and function of the adjusting device 26.

Figure 35:
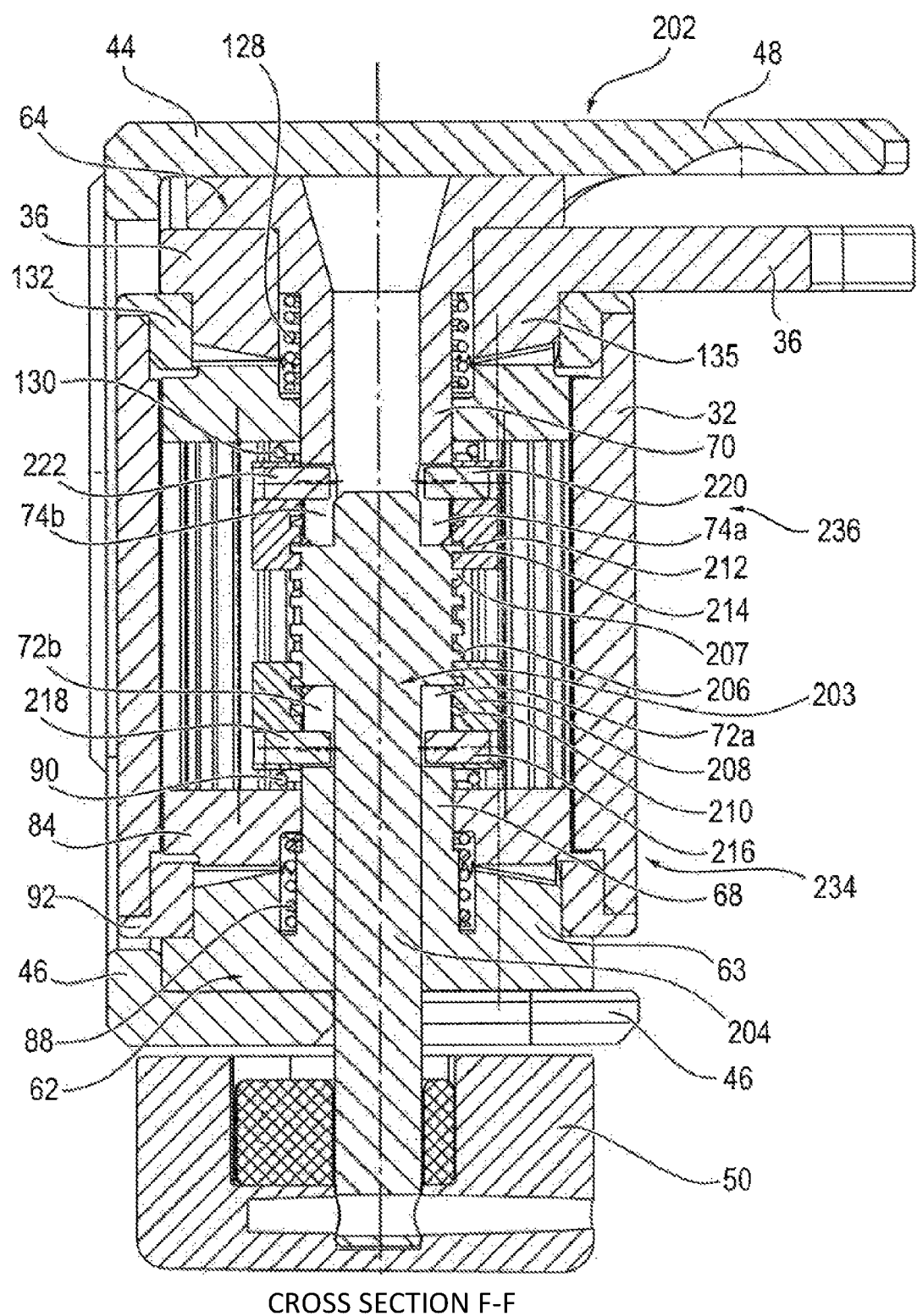
FIG. 35 relates to a cross section by sectioning line F-F in FIG. 34.

FIG. 35 is a cross section representation of the elements shown in FIG. 34 of the adjusting device 200 along the indicated sectioning line F-F, in which the elements of the second rotary bearings 202 are shown. In place of the shift element 82 there is provided a shift element 203, comprising a shaft 204 with a first outer thread 206 and a second outer thread 207. Moreover, the second rotary bearing 202 has a first arresting unit 234 and a second arresting unit 236, which replace the first arresting unit 78 and the second arresting unit 80 of the first and second embodiment.

In the first arresting unit 234, in place of the first cam 86 of the first and second embodiment there is provided a first threaded ring 208 with an inner thread 210 formed complementary to the first outer thread 206, standing in engagement with the first outer thread 206. The first threaded ring 208 is arranged rotationally firm by a first pin 216 protruding into the first recess 72a of the bearing journal 68 and a second pin 218 protruding into the second recess 72b of the bearing journal 68 yet displaceable to the bearing journal 68 in the direction of the second pivot axis A2.

Moreover, in the second arresting unit 236 there is provided, in place of the second cam 126 provided in the first and second embodiment, a second threaded ring 212 with an inner thread 214 formed complementary to the second outer thread 207, standing in engagement with the second outer thread 207 of the shaft 204. The second threaded ring 212 is arranged rotationally firm by a first pin 220 protruding into the first recess 74a of the bearing journal 70 and a second pin 222 protruding into the second recess 74b of the bearing journal 70 yet displaceable to the bearing journal 70 in the direction of the second pivot axis A2.

Figure 36:
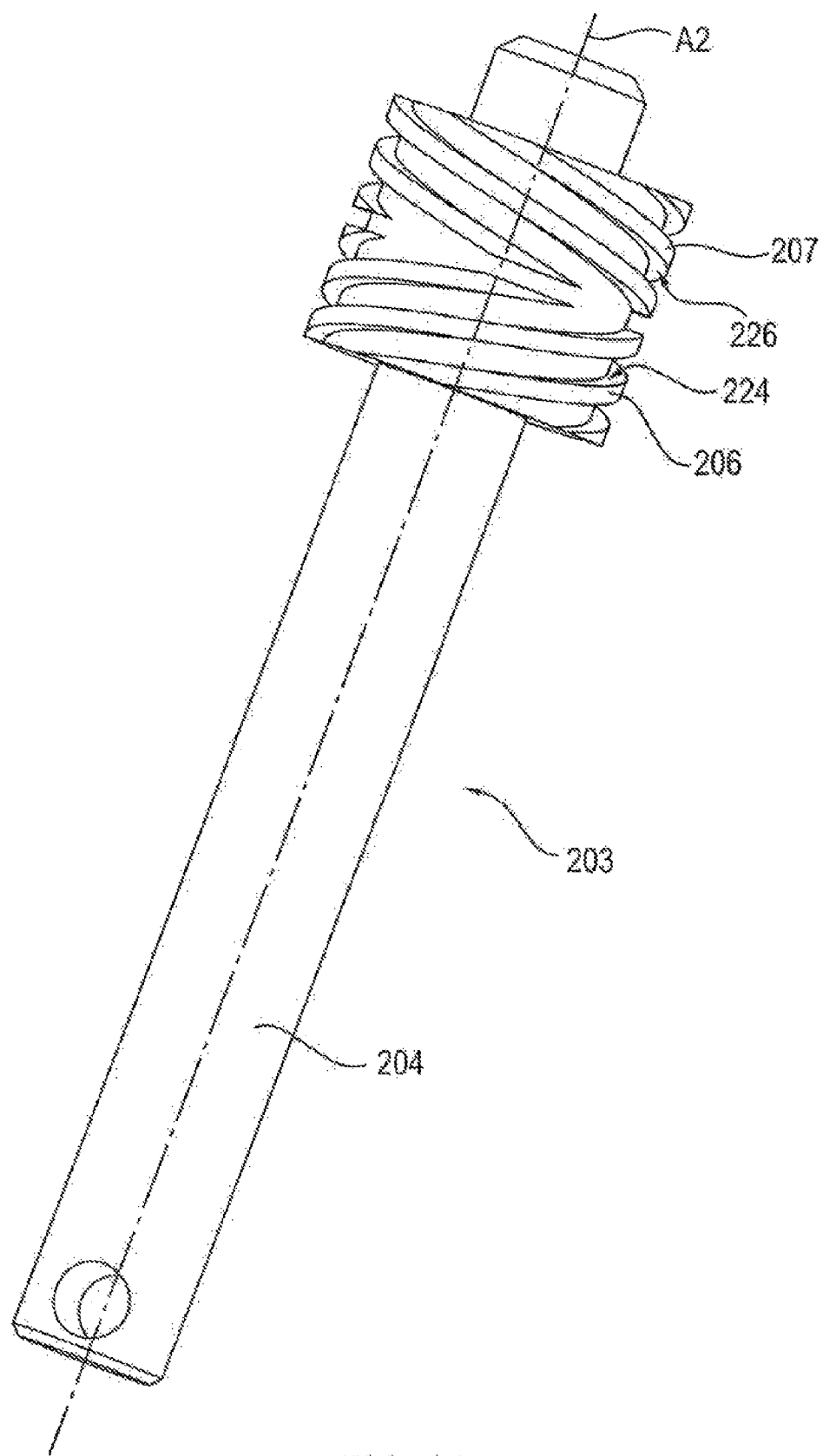
FIG. 36 relates to a perspective view of a shaft of the adjusting device according to the third embodiment.

FIG. 36 shows a perspective view of the shaft 204. The first outer thread 206 of the shaft 204 has a first pitch 224 and the second outer thread 207 a second pitch 226, whose direction is opposite that of the first pitch 224, so that one of the outer threads 206, 207 is right-hand and the other is left-hand. The magnitudes of the pitches 224 and 226 are preferably the same, so that the outer thread 206 and 207 each produce the same travel per revolution.

Figure 37:
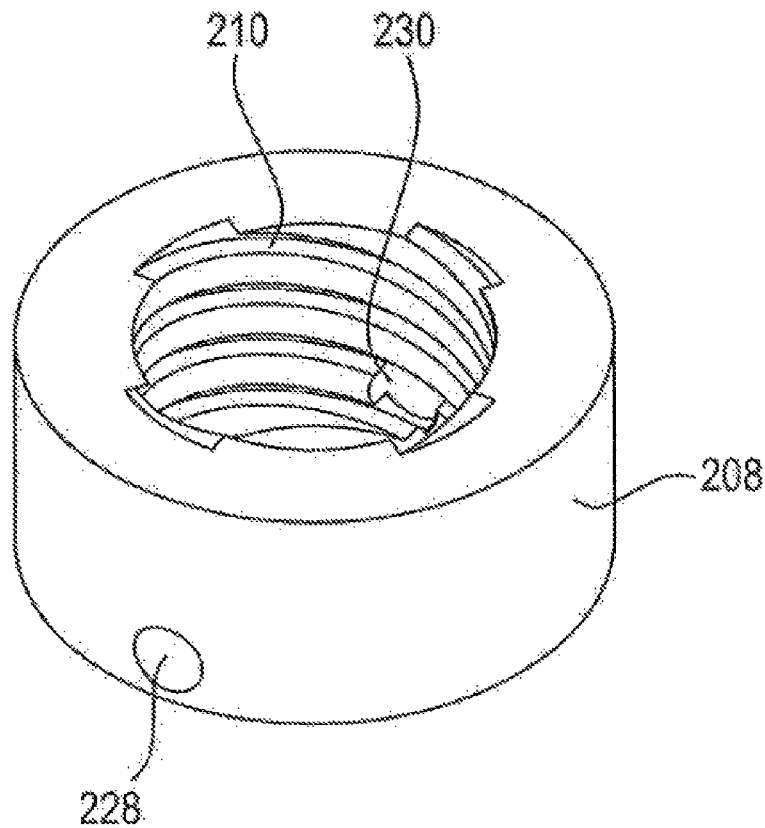
FIG. 37 relates to a perspective view of a first thread ring of the adjusting device according to the third embodiment.

FIG. 37 shows a perspective view of the first threaded ring 208. The first threaded ring 208 has a first through hole 228 and a second through hole 230, in which the first pin 216 and the second pin 218 are respectively led. The first threaded ring 208, arranged rotationally firmly about the second pivot axis A2 by the pins 216 and 218, is displaced along the second pivot axis A2 according to the pitch 224 of the first outer thread 206 upon a rotation of the shaft 204. Moreover, the second threaded ring 212 during this rotation of the shaft 204 is displaced along the second pivot axis A2 according to the pitch 226 of the second outer thread 207 in the opposite direction to the direction of displacement of the first threaded ring 208.

By the displacement of the first threaded ring 208 and the second threaded ring 212 upon rotation of the activating element 50, the first arresting unit 234 and the second arresting unit 236 are unlocked as by the displacement of the first cam 86 and the second cam 126 of the adjusting device 26.

Otherwise, the construction and function of the second rotary bearing 202 correspond to those of the second rotary bearing 40.

Figure 38:
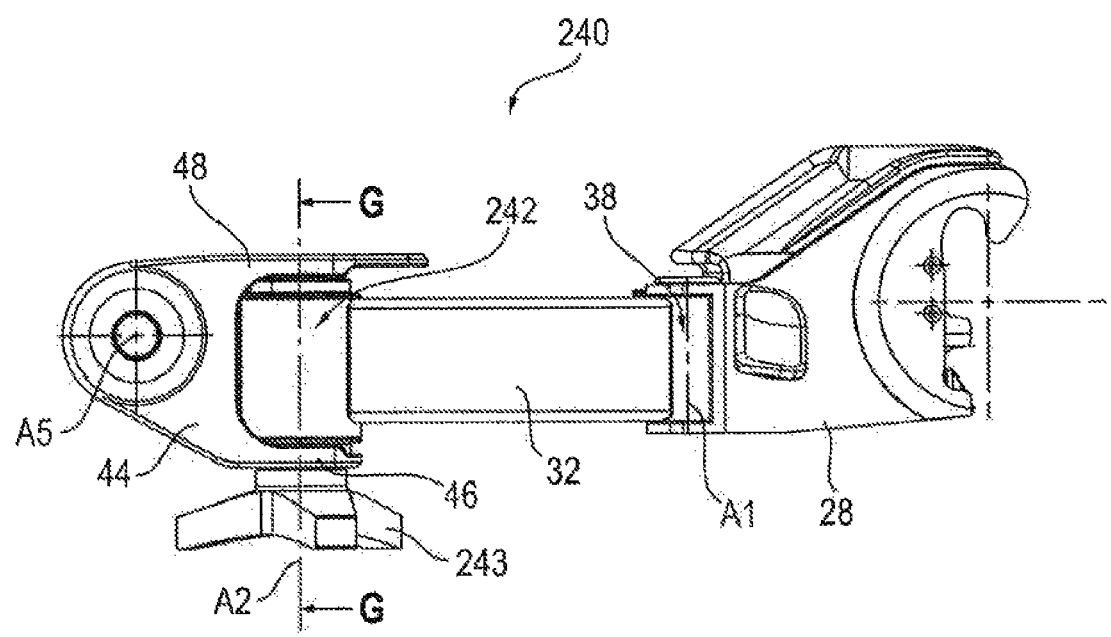
FIG. 38 relates to a side view of an adjusting device according to a fourth embodiment.

FIG. 38 shows a side view of an adjusting device 240 according to a fourth embodiment. In place of the second rotary bearing 40 of the adjusting device 26 there is provided a second rotary bearing 242 and in place of the activating element 50 a star-shaped activating element 243.

Figure 39:
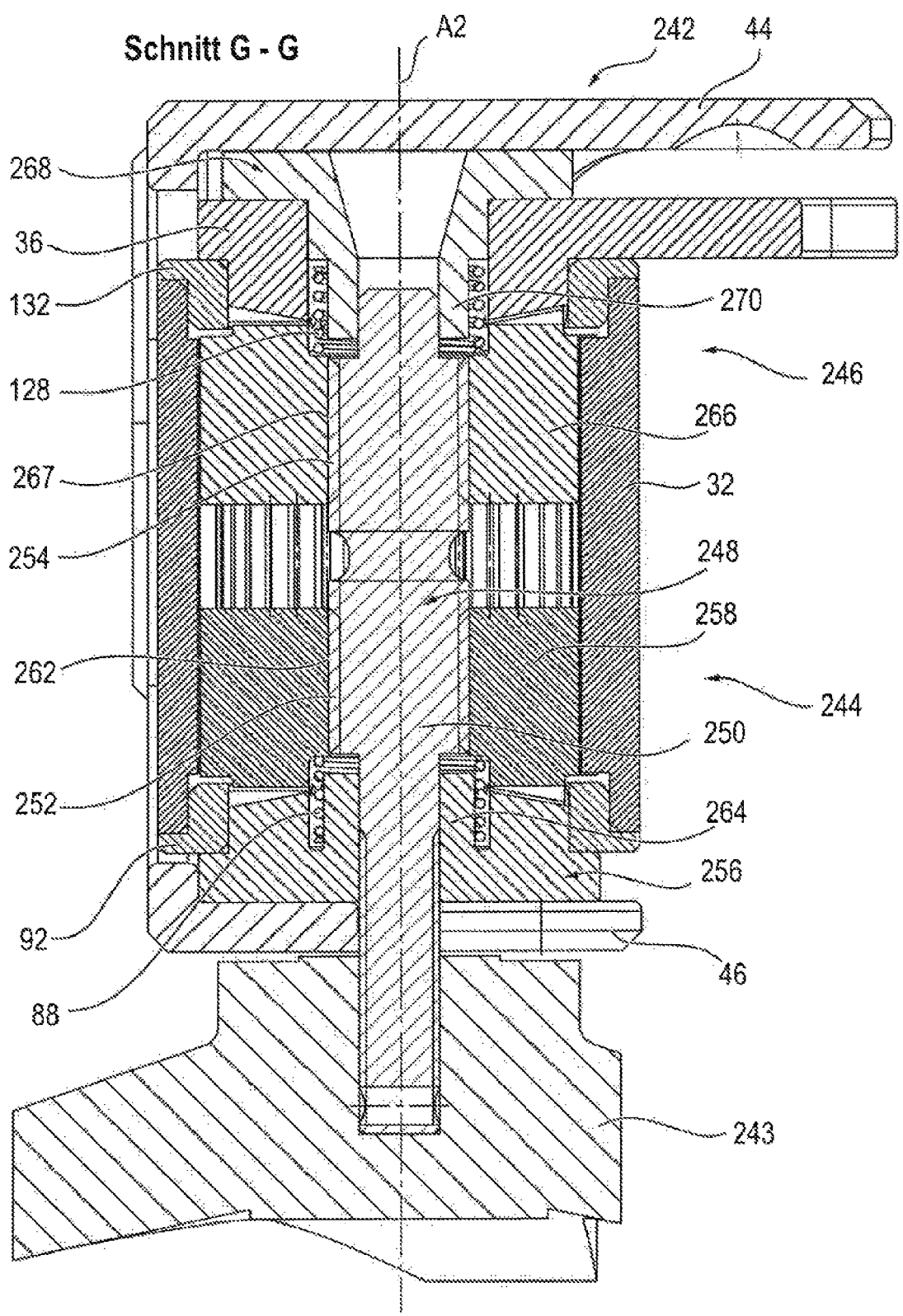
FIG. 39 relates to a cross section along sectioning line G-G in FIG. 38.
Figure 40:
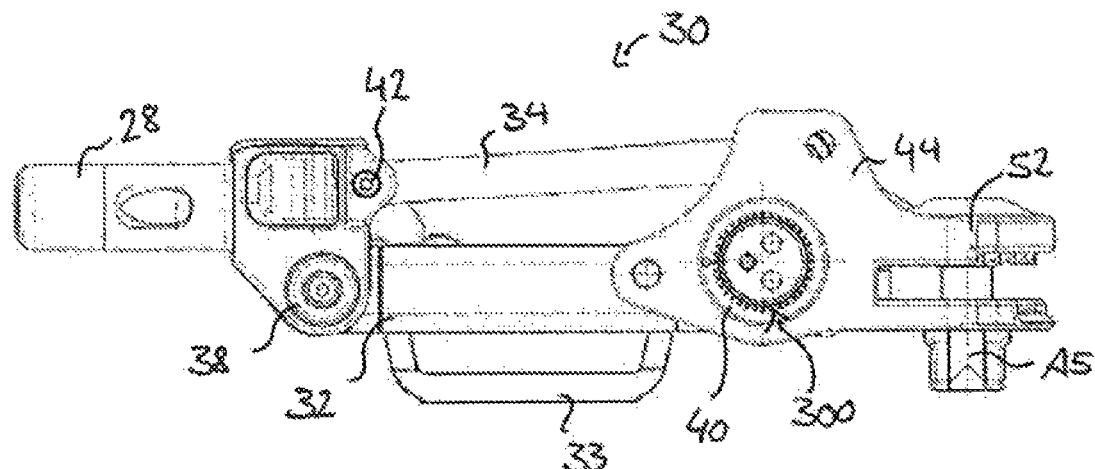
FIG. 40 relates to a top view of an adjusting device according to a fifth embodiment FIG. 41 relates to a view of the adjusting device of FIG. 40 in a different position of the four-bar linkage.
Figure 41:
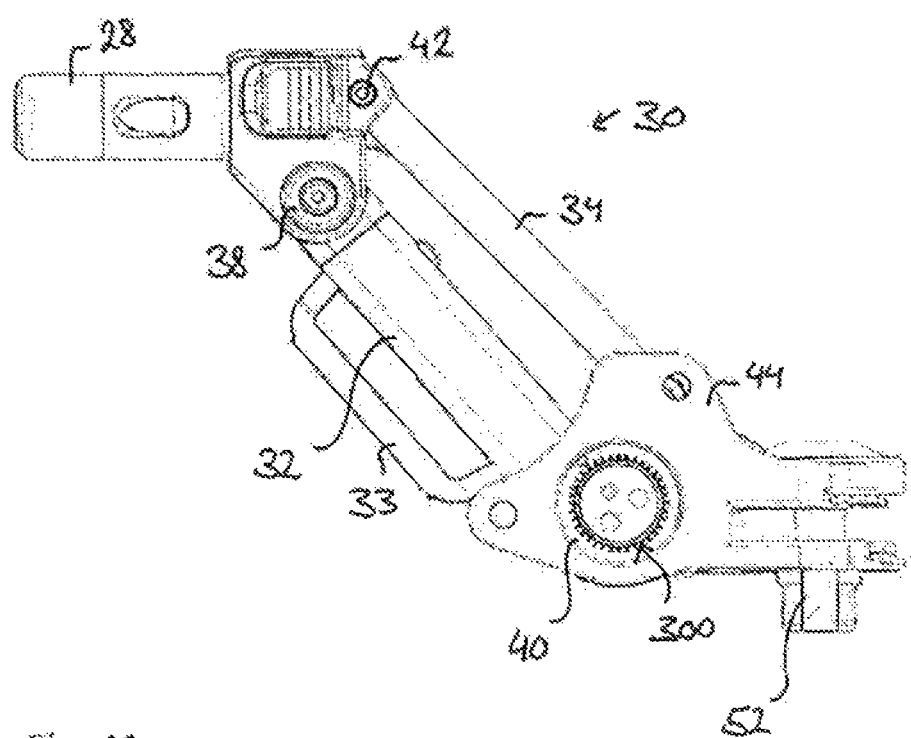
Figure 42:
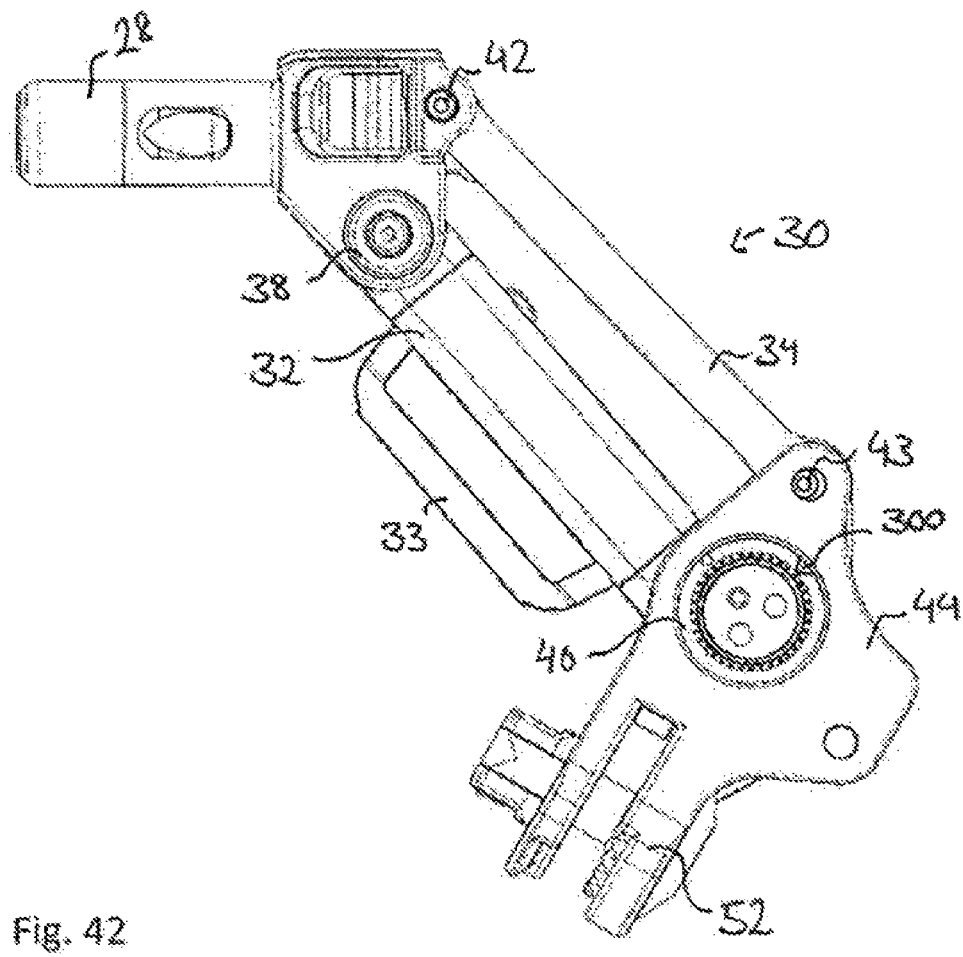
FIG. 42 relates to a view of the adjusting device of FIG. 41, in which additionally the connection element has been pivoted to the support surface segment relative to the four-bar linkage.
Figure 43:
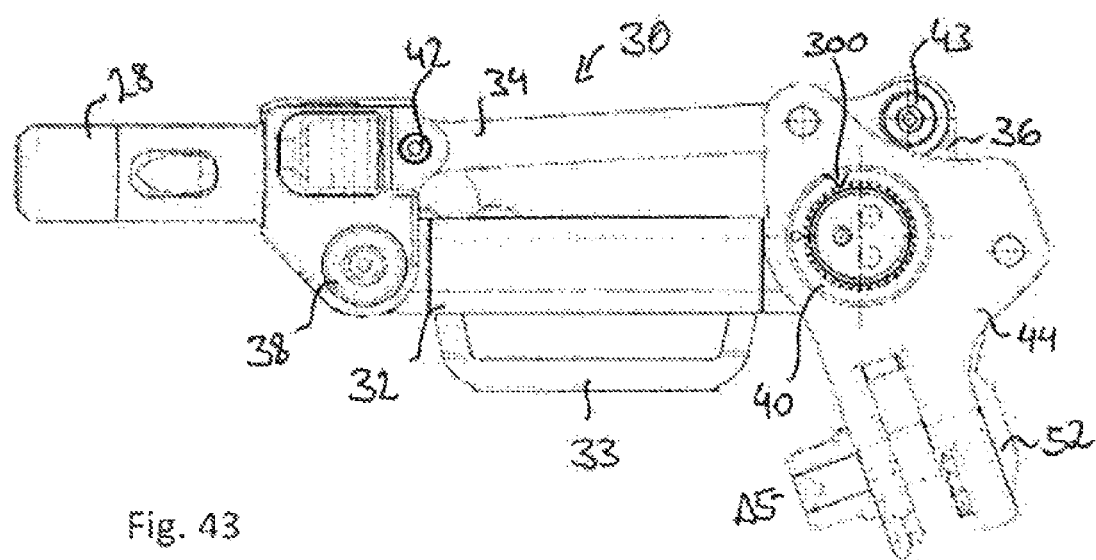
FIG. 43 relates to a view of the adjusting device of FIG. 40, in which the connection element has been pivoted to the support surface segment relative to the four-bar linkage.
Figure 44:
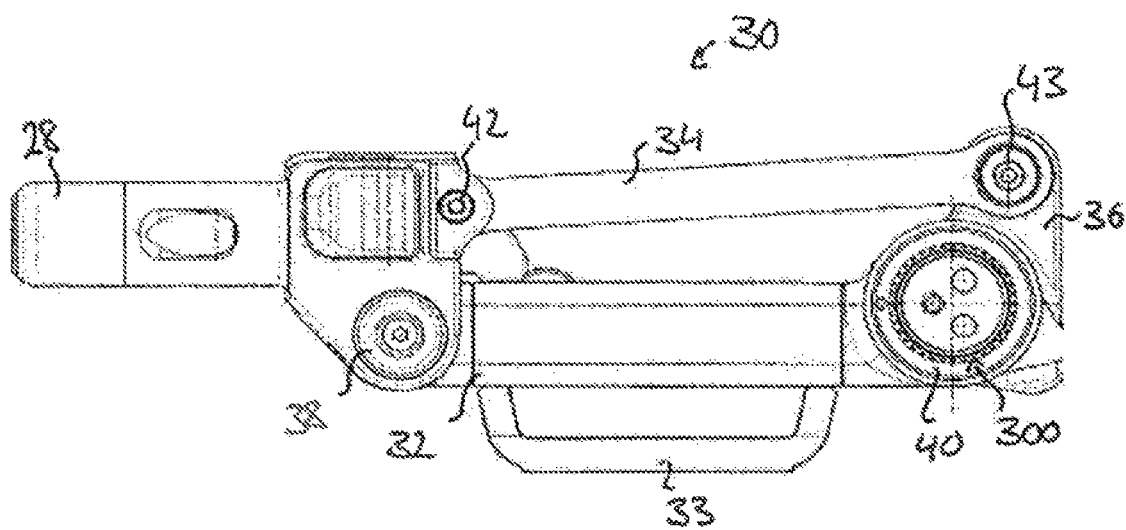
FIG. 44 relates to a view of the adjusting device of FIG. 40, where the connection element is omitted so that only the components of the four-bar linkage can be seen.
Figure 45:
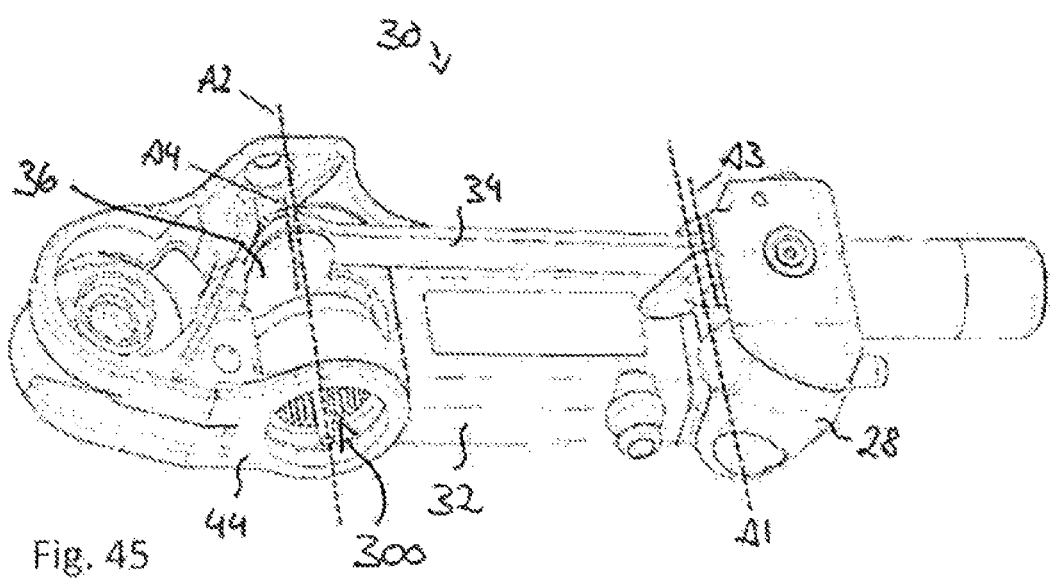
FIG. 45 relates to a perspective view of the adjusting device of FIG. 40.

FIG. 39 shows a cross section representation of the adjusting device 240 shown in FIG. 38 along the sectioning line G-G. In place of the first arresting unit 78 of the first and second embodiment there is provided a first arresting unit 244, in place of the second arresting unit 80 of the first and second embodiment there is provided a second arresting unit 246, and in place of the shift element 82 of the first and second embodiment there is provided a shift element 248.

The shift element 248 comprises a shaft 250 with a first outer thread 252 and a second outer thread 254. The pitches of the first outer thread 252 and the second outer thread 254 are opposite. The magnitudes of the pitches of the outer threads 252 and 254 are preferably equal, so that only the directions of the pitches are different.

The first arresting unit 244 differs from the first arresting unit 78 by having a first joint element 256 in place of the first joint element 62 and by having a first locking element 258 in place of the first locking element 84 and the zigzag spring 90.

The first locking element 258 has a through hole with an inner thread 262, which is formed complementary to the first outer thread 252. Moreover, the first locking element 258 is arranged around the shaft 250 such that its inner thread 262 stands at least partly in engagement with the first outer thread 252. Moreover, the first locking element 258 has an end-face gearing, like that of the first locking element 84.

The first joint element 256 has a gearing formed like that in the first joint element 62 of the first and second embodiment, which stands in engagement with the end-face gearing of the first locking element 258 in the shown locked state of the first arresting unit 244. By contrast with the first joint element 62 of the first and second embodiment, the first joint element 256 has a shorter bearing journal 264, having no recesses corresponding to the recesses 72a and 72b. Otherwise, the construction and arrangement of the first joint element 256 and the first locking element 258 each correspond to those of the adjusting device 26.

Moreover, the second arresting unit 246 of the fourth embodiment differs from the second arresting unit 80 by having in place of the second locking element 124 a second locking element 266 and by having in place of the second joint element 64 and the zigzag spring 130 a second joint element 268.

The second joint element 268 has a bearing journal 270 not having any recesses corresponding to the recesses 74a and 74b.

The second locking element 266 has a through hole, in which an inner thread 267 is formed complementary to the second outer thread 254 and standing at least partly in engagement with the latter. The inner thread 267 of the second locking element 266 can be configured both as a fine thread and as a coarse thread like the inner thread 214 of the second threaded ring 212. On the end face of the second locking element 266 there is formed a gearing corresponding to the second locking element 124, standing in engagement with the gearing 136 of the coupler 36 in the shown locked state of the second arresting unit 246. Otherwise, the construction and arrangement of the second locking element 266 and the second joint element 268 each correspond to those of the adjusting device 26.

The arresting units 244 and 246 can each be unlocked by a rotation of the activating element 243. Upon rotation of the activating element 243, the shaft 250 together with the activating element 243 is rotated about the second pivot axis, whereby the first locking element 258 and the second locking element 266 are moved toward each other. In the end position reached by the locking elements 258 and 266, their end-face gearings are no longer in engagement with the gearing of the first joint element 256 and that of the coupler 36, so that the arresting units 244 and 246 are each in their unlocked state.

Otherwise, the construction and arrangement of the adjusting device 240 according to the fourth embodiment each correspond to those of the adjusting device 26.

FIGS. 40 to 51 show a fifth embodiment of the adjusting device, which differs from the previously described embodiments primarily in regard to the design of the arresting units. The four-bar linkage 30 of the fifth embodiment has the same construction as described for the previous embodiments. As shown in FIGS. 40 to 45, the four-bar linkage 30 of the fifth embodiment thus also has the same degrees of freedom of motion as described previously, while the second pivot axis A2 can be swiveled by the four-bar linkage 30 about the first pivot axis A1, and in addition the first connection element 44, to which the support surface segment is attached, can swivel about the second pivot axis A2.

If the axial spacings of the oppositely situated components have the same length in the four-bar linkage 30, it is a parallelogram linkage, with which one can accomplish a parallel offsetting of the two connection geometries. The embodiments of the four-bar linkage 30 described here and shown in the figures each have such an axial spacing relationship. Alternatively, however, in many cases it may be advantageous to realize axial spacings of different length, resulting in a superpositioning of rotation and sideways offsetting of the two end members during the movement of the four-bar linkage.

In the four-bar linkage 30 shown in FIGS. 40 to 45, a bracket 33 is formed integrally with the first guide bar 32 or attached to it for the attachment of accessories. Such a bracket 33 may also be provided on the first guide bar 32 according to each of the other embodiments described previously.

In order to effectively block a four-bar linkage, various possibilities exist. One simple solution is that in which two guide bars of the four-bar linkage which are connected to a common axis are blocked at an angle to each other. The position of the axis in this case can be chosen freely.

According to the first through fourth embodiments described above, a blocking of the four-bar linkage 30 is realized by crown-geared components. The elements being blocked then have corresponding crown gearings on the sides facing each other, which can be joined or separated by an eccentric mechanism or by a thumb screw. The fifth embodiment concerns an alternative solution of the problem of the effective blocking of the four-bar linkage 30.

In this case, the components being blocked have an interior spur wheel gearing instead of a crown gearing, i.e., a so-called hollow gear. A splined or serrated gearing is considered to be advantageous here, because these can be produced in an especially economical method and do not require the use of special tooling. Now, if a corresponding spur gear which stands in engagement with a hollow gear of the first guide bar 32 is displaced axially so that it also stands in engagement with the hollow gear of the coupler 36 as the second guide bar element of the four-bar linkage 30, the four-bar linkage 30 is effectively blocked between the first guide bar 32 and the coupler 36. The width of the spur gear should advantageously be at least broad enough to securely take up and pass on the forces in both hollow gears.

The arresting unit 300 of the fifth embodiment is based on a geared shaft element, which is mounted displaceably along the bore axis in a corresponding internally geared bore. The internally geared bore in an examplary embodiment is centered with an axis of the four-bar linkage being blocked. FIGS. 40 to 45 show each time the arrangement of the corresponding gearings in the second rotary bearing 40 of the four-bar linkage 30.

FIGS. 46 to 49 each show the arresting unit 300 in different shift positions. A coupling piece 302 of the arresting unit 300 is arranged in the second rotary bearing 40 of the four-bar linkage 30, concentric to the second pivot axis A2.

The coupling piece 302 comprises one section with an external gearing 302a and, adjoining this in the axial direction, a centering extension 302b. The external gearing 302a engages with corresponding internal gearings on the first guide bar 32, the coupler 36 and on the first connection element 44, of which in FIGS. 46 to 49 only the internal gearing 32a on the first guide bar can be seen. By an activating element 304, the coupling piece 302 can be displaced axially.

Figure 46:
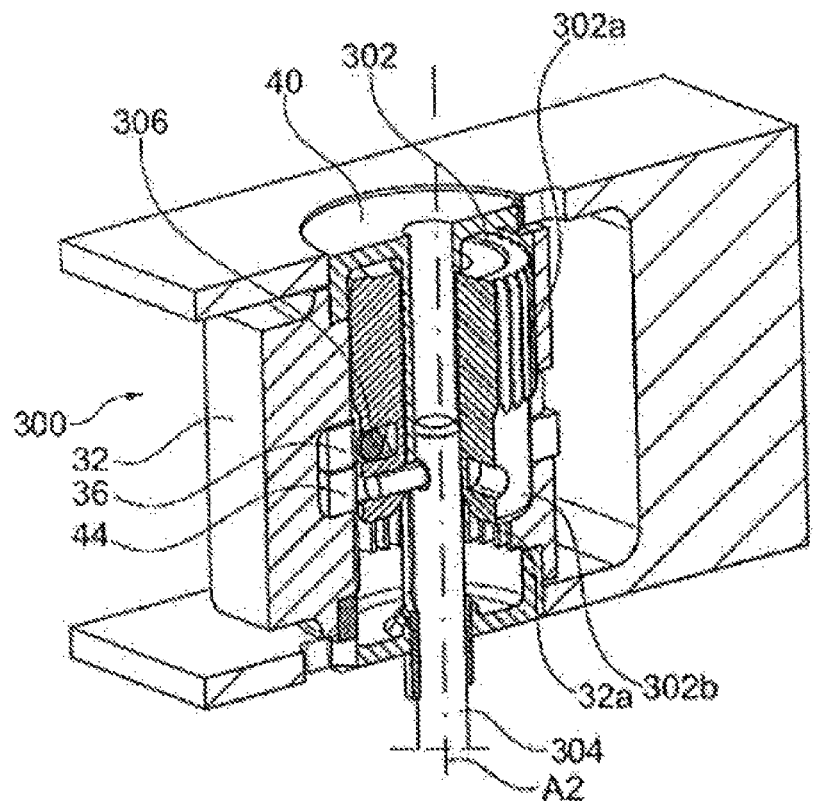
FIG. 46 shows a cutaway perspective view of a combined arresting unit, which can be used in the fifth embodiment, the arresting unit being in a first shift position.

In the first shift position of the arresting unit 300 shown in FIG. 46, the centering extension 302b serves to hold the coupler 36 of the four-bar linkage and the connection element 44 in position in the second rotary bearing 40, while these elements can rotate freely about the joint axis A2. Thus, in the first shift position, the movement of the four-bar linkage 30 and the additional degree of freedom of motion of the first connection element 44 about the second pivot axis A2 is not restricted.

Figure 47:
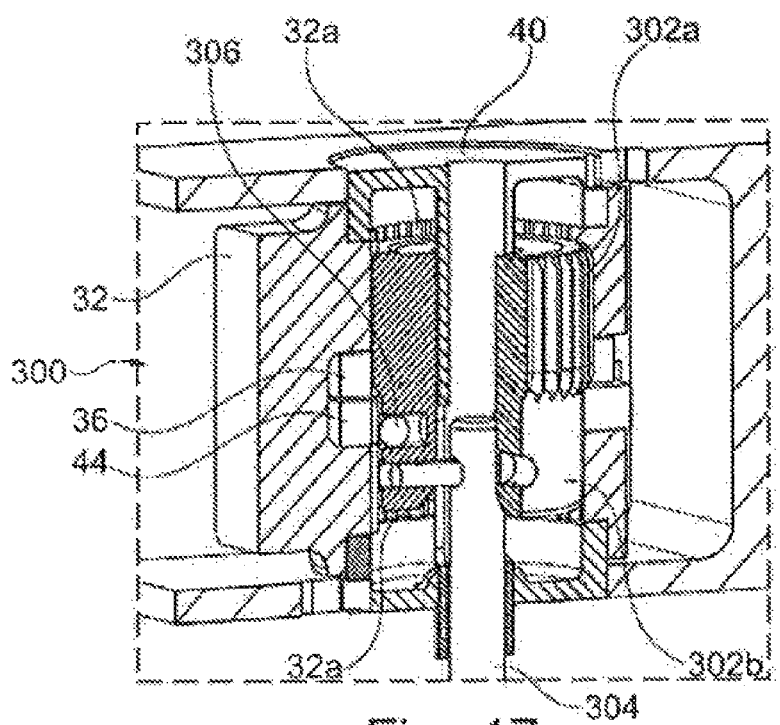
FIG. 47 shows the arresting unit of FIG. 46 in a second shift position.

FIG. 47 shows a second shift position, in which the coupling piece 302 has been displaced in the axial direction such that the external gearing 302a engages both with the internal gearing 32a of the first guide bar 32 and with the internal gearing of the coupler 36. In this way, the motion of the four-bar linkage 30 is blocked. The first connection element 44, however, can continue to rotate freely on the centering extension 302b of the coupling piece 302, so that the additional degree of freedom of motion of the support surface segment about the second pivot axis A2 relative to the four-bar linkage 30 continues to be enabled.

Figure 48:
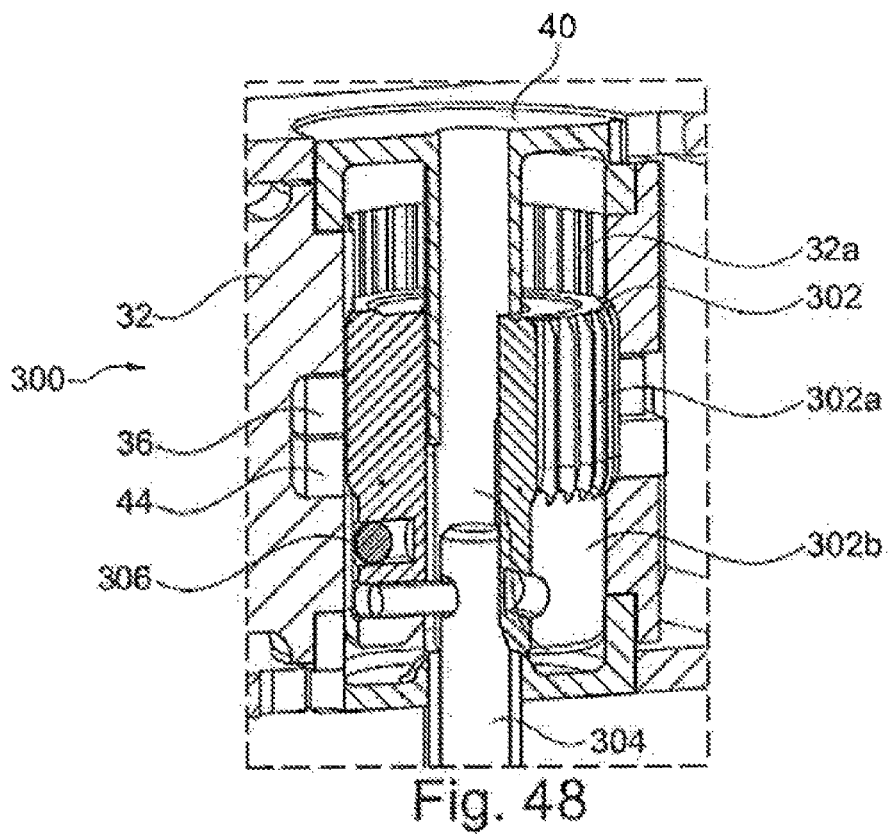
FIG. 48 shows the arresting unit of FIG. 46 in a third shift position.
Figure 49:
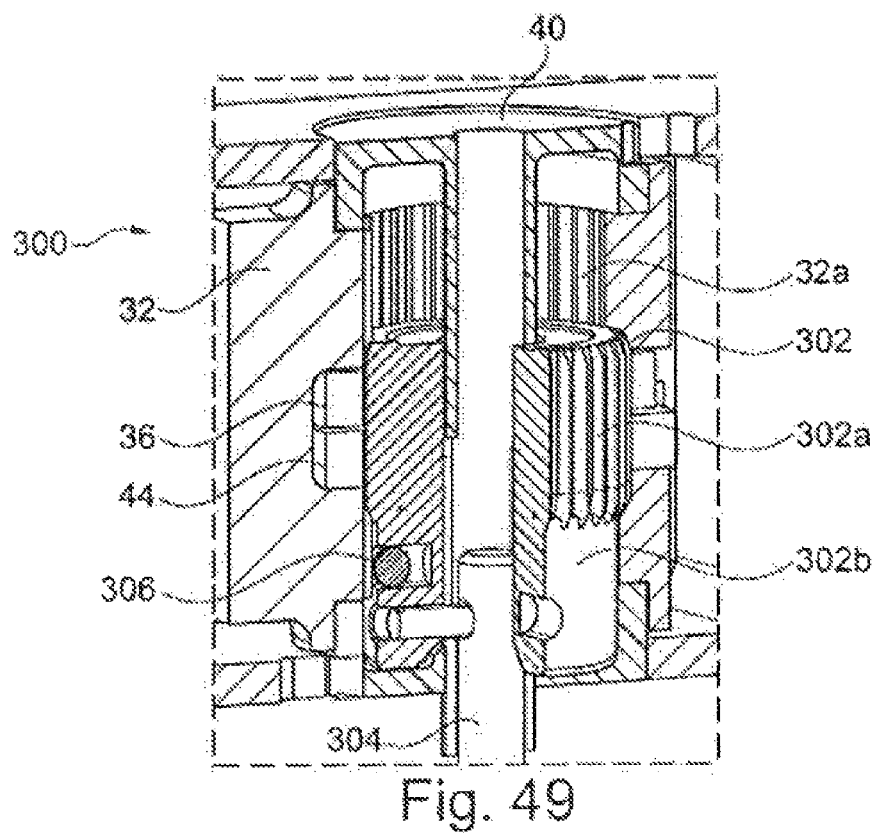
FIG. 49 shows the arresting unit of FIG. 46 in a fourth shift position.

FIGS. 48 and 49 show a third and a fourth shift position of the arresting unit 300. In the third and in the fourth shift position the gearings 302a of the coupling piece 302 are in contact with the gearing of all three movable elements of the second rotary bearing 40 in Contact and effectively block the rotational movements of the four-bar linkage 30 and the additional degree of freedom of the first connection element 44. The represented first guide bar 32 in the embodiment shown here is advantageously designed such that the gearing 32a is arranged in an upper section and in a lower section of the first guide bar 32 in the second rotary bearing 40. In this way, the torques which can be transmitted by the arresting unit 300 in the fourth shift position shown (see FIG. 49) can be larger than in the third shift position (see FIG. 48). Also in the fourth shift position the play is significantly reduced between the guide bars being blocked, since the possible tilting of the geared coupling piece is less on account of the necessary matching of the play of the coupling elements (gearings) to each other. At the same time, the available shear surface of the stressed teeth of the coupling piece is enlarged.

Figure 50:
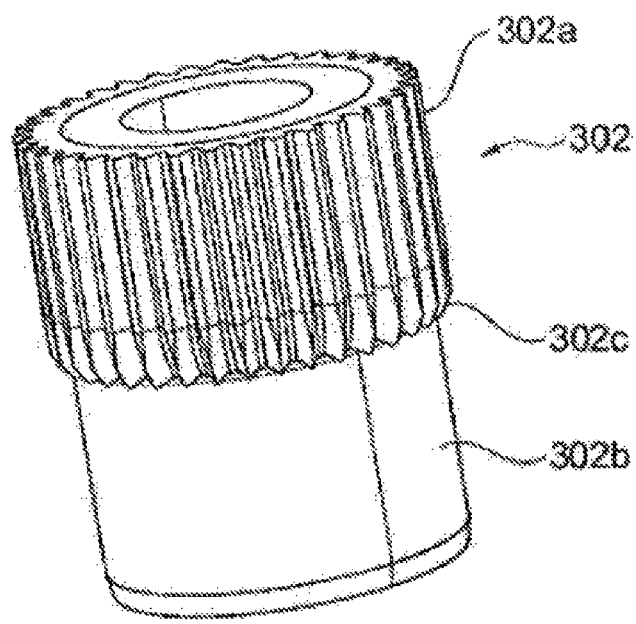
FIG. 50 shows a view of a coupling piece of the arresting unit of FIG. 46.
Figure 51:
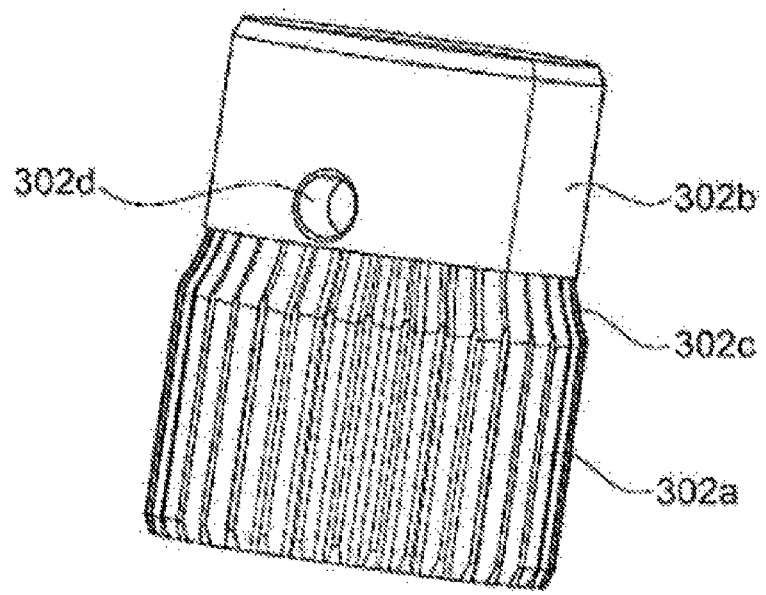
FIG. 51 shows another embodiment of the coupling piece of FIG. 50.
Figure 52:
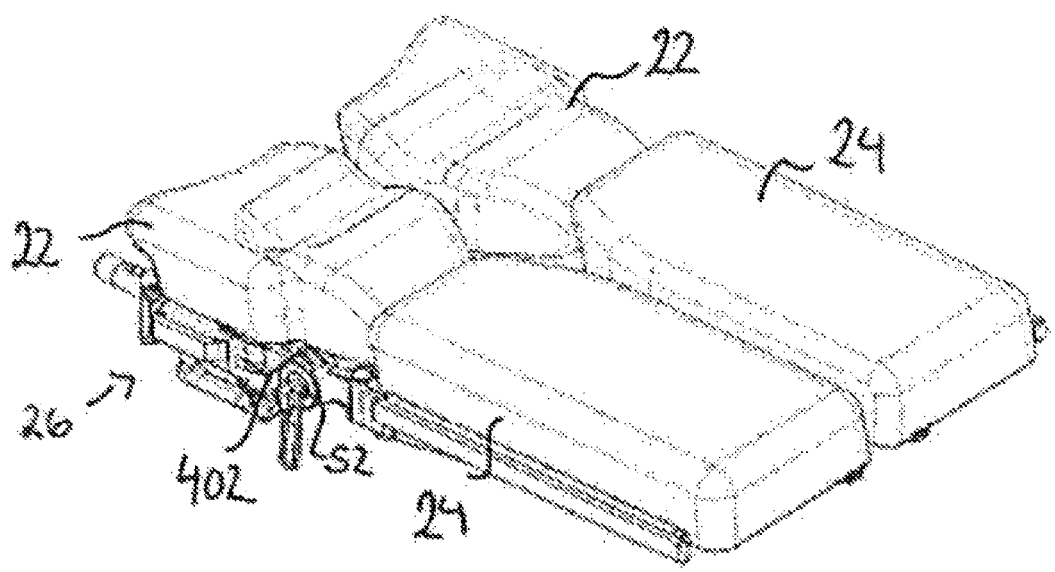
FIG. 52 shows another embodiment of the adjusting device on the example of a pair of leg plates.
Figure 53:
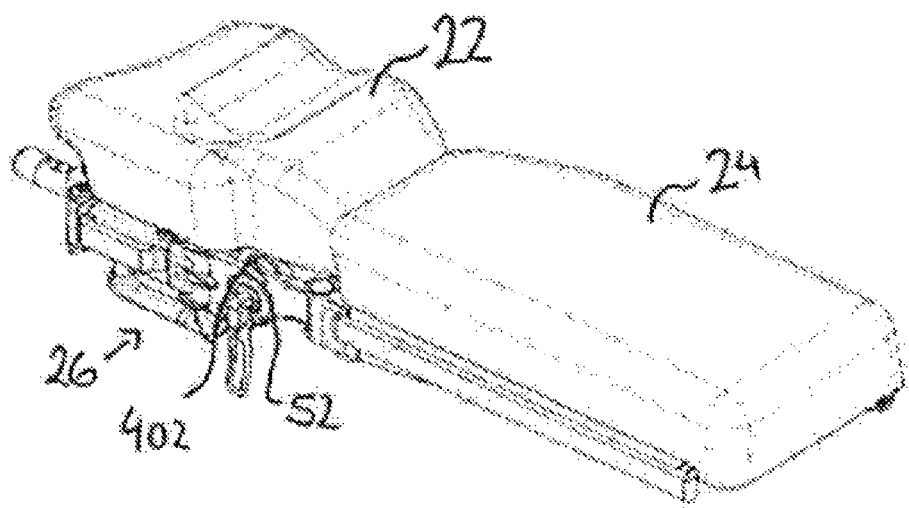
FIG. 53 shows a leg plate of the pair of leg plates represented in FIG. 52.
Figure 54:
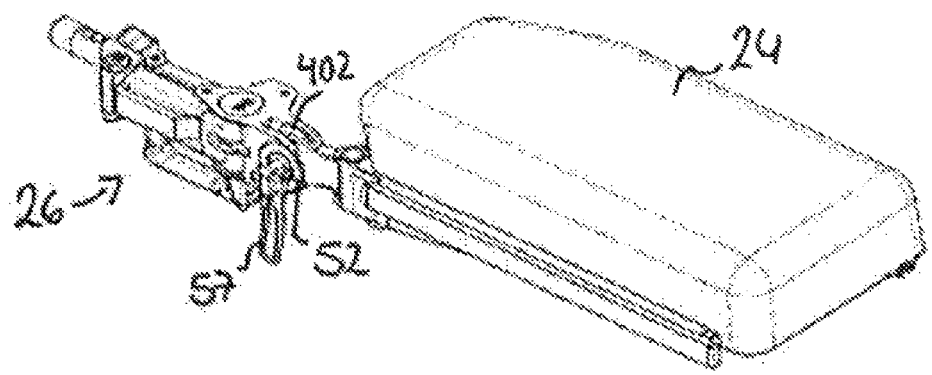
FIG. 54 shows the leg plate of FIG. 53, where the thigh support has been removed to make visible the adjusting device underneath.

FIGS. 50 and 51 show an example of a coupling piece 302 which can be used in the above described embodiment of the arresting unit 300. As described above, the coupling piece 320 has a first section with an external gearing 302a, and adjacent to this a second section, serving as a centering extension 302b. When the coupling piece 302 is shifted between the first to fourth positions as shown in FIGS. 46 to 49, the problem may occur that, depending on the angle at which the first guide bar 32, the coupler 36 and/or the first connection element 44 are placed to each other, the teeth 302a of the coupling piece 302 are not aligned with the tooth spaces of the internal gearing of the element being coupled. A blocking of the four-bar linkage 30 and its additional degree of freedom then no longer occurs and can only be achieved if the user/operator positions the guide bars to each other so that an alignment of tooth and tooth space is assured. But since the user cannot see these elements of the coupling but can only operate the control elements, this kind of alignment must be done blind. Therefore, in the example shown in FIGS. 50 and 51, several possibilities are shown for accomplishing a reliable alignment of the external gearing 302a of the coupling piece 302 relative to the respective internal gearings.

According to a first embodiment, corresponding detent elements 306 (see FIG. 46-49) may be arranged for example on the centering extension 302b of the coupling piece 302 in a bore 302d, such as ball-shaped detent elements 306. The balls 306 may be spring-loaded and pressed into the internal gearing of the hollow gear of the respective element being shifted. This produces the special situation that the detent elements 306 engage respectively in the tooth spaces of the internal gearing of the guide bars being coupled and thus provide the user a haptic and optionally an acoustic signal, so that the user can easily activate the coupling blind. In the exploded representations of FIG. 46-49, one such detent ball 306 is shown in a bore 302d in the cylindrical centering extension 302b in cross section view. Alternatively, the detent elements could also be arranged at a different place between the elements being coupled, and then they could engage in an additionally provided detent structure, for example.

According to another embodiment, the detent elements 306 can be entirely eliminated, in order to enable an easier installation of the arresting unit 300. In this case, the design of the geometry of the transition from the tooth tips to the side surfaces of the spur gear segment of the coupling piece 302 may be configured such as to produce a kind of catching funnel, so that the teeth of the hollow gear are received in a tapering groove between the teeth of the external gearing 302a of the coupling piece 302. This significantly decreases the likelihood that the side borders of the teeth of the geared coupling piece 320 will collide with the side borders of the teeth of the element being coupled and thus block the shifting process. Such catching funnels are shown in FIGS. 50 and 51 in a region 302c of the coupling piece 302 adjoining the external gearing 302a in the axial direction.

Since in the latter mentioned embodiment there is no haptic feedback for the user to signal a successful inserting of the internal gearing of the element being coupled in the external gearing of the coupling piece 302, according to certain embodiments a combination of the two solution approaches is also possible for the easy centering of tooth to tooth space. In this way, the user can quickly find the optimal alignment of the elements and block the movement of the four-bar linkage 30 and/or the additional degree of freedom about the second pivot axis A2 without mistake.

The design of the blocking geometry is based preferably on a shaft serration. Other kinds of gearing, such as evolvent, cycloid, circular arc, Wildhaber/Novikov gearing or blocking geometries which allow a small division are also possible. The advantage of the shaft serration is that one may transmit large torques here with small teeth on account of the large rack width, and on the other hand one can build a very geometrically small device for the shifting process, independent of the patient weight. Since one can work with small teeth in this case, the expected diameter of the joint coupling is small than that of crown gear solutions with the same angular division.

It is furthermore seen as an advantage that a portion of the spur gear has a cylindrical projection on at least one side, with which the second guide bar can be mounted and centered on the axis in a nonblocked state. Of course, the centering spike can also be realized with convex, barrel-shaped, conical or a combination of the different geometrical shape elements.

Through utilization of the geared coupling piece, the mounting of the lever element being shifted can be much more simple in design.

A further benefit in the realization of the coupling by an axially displaceable spur gear segment is that, besides the blocking of the two elements of the four-bar linkage, additional elements such as the first connection element 44 can likewise be blocked very easily.

Since the leg plate should not only be adjusted optimally in the spaced beneath the patient, but also must securely support the weight of the body parts of a patient lying on the leg plate, it is advantageous to combine both of these functions. Therefore, the structural elements of the four-bar linkage are designed with the additional degree of freedom so that the individual guide bars can safely relay the forces and moments imposed by the weight of the patient.

According to certain embodiments, the two terminal elements as well as a first guide bar 32 can be designed with special stability so that they can safely transmit the bending and torsional moments, while the coupler 36 and the first connection element 44 only need to take up and pass on the forces which secure the angular orientation of the leg plate in space.

In summary, the adjusting device of the above described embodiments, among other advantages, makes it possible to reduce as much as possible certain risks to the patient and to the user. The four-bar linkage 30 with an additional degree of freedom about an axis A2 of the four-bar linkage 30 enables an adjustment of the support surface segments in a variety of different positions and settings, in order to meet the corresponding needs for a supporting of the patients in different surgical procedures.

Furthermore, mechanical end stops may be provided in the adjusting device which effectively prevent a movement of the leg plates relative to each other. Furthermore, it can be provided that an automatic blocking of the additional degree of freedom occurs in a special setting of the leg plate, and this regardless of the manually actuated locking of the leg plate mechanism. A blocking of the four-bar linkage 30 and the additional degree of freedom can be achieved by a control element 304, with which a sequential releasing of the individual movements can be made possible.

In the adjusting device of the above described embodiments, only one control element is needed for the releasing and blocking of the multiple-joint mechanism. Even upon opening of the multiple joint mechanism only a parallel displacement occurs, and even during a malfunction the patient will not fall off. The previously described arresting unit 300 makes possible an almost force-free activating of the blocking device and a closing force independent of the patient's weight. Furthermore, the arresting unit 300 is easy to install, since no time-consuming adjustment of a tolerance compensation is needed as compared to crown gear blocking devices.

The engaging of the external gearing of the coupling piece 302 with corresponding internal gearings of the elements being blocked effectively prevents a slippage of the gearing under excessive load. Furthermore, the arresting unit 300 can be realized in a small structural space, comprising few structural parts and having a low intrinsic weight.

The mechanism and the above-described properties of the device have been described above on the example of a multipart leg plate. But such a device could also be used for other supporting options, such as arm supports.

FIGS. 52 to 59 are addressed to a sixth embodiment, in which an additional degree of freedom on an axis of the four-bar linkage can be effectively blocked and released in defined positions of a leg plate by a rotation locking device 400.

As illustrated in FIGS. 52 to 57, the above described adjusting device is preferably used for a leg plate 22, 24. Besides simple leg plates, which can only be spread to the side and swiveled laterally about one or more axes, there are also those in which a joint 52 is arranged between the part 22 for supporting the thigh and the part 24 for supporting the shin, by which the plates can be moved at an angle about an axis A5 which is oriented preferably parallel to the cushion surface of the bearing area.

In the so-called knee/elbow posture of a patient on the bearing area, the shin plate in known adjusting devices is forcibly guided by the four-bar linkage and therefore is always approximately oriented so that the thigh of the patient is oriented almost perpendicular to the surface of the shin plate. This makes it unlikely for the kneeling patient to slip off from the shin plate.

Figure 56:
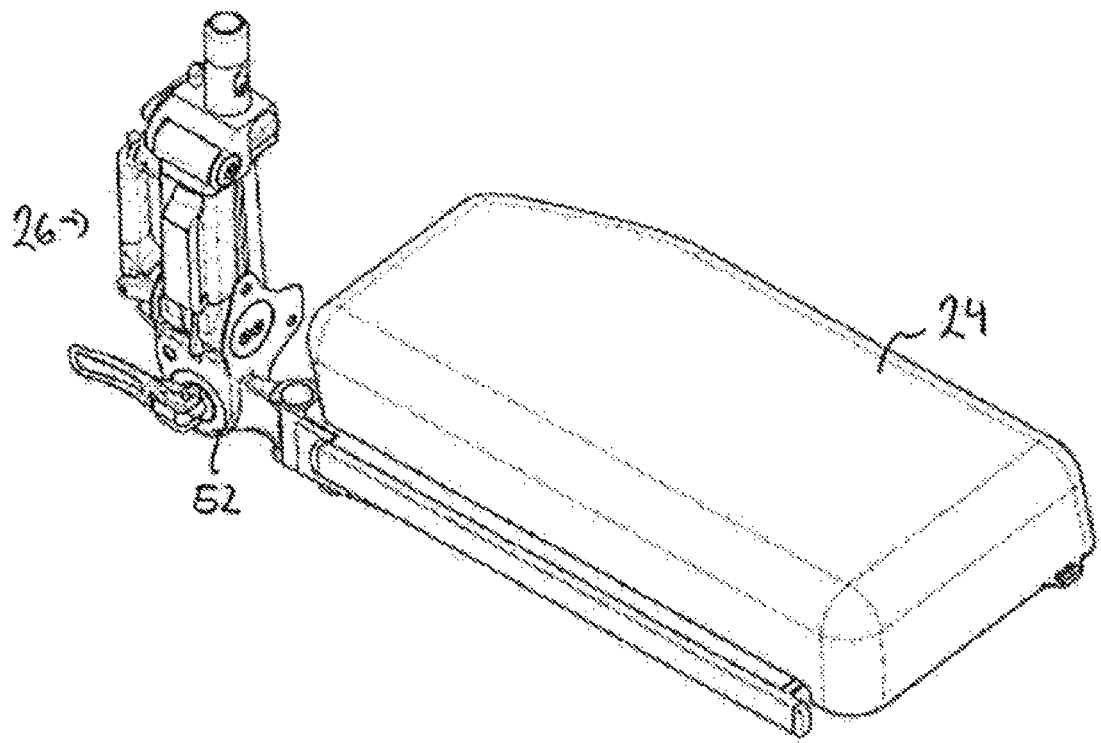
FIG. 56 shows a perspective view of the leg plate of FIG. 54, where the shin plate has been pivoted relative to the thigh plate.
Figure 57:
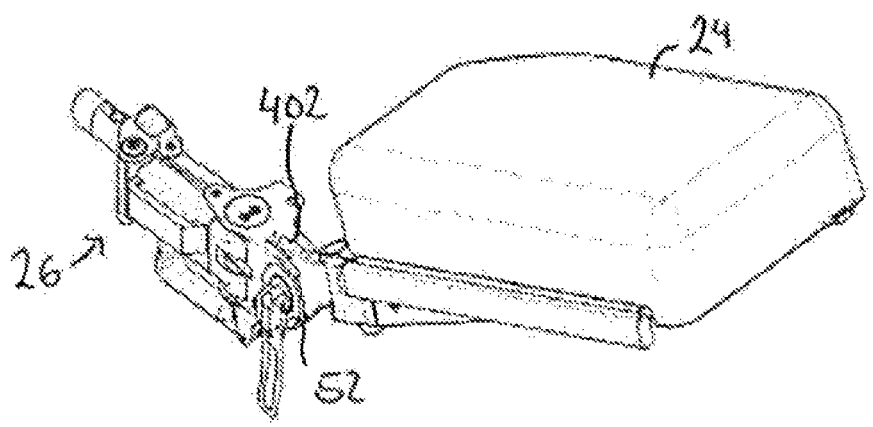
FIG. 57 shows the leg plate of FIG. 56 in a different angle position.

As a result of the new additional degree of freedom at an axis of the four-bar linkage 30 in the above described adjusting device 26, the portion 24 which can be used as the shin plate can be moved about this additional degree of freedom (see FIG. 56 for a representation of a shin plate 24 for a knee/elbow posture with the adjusting device 26 as described above). This might have the effect that, if the user accidentally opens the joint blocking of the second rotary bearings 40, the cushion surface of the shin plate 24 may rotate by more than 60° and a patient can no longer kneel safely on it.

In connection with the embodiment shown in FIGS. 13 to 20 an effective solution for blocking this degree of freedom in a particular angle positioning of the shin plate relative to the thigh plate has already been described. But one drawback of this solution is that this blocking only works effectively in the extreme positioning if very fine manufacturing and installation tolerances are observed.

The sixth embodiment described below with reference to FIGS. 52 to 59 provides an effective rotation locking device 400 for this degree of freedom which is less sensitive to geometrical tolerances.

Figure 55:
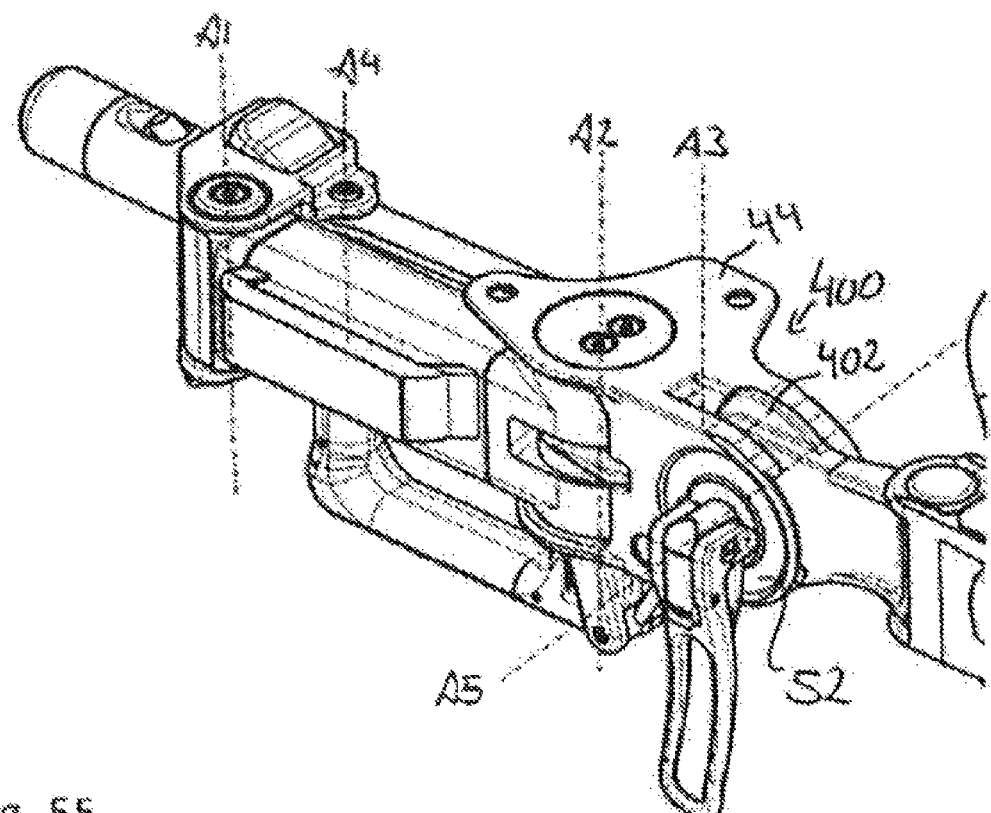
FIG. 55 shows a perspective view of the adjusting device of FIG. 54.

As is shown for example in FIG. 55, a contact element 402 is formed, such as an oblong projection 402 in the form of a cockscomb, on the part of the joint 52 which is moved relative to the first connection element 44, making possible the additional degree of freedom of movement relative to the second pivot axis A2 of the four-bar linkage 30. This contact element 402 effectively makes contact, in certain positionings of the joint 52 about the fifth pivot axis A5, with a portion of the four-bar linkage 30 so that the additional degree of freedom of rotation about the second pivot axis A2 is effectively hindered.

Figure 58:
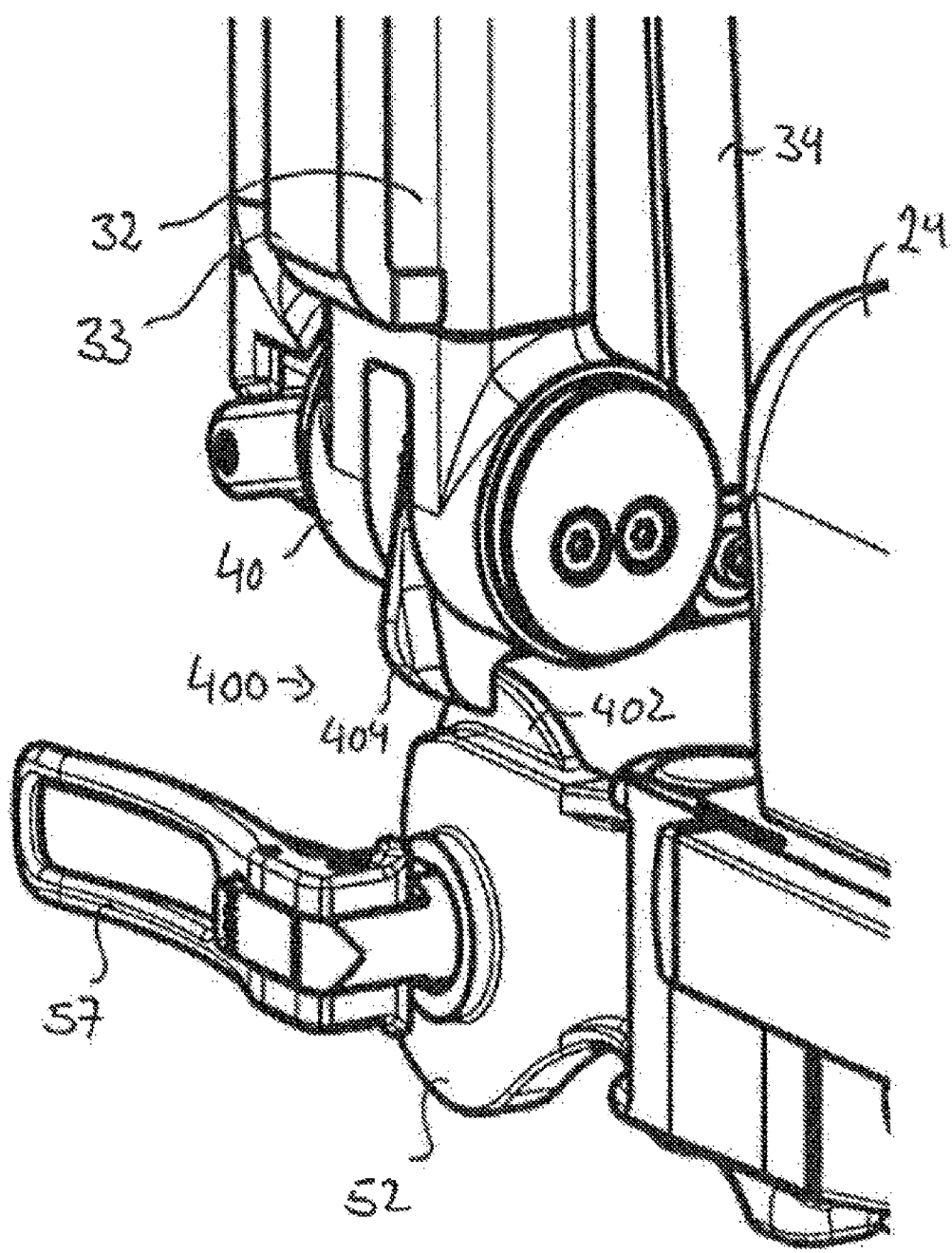
FIG. 58 shows a perspective view of the adjusting device according to the sixth embodiment, where components have been omitted in order to show the active surfaces making contact.
Figure 59:
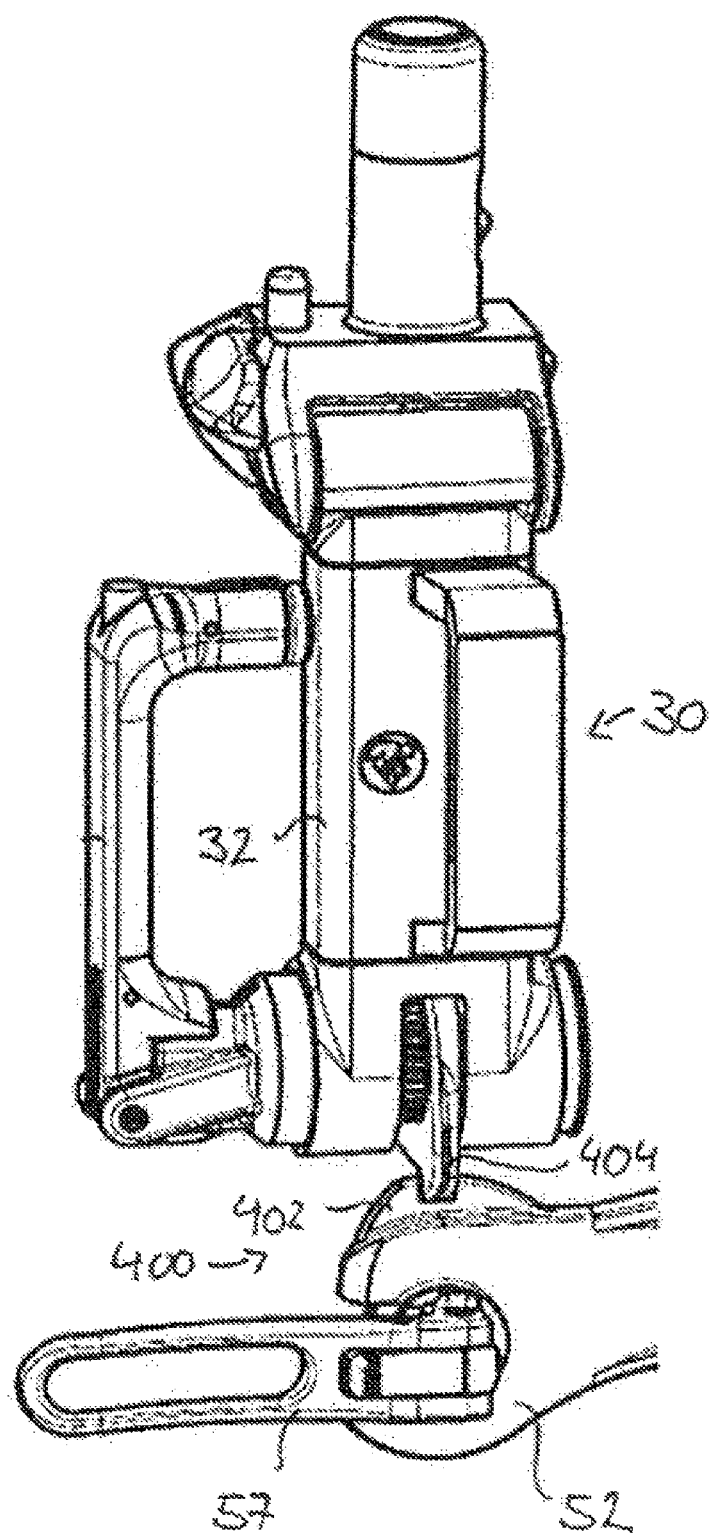
FIG. 59 shows the adjusting device of FIG. 58 from a different direction.

As shown in FIG. 58, when the rotation about the second pivot axis A2 is blocked, an end stop 404 which may be formed for example on the coupler 36 of the four-bar linkage 30 enters into contact with the projection 402. Now, if the user should release a blocking device for the four-bar linkage 30, the four-bar linkage 30 as such can be swiveled. Then the portion of the shin plate will swivel in space according to the length ratio of the guide bars and couplers. However, an additional rotating of the shin plate 24 about the second pivot axis A2 the additional degree of freedom will be effectively prevented by the rotation locking device 400.

Furthermore, in FIG. 58 it will be seen that the design of the contact element 402 as an oblong projection in the form of a cockscomb ensures that the contact element 402 makes contact with the end stop 404 even at small angles of adjustment between thigh plate 22 and shin plate 24. Therefore, the rotation locking device 400 according to the sixth embodiment is especially insensitive to the tolerances of the structural parts.

The invention claimed is:

1. An adjusting device for positioning support surface segments of an operating table, the adjustment device comprising a four-bar linkage wherein a base element of the operating table and a support surface segment of a patient bearing surface of the operating table are connected,
wherein the four-bar linkage has a first guide bar, which is connected at its first end to the base element so that it can pivot about a first pivot axis and at its second end to a first end of a coupler so that it can pivot about a second pivot axis parallel to the first pivot axis, and
the four-bar linkage has a second guide bar, which is connected at its first end to the base element so that it can pivot about a third pivot axis parallel to the first pivot axis and at its second end to the coupler so that it can pivot about a fourth pivot axis parallel to the first pivot axis, wherein the support surface segment is connected to the four-bar linkage so that it can pivot about the second pivot axis.

2. The adjusting device of claim 1, wherein the adjusting device has a first arresting unit for locking a pivoting motion of the support surface segment about the second pivot axis relatively to the first guide bar or to the coupler.

3. The adjusting device of claim 1, wherein the four-bar linkage makes possible a pivoting motion of the second pivot axis about the first pivot axis, and wherein the adjusting device has a second arresting unit for blocking the pivoting motion of the second pivot axis about the first pivot axis.

4. The adjusting device of claim 2, wherein the first arresting unit is in an unlocked state in a first activating position of an activating element,
wherein the pivoting motion of the support surface segment about the second pivot axis is enabled, and
wherein the first arresting unit is in a locked state in a second activating position of the activating element, in which the pivoting motion of the support surface segment about the second pivot axis is blocked.

5. The adjusting device of claim 4, wherein the second arresting unit is in an unlocked state in the first activating position of the activating element, in which the pivoting motion of the second pivot axis about the first pivot axis is enabled, and
wherein the second arresting unit is in a locked state in the second activating position of the activating element, in which the pivoting motion of the second pivot axis about the first pivot axis is blocked.

6. The adjusting device of claim 4, wherein the second arresting unit is in an unlocked state in the first and the second activating position of the activating element, in which the pivoting motion of the second pivot axis about the first pivot axis is enabled, and
wherein the second arresting unit is in an locked state in a third activating position of the activating element, in which the pivoting motion of the second pivot axis about the first pivot axis is blocked.

7. The adjusting device of claim 3, wherein the first arresting unit is in an unlocked state in a first activating position of an activating element and in a second activating position of the activating element, in which the pivoting motion of the support surface segment about the second pivot axis is enabled,
the first arresting unit is in a locked state in a third activating position of the activating element, in which the pivoting motion of the support surface segment about the second pivot axis is blocked,
wherein the second arresting unit is in an unlocked state in the first activating position of the activating element, in which the pivoting motion of the second pivot axis about the first pivot axis is enabled, and
wherein the second arresting unit is in a locked state in the second and the third activating position of the activating element, in which the pivoting motion of the second pivot axis about the first pivot axis is blocked.

8. The adjusting device of claim 4, wherein the first arresting unit comprises a rotationally firm first locking element relative to the first guide bar or to the coupler,
wherein the support surface segment has a first engaging element firmly connected thereto,
wherein the first engaging element in the locked state of the first arresting unit stands in engagement with the first locking element, and
wherein the first engaging element in the unlocked state does not stand in engagement with the first locking element.

9. The adjusting device of claim 5, wherein the second arresting unit has a second locking element which is rotationally firm with regard to the first guide bar,
the coupler has a second engaging element firmly connected thereto,
the second engaging element in the locked state of the arresting unit stands in engagement with the second locking element, and
the second engaging element in the unlocked state does not stand in engagement with the second locking element.

10. The adjusting device of claim 9, wherein a cylindrical through hole is formed in the first guide bar,
the first locking element is arranged in the through hole,
the first locking element has a first side facing a first opening of the through hole, on which is formed a first gearing of the first locking element,
the first engaging element has a gearing fashioned complementary to the first gearing of the first locking element, by which the first engaging element in the locked state of the first arresting unit stands in engagement with the first locking element,
the second locking element is arranged in the through hole,
the second locking element has a first side facing the second opening of the through hole, on which a first gearing of the second locking element is formed, and
the second engaging element has a gearing fashioned complementary to the first gearing of the second locking element, by which the second engaging element in the locked state of the second arresting unit stands in engagement with the second locking element.

11. The adjusting device of claim 9, wherein the first locking element and the second locking element are arranged rotationally firm to the first guide bar about the longitudinal axis of the through hole, and
the first locking element and the second locking element are each arranged displaceably along the longitudinal axis of the through hole.

12. The adjusting device of claim 10, wherein a gearing is formed in the wall of the through hole, whose tooth flanks are parallel to the longitudinal axis of the through hole,
the first locking element and the second locking element are each cylindrical in configuration and each have a second gearing on their lateral surface which is complementary to the gearing of the through hole, by which the first locking element and the second locking element each stand in engagement with the first guide bar, and the first locking element and the second locking element are each movable along the longitudinal axis of the through hole.

13. The adjusting device of claim 12, wherein the first arresting unit comprises a first shift element, wherein the activating element is connected to a second shift element, which stands in engagement with the first shift element, wherein the second shift element, upon a movement of the activating element from an activating position in which the first arresting unit is in the unlocked state into an activating position in which the first arresting unit is in the locked state, moves the first shift element along the longitudinal axis of the through hole from a first shift position of the first shift element into a second shift position of the first shift element, the first gearing of the first locking element in the first shift position of the first shift element is arranged at a spacing from the gearing of the first engaging element, so that the first arresting unit is in the unlocked state, and the first gearing of the first locking element, upon the movement of the first shift element from the first shift position to the second shift position, is moved along the longitudinal axis of the through hole and brought into engagement with the gearing of the first engaging element, so that the first arresting unit is in the locked state.

14. The adjusting device of claim 13, wherein the second arresting unit comprises a third shift element, the second shift element, upon a movement of the activating element from an activating position in which the second arresting unit is in the unlocked state into an activating position in which the second arresting unit is in the locked state, moves the third shift element along the longitudinal axis of the through hole from a first shift position of the third shift element to a second shift position of the third shift element, the first gearing of the second locking element in the first shift position of the third shift element is arranged at a spacing from the gearing of the second engaging element, so that the second arresting unit is in the unlocked state, and the first gearing of the second locking element upon the movement of the third shift element from the first shift position to the second shift position is moved along the longitudinal axis of the through hole and brought into engagement with the gearing of the second engaging element, so that the second arresting unit is in the locked state.

15. The adjusting device of claim 14, wherein the movement of the activating element from the activating position in which the first arresting unit is in the unlocked state to the activating position in which the first arresting unit is in the locked state is a rotation of the activating element about the longitudinal axis of the through hole, the second shift element comprises a shaft firmly connected to the activating element, whose longitudinal axis runs along the longitudinal axis of the through hole, and a pin arranged transversely to the shaft and connected to the shaft, the first shift element is fashioned as a first cam, whose cam track is arranged on the side facing the pin around the longitudinal axis of the through hole, wherein the cam track has at least one inclined section with a pitch, and the pin, during the movement of the activating element from the activating position in which the first arresting unit is in the unlocked state to the activating position in which the first arresting unit is in the locked state, moves along the inclined section of the cam track of the first cam.

16. The adjusting device of claim 15, wherein the third shift element is fashioned as a second cam, whose cam track on the side facing the pin is arranged about the longitudinal axis of the through hole, wherein the cam track has at least one inclined section with a pitch.

17. The adjusting device of claim 11, wherein a shaft is present, which has a first outer thread with a first pitch and a second outer thread with a second pitch, wherein the first outer thread is arranged in a first region of the shaft and the second outer thread is arranged in a second region of the shaft around the longitudinal axis of the shaft and the directions of the first pitch and the second pitch are opposite to each other, the first locking element has an opening with an inner thread, which is formed complementary to the first outer thread and stands at least partly in engagement with the first outer thread, the second locking element has an opening with an inner thread, which is formed complementary to the second outer thread and stands at least partly in engagement with the second outer thread, the activating element is connected rotationally firmly to the shaft, and the movement of the activating element from the first activating position to the second activating position produces a rotation of the shaft about its longitudinal axis.

18. The adjusting device of claim 14, wherein the second shift element comprises a shaft, the shaft has a first outer thread with a first pitch and a second outer thread with a second pitch, wherein the first outer thread is arranged in a first region of the shaft and the second outer thread is arranged in a second region of the shaft around the longitudinal axis of the shaft and the directions of the first pitch and the second pitch are opposite to each other, the first shift element has an opening with an inner thread, which is formed complementary to the first outer thread and stands at least partly in engagement with the first outer thread, the third shift element has an opening with an inner thread, which is formed complementary to the second outer thread and stands at least partly in engagement with the second outer thread, and the movement of the activating element from the first activating position to the second activating position produces a rotation of the shaft about its longitudinal axis.

19. The adjusting device of claim 1, wherein a combined arresting unit is provided, which comprises a coupling piece, which enables in a first shift position a pivoting motion of the support surface segment with the four-bar linkage about the second pivot axis and a pivoting motion of the second pivot axis about the first pivot axis, in a second shift position it blocks a pivoting motion of the second pivot axis about the first pivot axis, and in a third shift position it also additionally blocks a pivoting motion of the support surface segment about the second pivot axis relative to the first guide bar or the coupler.

20. The adjusting device of claim 19, wherein the adjusting device moreover comprises a connection element for the rotatable connection of the support surface segment to the four-bar linkage, and the coupling piece is axially displaceable in the direction of the second pivot axis, wherein the coupling piece comprises at least one external gearing, which may engage with an internal gearing of the first guide bar, the coupler, or the connection element.

21. The adjusting device of claim 19, wherein the coupling piece moreover comprises at least one centering extension, on which the first guide bar, the coupler, or the connection element can turn freely.

22. The adjusting device of claim 20, wherein at least one axial marginal region of the external gearing of the coupling piece is configured such that in this marginal region the side walls of neighboring teeth are inclined and/or curved relative to each other so that funnel-shaped interstices are formed between neighboring teeth.

23. The adjusting device of claim 20, wherein a spring-loaded detent element is provided on the coupling piece, which engages with the internal gearing of the first guide bar, the coupler, or the connection element.

24. The adjusting device of claim 19, wherein respective internal gearings of the first guide bar, the coupler and the connection element are arranged one after the other in the axial direction, and the coupling piece may be brought into engagement arbitrarily with one, two or three of the internal gearings.

25. The adjusting device of claim 1, wherein the support surface segment comprises a first partial segment and a second partial segment, which can pivot relative to each other about a further pivot axis, wherein the further pivot axis runs substantially perpendicular to the first and second pivot axis, and a rotation locking device is provided, which in a given angle range of the pivoting about the further pivot axis blocks a rotation of the support surface segment about the second pivot axis in at least one direction.

26. The adjusting device of claim 25, wherein the rotation locking device comprises a contact element, which is firmly connected to the second partial segment, and moreover it comprises an end stop, which is firmly connected to the coupler or to the first guide bar of the four-bar linkage, so that during an adjustment of the second partial segment relative to the first partial segment about the further pivot axis the contact element is brought into contact with the end stop and thus blocks a pivoting of the support surface segment about the second pivot axis in one direction.

27. The adjusting device of claim 26, wherein the contact element comprises an oblong projection.

28. The adjusting device of claim 26, wherein the rotation locking device in an angle range of 75° to 90° of the adjustment about the further pivot axis blocks a pivoting of the support surface segment about the second pivot axis.

29. The adjusting device of claim 26, wherein in a locking state of the rotation locking device the second pivot axis can be pivoted by the four-bar linkage about the first pivot axis.

* * * * *